(12) United States Patent
Bujold et al.

(10) Patent No.: US 10,024,122 B2
(45) Date of Patent: Jul. 17, 2018

(54) INJECTION OF HEATING CABLES WITH A COILED TUBING INJECTOR

(71) Applicant: ATHABASCA OIL CORPORATION, Calgary (CA)

(72) Inventors: Maurice A Bujold, Cochrane (CA); Doug Beattie, Calgary (CA)

(73) Assignee: ATHABASCA OIL CORPORATION, Calgary, Alberta (CA)

( * ) Notice: Subject to any disclaimer, the term of this patent is extended or adjusted under 35 U.S.C. 154(b) by 469 days.

(21) Appl. No.: 14/730,369

(22) Filed: Jun. 4, 2015

(65) Prior Publication Data

US 2015/0267485 A1    Sep. 24, 2015

Related U.S. Application Data

(62) Division of application No. 14/625,279, filed on Feb. 18, 2015, now Pat. No. 9,822,592.

(Continued)

(51) Int. Cl.
| | |
|---|---|
| *E21B 19/08* | (2006.01) |
| *E21B 19/02* | (2006.01) |
| *E21B 36/04* | (2006.01) |
| *E21B 17/20* | (2006.01) |
| *E21B 33/04* | (2006.01) |

(Continued)

(52) U.S. Cl.
CPC .............. *E21B 19/02* (2013.01); *E21B 15/00* (2013.01); *E21B 17/20* (2013.01); *E21B 17/206* (2013.01); *E21B 19/08* (2013.01); *E21B 19/22* (2013.01); *E21B 29/04* (2013.01); *E21B 33/0407* (2013.01); *E21B 36/00* (2013.01);

(Continued)

(58) Field of Classification Search
None
See application file for complete search history.

(56) References Cited

U.S. PATENT DOCUMENTS

| | | |
|---|---|---|
| 1,700,336 A | 1/1929 | Redfield |
| 2,528,593 A | 11/1950 | Hickerson et al. |

(Continued)

FOREIGN PATENT DOCUMENTS

| | | |
|---|---|---|
| CA | 2120851 | 8/1995 |
| CA | 2679994 A1 | 8/2008 |

(Continued)

OTHER PUBLICATIONS

International Search Report of PCT/CA2015/050112 dated May 11, 2015.

(Continued)

*Primary Examiner* — Shane Bomar
(74) *Attorney, Agent, or Firm* — Heslin Rothenberg Farley & Mesiti P.C.; Victor A. Cardona, Esq.

(57) ABSTRACT

A method for injecting resistive heating cables into a well or into coiled tubing deployed in a well includes providing a coiled tubing injector above the well, the coiled tubing injector having coiled tubing gripper blocks replaced with cable gripper blocks; guiding one or more cables from respective cable reels into the top of the injector; and using the injector to inject the cables into the well or into the coiled tubing deployed in the well with downward vertical movement of the cables driven by gripping and downward vertical movement of the cable gripper blocks.

15 Claims, 29 Drawing Sheets

Related U.S. Application Data

(60) Provisional application No. 61/941,251, filed on Feb. 18, 2014, provisional application No. 62/080,569, filed on Nov. 17, 2014.

(51) Int. Cl.
*E21B 43/24* (2006.01)
*E21B 29/04* (2006.01)
*E21B 19/22* (2006.01)
*E21B 15/00* (2006.01)
*E21B 36/00* (2006.01)
*E21B 47/06* (2012.01)

(52) U.S. Cl.
CPC .......... *E21B 36/04* (2013.01); *E21B 43/2401* (2013.01); *E21B 47/065* (2013.01)

(56) References Cited

U.S. PATENT DOCUMENTS

| | | | |
|---|---|---|---|
| 3,713,482 A | 1/1973 | Lichte, Jr. et al. | |
| 3,718,888 A * | 2/1973 | Pasternak | H01R 4/2454 |
| | | | 439/399 |
| 3,780,803 A | 12/1973 | Hardy et al. | |
| 3,804,163 A | 4/1974 | Bradley et al. | |
| 3,912,445 A | 10/1975 | Seefluth | |
| 3,920,076 A * | 11/1975 | Laky | E21B 19/22 |
| | | | 166/384 |
| 4,545,442 A | 10/1985 | Warner et al. | |
| 4,570,715 A | 2/1986 | Van Meurs et al. | |
| 4,585,066 A | 4/1986 | Moore | |
| 4,616,705 A | 10/1986 | Stegemeier | |
| 4,640,353 A | 2/1987 | Schuh | |
| 5,070,533 A | 12/1991 | Bridges et al. | |
| 5,429,194 A * | 7/1995 | Nice | E21B 23/08 |
| | | | 166/383 |
| 6,250,371 B1 | 6/2001 | Amerman et al. | |
| 6,276,438 B1 | 8/2001 | Amerman et al. | |
| 6,360,819 B1 | 3/2002 | Vinegar | |
| 6,540,018 B1 | 4/2003 | Vinegar et al. | |
| 6,585,036 B2 | 7/2003 | Amerman et al. | |
| 6,585,046 B2 | 7/2003 | Neuroth et al. | |
| 6,672,371 B1 | 1/2004 | Amerman et al. | |
| 6,892,810 B2 * | 5/2005 | Austbo | E21B 19/22 |
| | | | 166/77.3 |
| 6,896,063 B2 | 5/2005 | Chang et al. | |
| 7,004,247 B2 | 2/2006 | Cole et al. | |
| 7,017,650 B2 | 3/2006 | Johnson, Jr. et al. | |
| 7,051,811 B2 | 5/2006 | de Rouffignac et al. | |
| 7,090,013 B2 | 8/2006 | Wellington | |
| 7,290,601 B2 | 11/2007 | Chalifoux et al. | |
| 7,367,399 B2 | 5/2008 | Steele et al. | |
| 7,561,776 B2 | 7/2009 | Chalifoux et al. | |
| 7,562,706 B2 | 7/2009 | Li et al. | |
| 7,673,681 B2 | 3/2010 | Vinegar et al. | |
| 7,677,310 B2 | 3/2010 | Vinegar et al. | |
| 7,681,647 B2 | 3/2010 | Mudunuri et al. | |
| 7,730,936 B2 | 6/2010 | Hernandez-Solis et al. | |
| 7,753,344 B1 | 7/2010 | Moretz et al. | |
| 7,891,416 B2 | 2/2011 | Pankrantz et al. | |
| 8,087,460 B2 | 1/2012 | Kaminsky | |
| 8,151,877 B2 | 4/2012 | Kaminsky et al. | |
| 8,162,059 B2 | 4/2012 | Nguyen et al. | |
| 8,178,782 B2 | 5/2012 | Kamel et al. | |
| 8,186,445 B2 | 5/2012 | Monjure | |
| 8,200,072 B2 | 6/2012 | Vinegar et al. | |
| 8,238,730 B2 | 8/2012 | Sandberg et al. | |
| 8,381,815 B2 | 2/2013 | Karanikas et al. | |
| 8,502,120 B2 | 8/2013 | Bass et al. | |
| 8,536,497 B2 | 9/2013 | Kim | |
| 8,622,133 B2 | 1/2014 | Kaminsky | |
| 8,627,887 B2 | 1/2014 | Vinegar et al. | |
| 2002/0023751 A1* | 2/2002 | Neuroth | E21B 23/14 |
| | | | 166/302 |
| 2003/0122535 A1 | 7/2003 | Glynn et al. | |
| 2004/0211554 A1 | 10/2004 | Vinegar et al. | |
| 2004/0211557 A1 | 10/2004 | Cole et al. | |
| 2004/0211569 A1 | 10/2004 | Vinegar et al. | |
| 2005/0045343 A1* | 3/2005 | Bixenman | E21B 17/206 |
| | | | 166/385 |
| 2005/0205267 A1 | 9/2005 | Dallas | |
| 2005/0269094 A1 | 12/2005 | Harris | |
| 2005/0269313 A1 | 12/2005 | Vinegar et al. | |
| 2006/0005968 A1 | 1/2006 | Vinegar et al. | |
| 2006/0115221 A1 | 6/2006 | Chalifoux et al. | |
| 2006/0289536 A1 | 12/2006 | Vinegar | |
| 2007/0122104 A1 | 5/2007 | Chalifoux et al. | |
| 2008/0185138 A1 | 8/2008 | Hernandez-Solis et al. | |
| 2008/0217321 A1 | 9/2008 | Vinegar et al. | |
| 2008/0230219 A1 | 9/2008 | Kaminsky | |
| 2009/0095477 A1 | 4/2009 | Nguyen et al. | |
| 2009/0120646 A1 | 5/2009 | Kim et al. | |
| 2009/0194287 A1 | 8/2009 | Nguyen et al. | |
| 2009/0194524 A1 | 8/2009 | Kim | |
| 2009/0260809 A1 | 10/2009 | Wellington et al. | |
| 2010/0089584 A1 | 4/2010 | Burns | |
| 2010/0089586 A1 | 4/2010 | Stanecki | |
| 2010/0147521 A1 | 6/2010 | Xie et al. | |
| 2010/0147522 A1 | 6/2010 | Xie et al. | |
| 2010/0224368 A1 | 9/2010 | Mason | |
| 2010/0258290 A1 | 10/2010 | Bass | |
| 2010/0258291 A1 | 10/2010 | Everett et al. | |
| 2011/0017510 A1 | 1/2011 | Emerson | |
| 2011/0048717 A1 | 3/2011 | Diehl | |
| 2011/0224907 A1 | 9/2011 | Chalifoux | |
| 2011/0247805 A1 | 10/2011 | St. Remey et al. | |
| 2011/0259580 A1 | 10/2011 | Head | |
| 2011/0259591 A1 | 10/2011 | Vinegar | |
| 2011/0308816 A1 | 12/2011 | Chalifoux | |
| 2012/0018421 A1 | 1/2012 | Parman et al. | |
| 2012/0080419 A1 | 4/2012 | Bush et al. | |
| 2012/0084978 A1 | 4/2012 | Hartford et al. | |
| 2012/0118634 A1 | 5/2012 | Coles et al. | |
| 2012/0193099 A1 | 8/2012 | Vinegar et al. | |
| 2012/0222855 A1 | 9/2012 | Gnarlier | |
| 2012/0325458 A1 | 12/2012 | El-Rabba | |
| 2013/0043029 A1 | 2/2013 | Vinegar et al. | |
| 2013/0086800 A1 | 4/2013 | Noel et al. | |
| 2013/0087327 A1 | 4/2013 | Nguyen et al. | |
| 2013/0118746 A1 | 5/2013 | Delp | |
| 2013/0175036 A1 | 7/2013 | Hausot | |
| 2013/0206748 A1 | 8/2013 | Vinegar et al. | |
| 2014/0034635 A1 | 2/2014 | Bass et al. | |
| 2014/0069636 A1 | 3/2014 | Kaminsky | |
| 2014/0069719 A1 | 3/2014 | Coles et al. | |
| 2014/0099084 A1 | 4/2014 | Parman et al. | |
| 2014/0102721 A1* | 4/2014 | Bespalov | E21B 33/072 |
| | | | 166/385 |
| 2014/0215809 A1 | 8/2014 | Noel et al. | |
| 2014/0246193 A1 | 9/2014 | Wollen | |
| 2014/0301426 A1 | 10/2014 | Harris et al. | |
| 2015/0233211 A1 | 8/2015 | Bujold et al. | |
| 2015/0267483 A1 | 9/2015 | Bujold et al. | |
| 2015/0267486 A1 | 9/2015 | Bujold et al. | |
| 2015/0267487 A1 | 9/2015 | Bujold et al. | |
| 2016/0186507 A1* | 6/2016 | Varkey | E21B 43/128 |
| | | | 166/250.01 |

FOREIGN PATENT DOCUMENTS

| | | |
|---|---|---|
| CA | 2335678 A1 | 8/2012 |
| WO | 2000011317 | 3/2000 |
| WO | 2008051495 A2 | 5/2008 |
| WO | 2008115356 | 9/2008 |
| WO | 2010070305 A2 | 6/2010 |
| WO | 2010107726 | 9/2010 |
| WO | 2014047469 A2 | 3/2014 |

OTHER PUBLICATIONS

Written Opinion of PCT/CA2015/050112 dated May 11, 2015.
Hot-Tube TM Electrical Heating Enhancement System—htlp://www.petrospec.com/production-optimization/petrospec-electrical-heating-enhancement-system-hot-tube (accessed Feb. 2014).

(56) References Cited

OTHER PUBLICATIONS

Electric Downhole Heating Systems (Pentair Brochure) published 2013. http://www.pentairthermal.com/Images/GB-PetroTraceOilfieldheatingsystemsNAM-SB-H58453_tcm432-26180.pdf L.

* cited by examiner

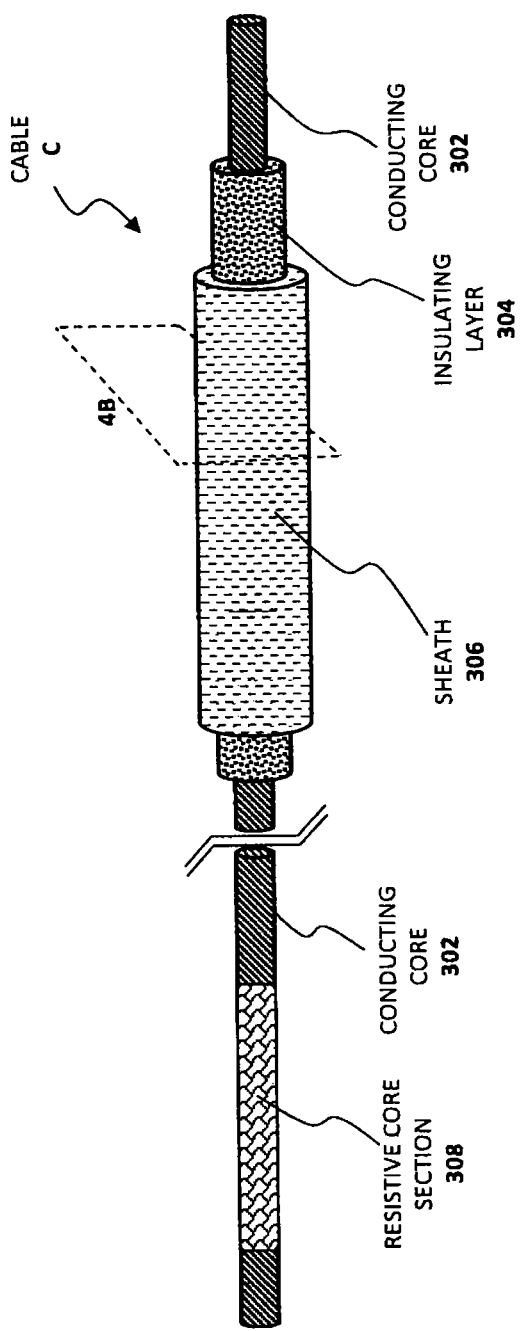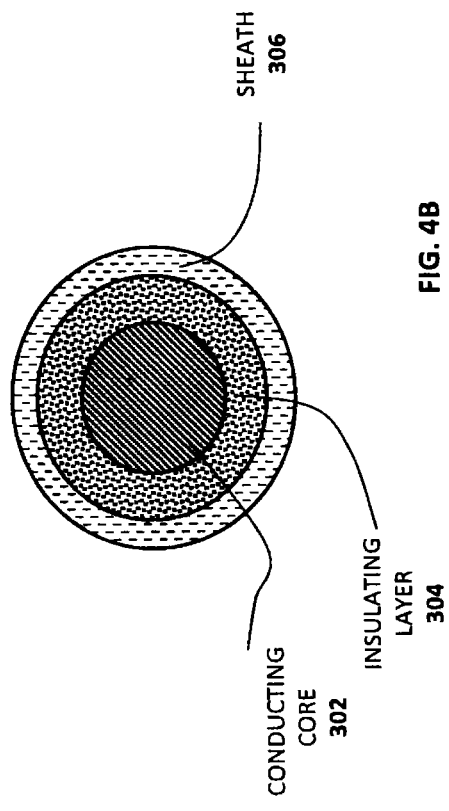
FIG. 4A
FIG. 4B

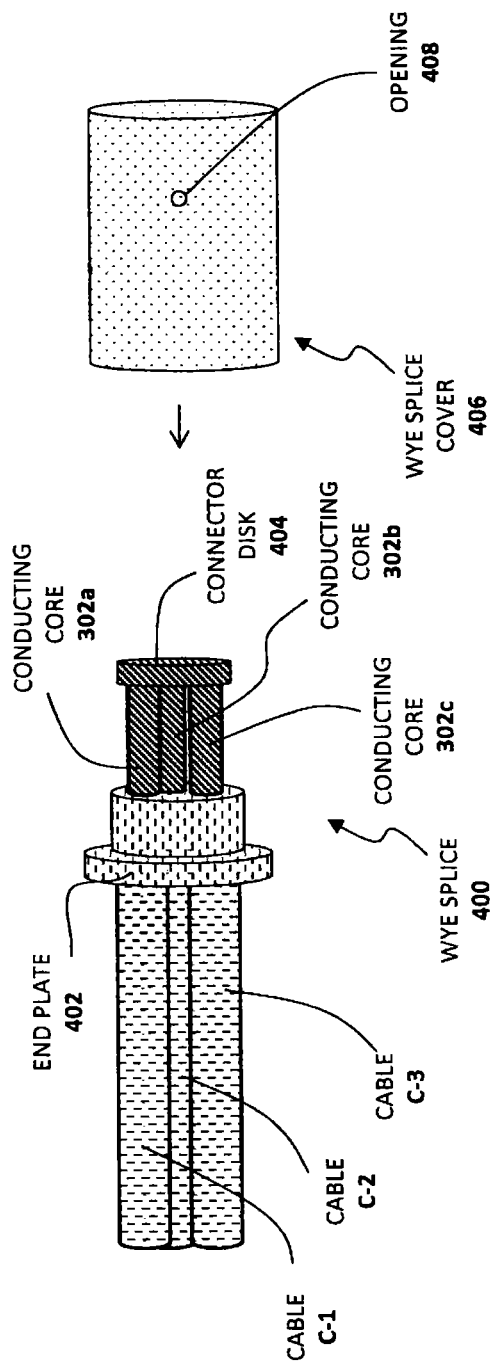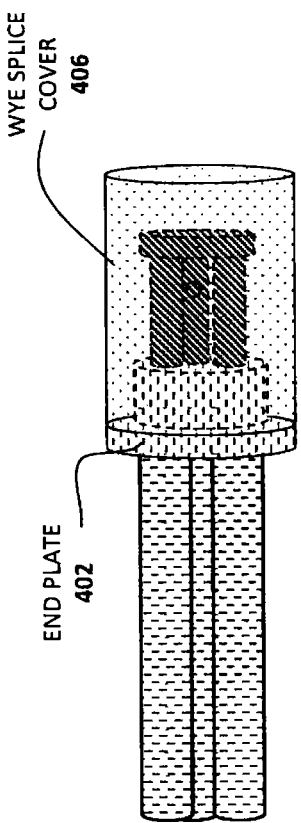

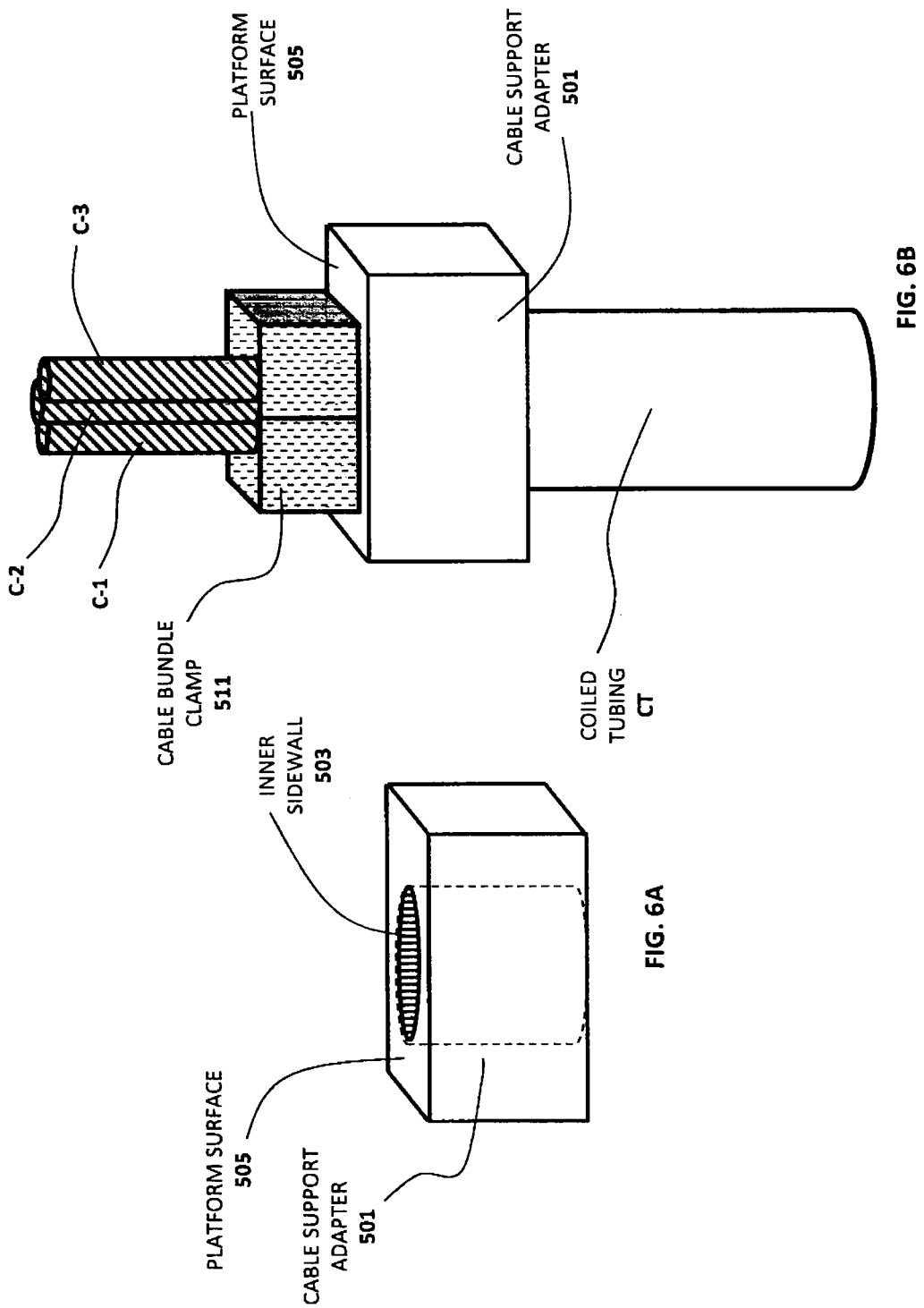

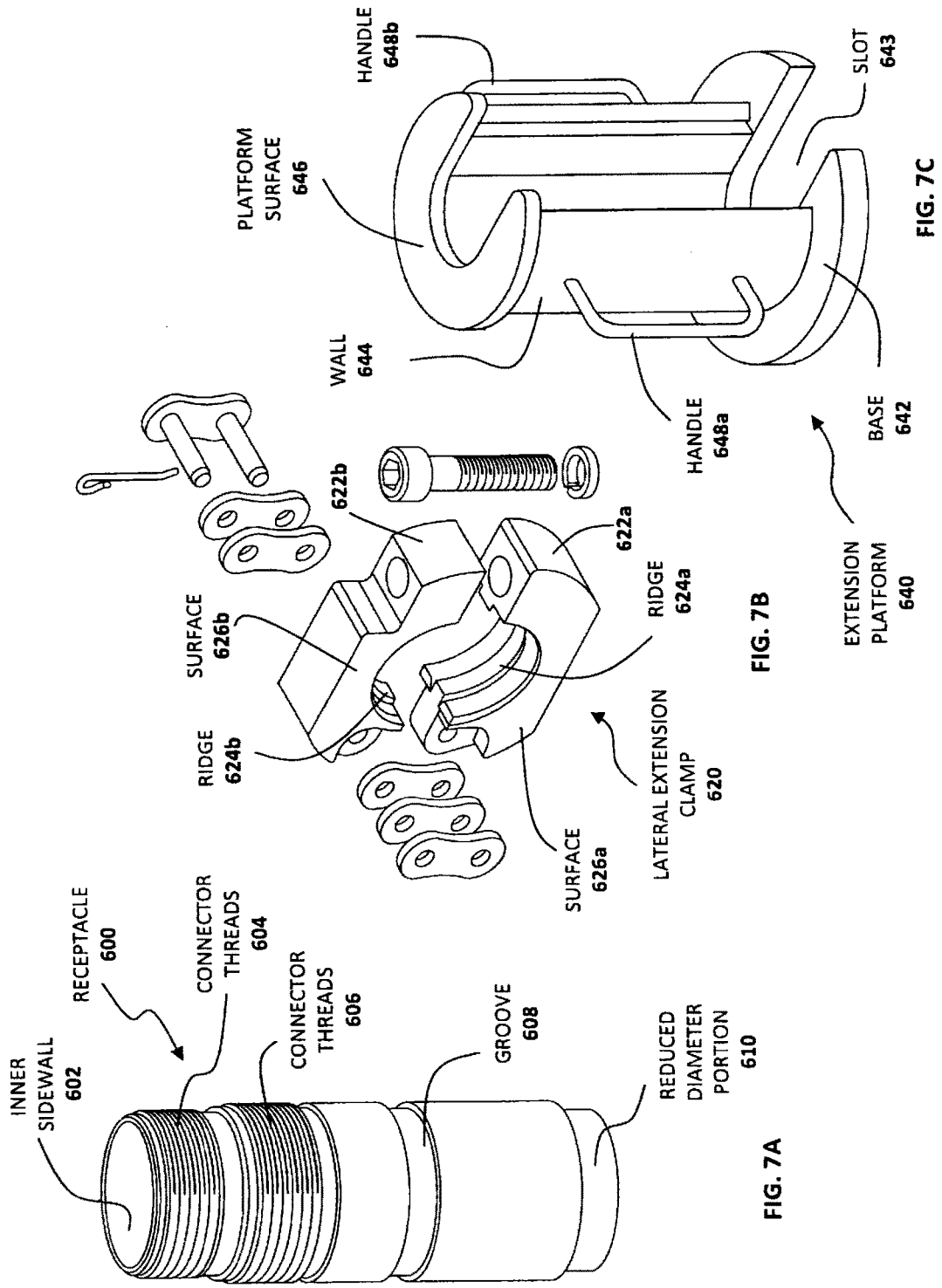

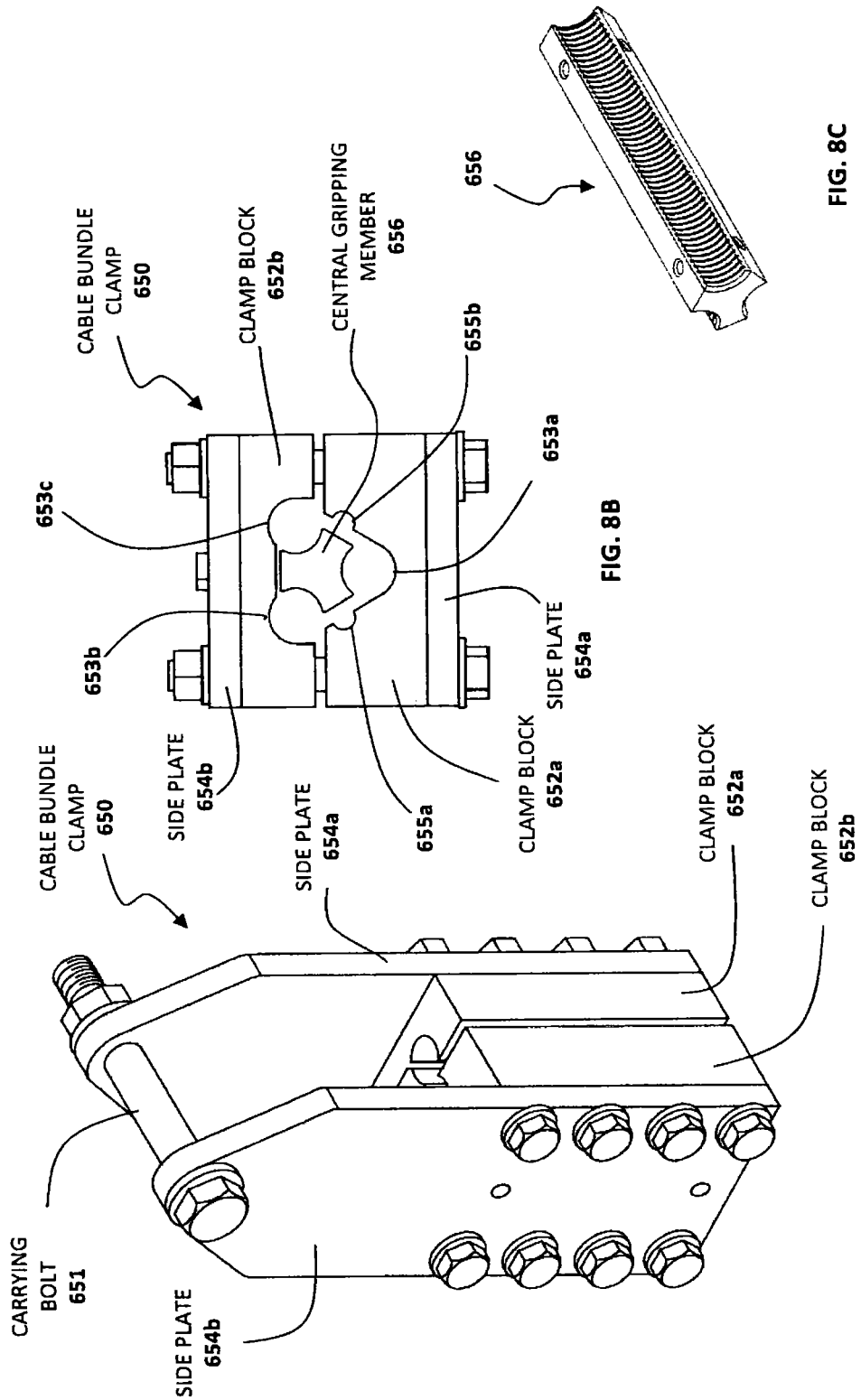

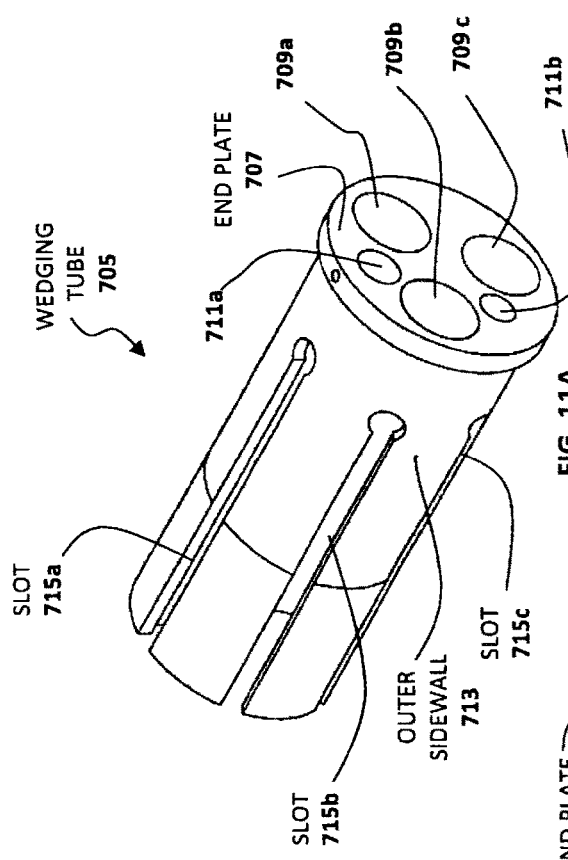
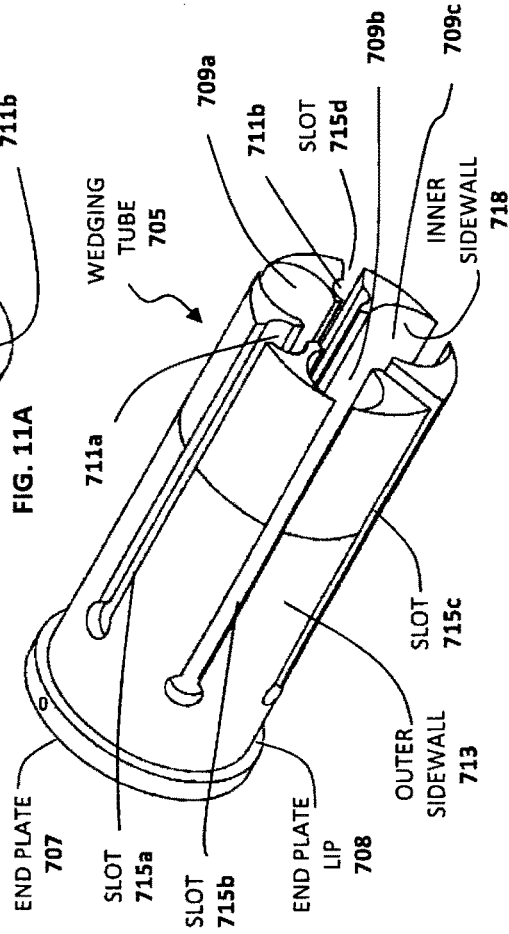

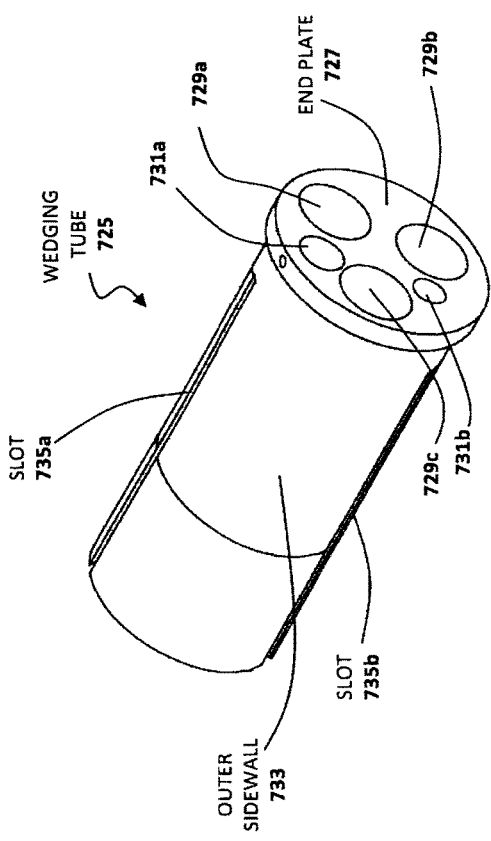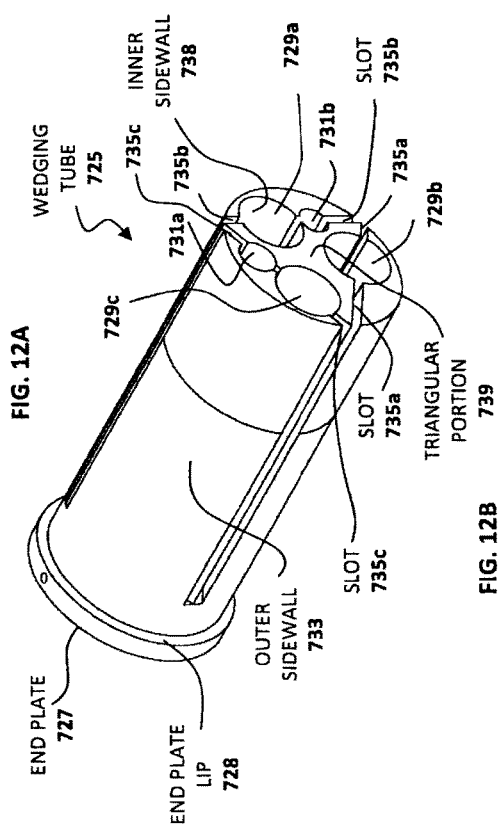
FIG. 12A
FIG. 12B

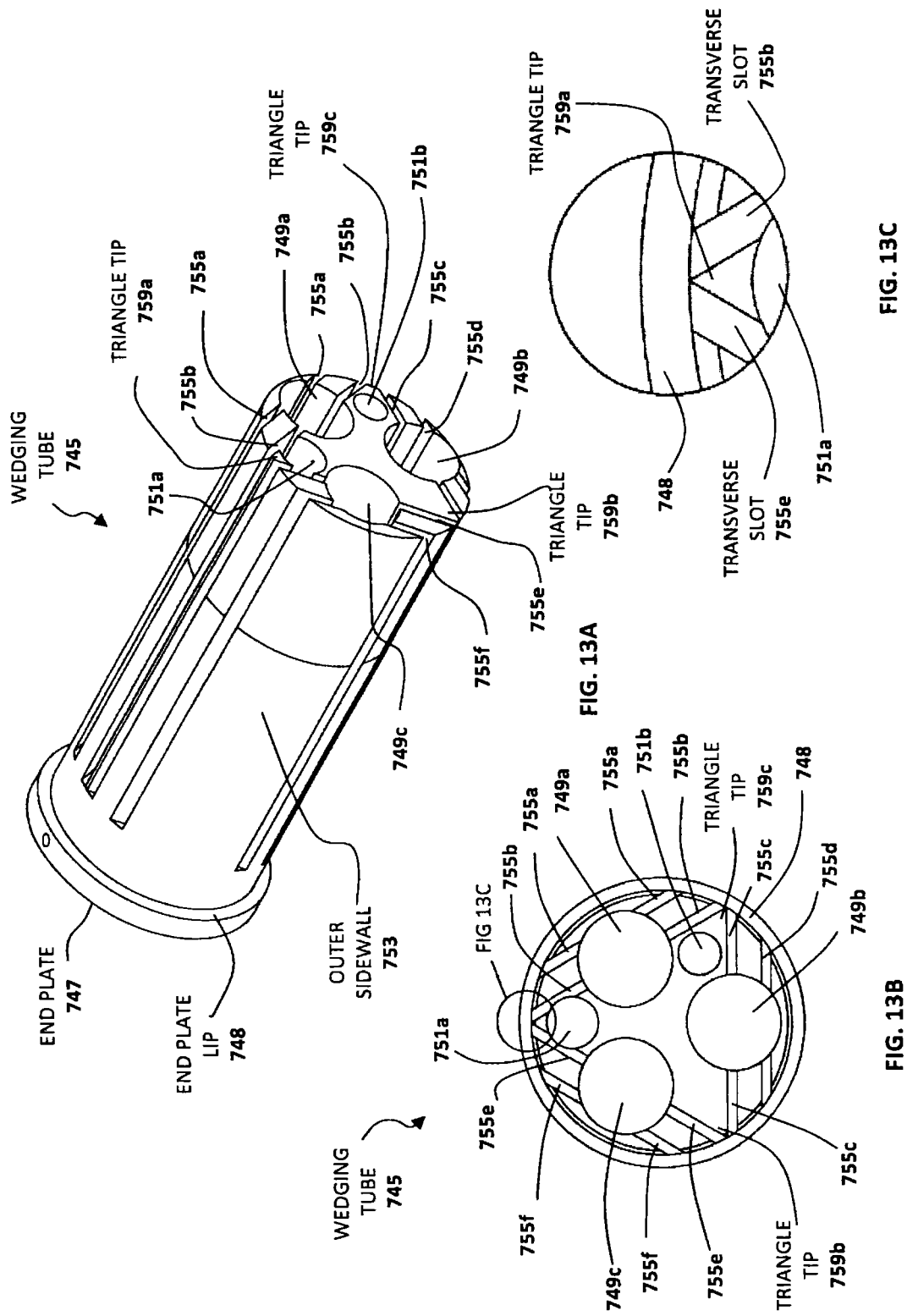

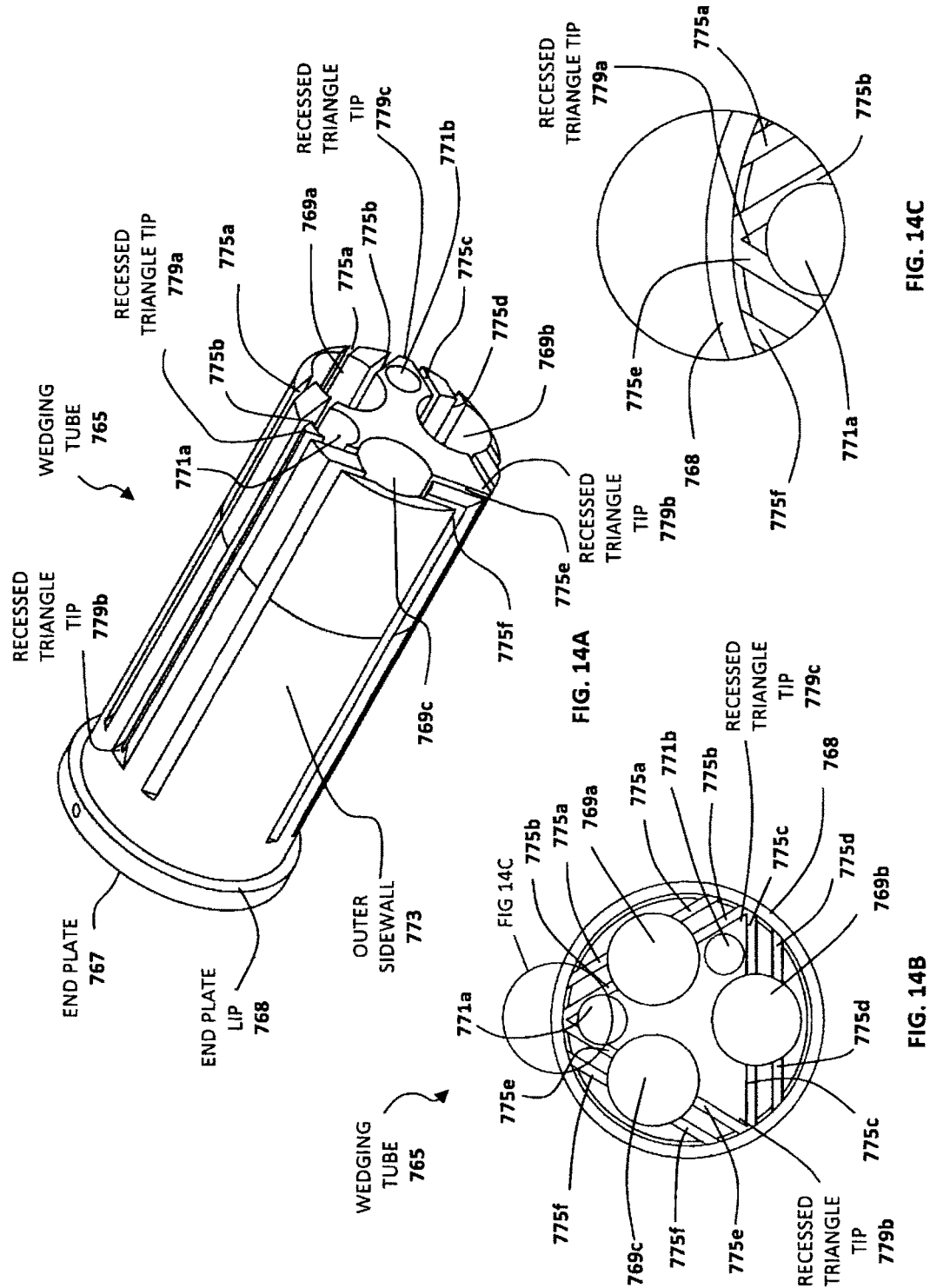

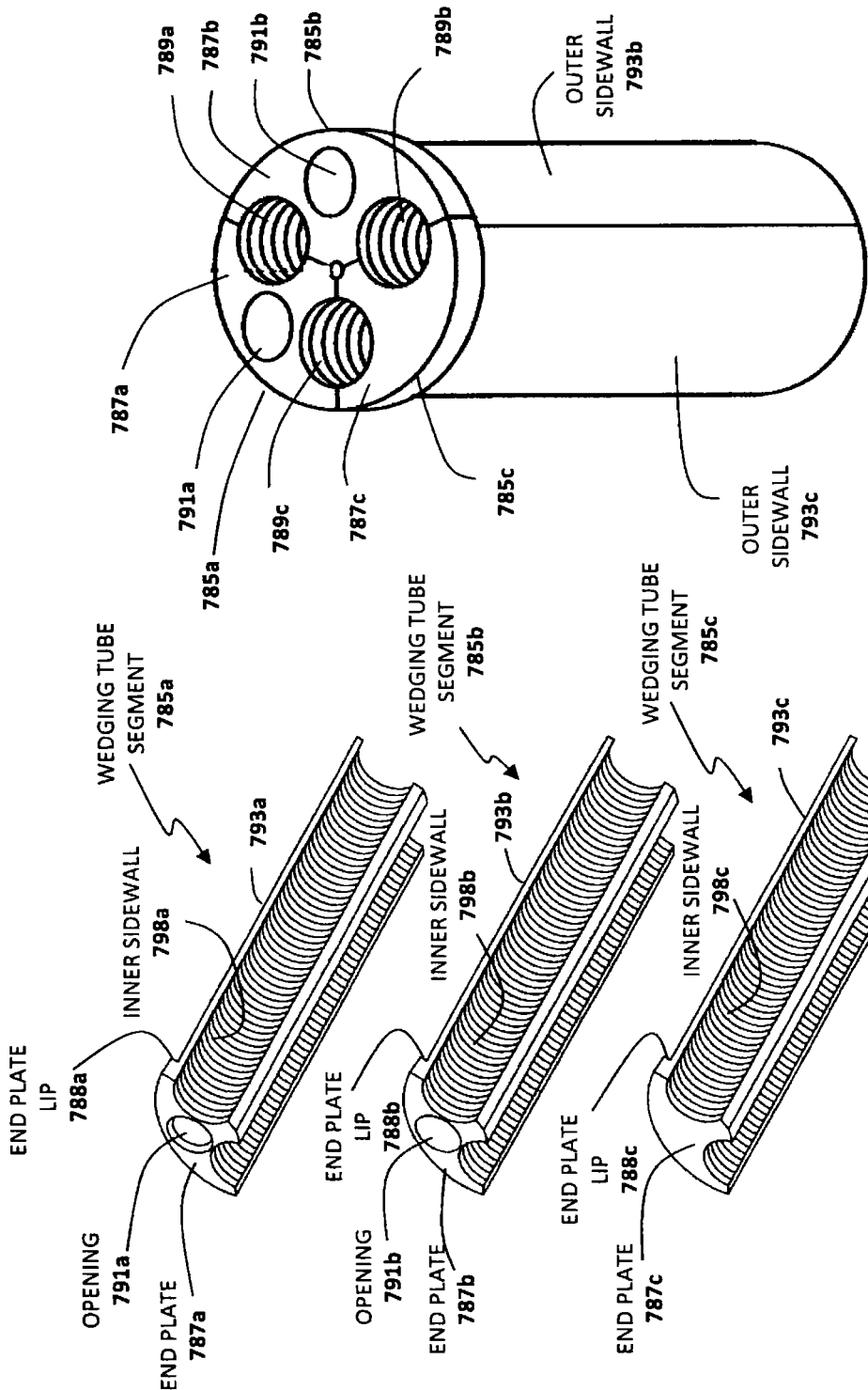

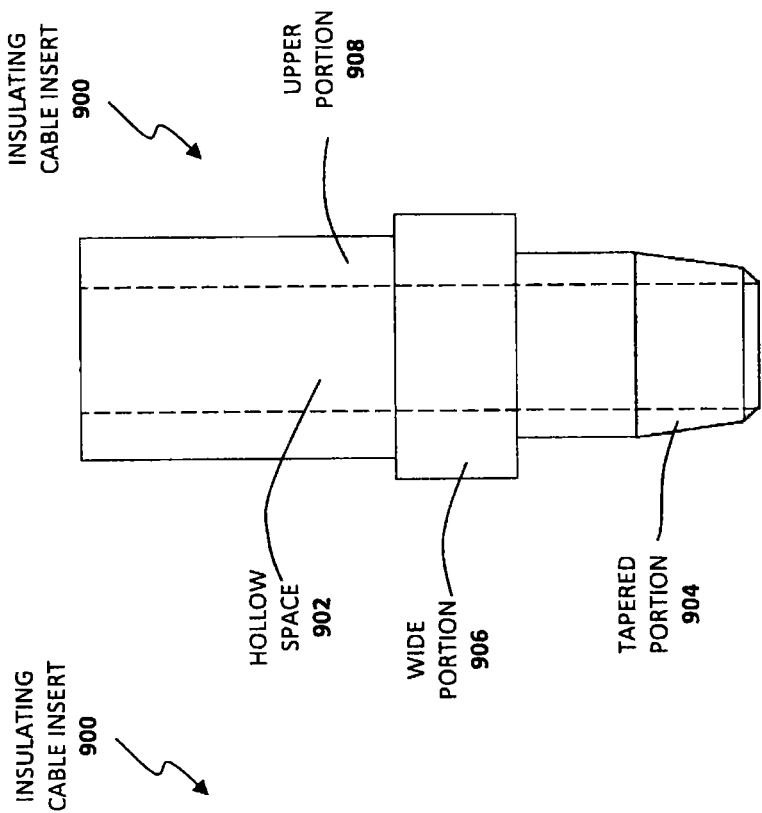
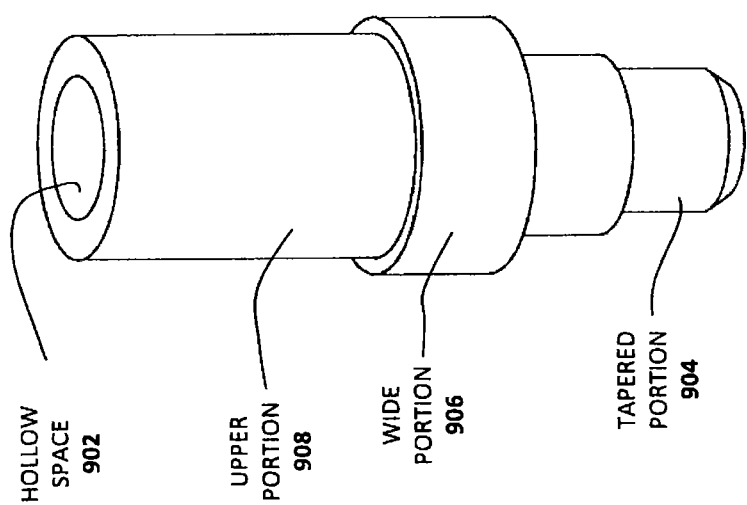

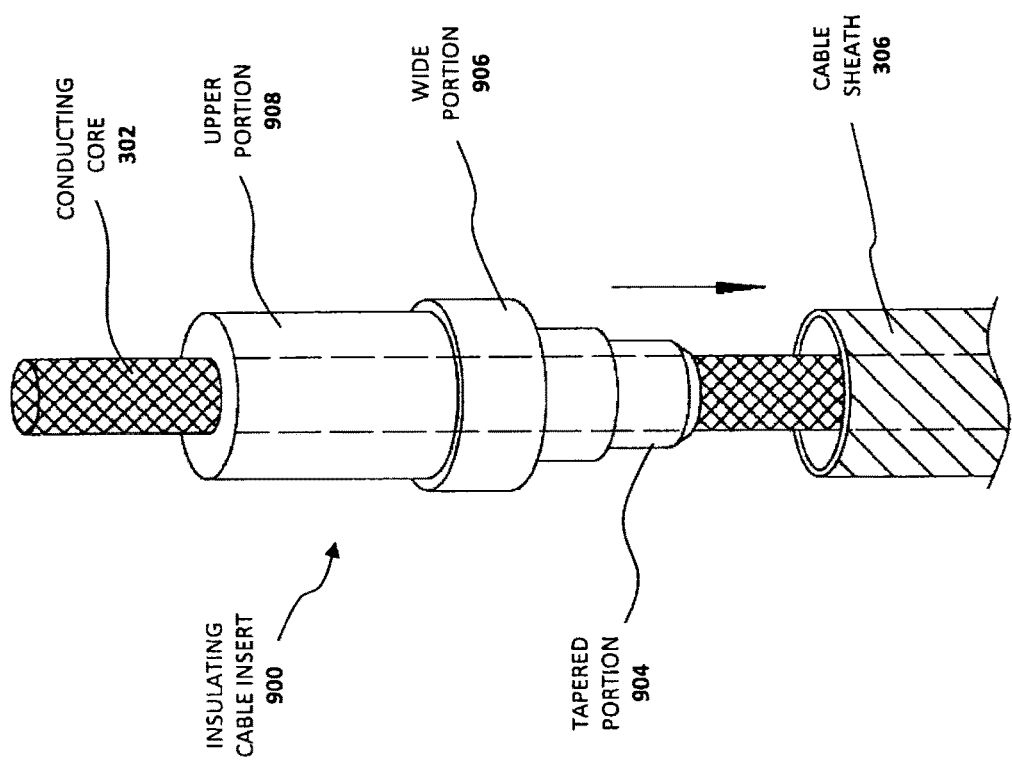

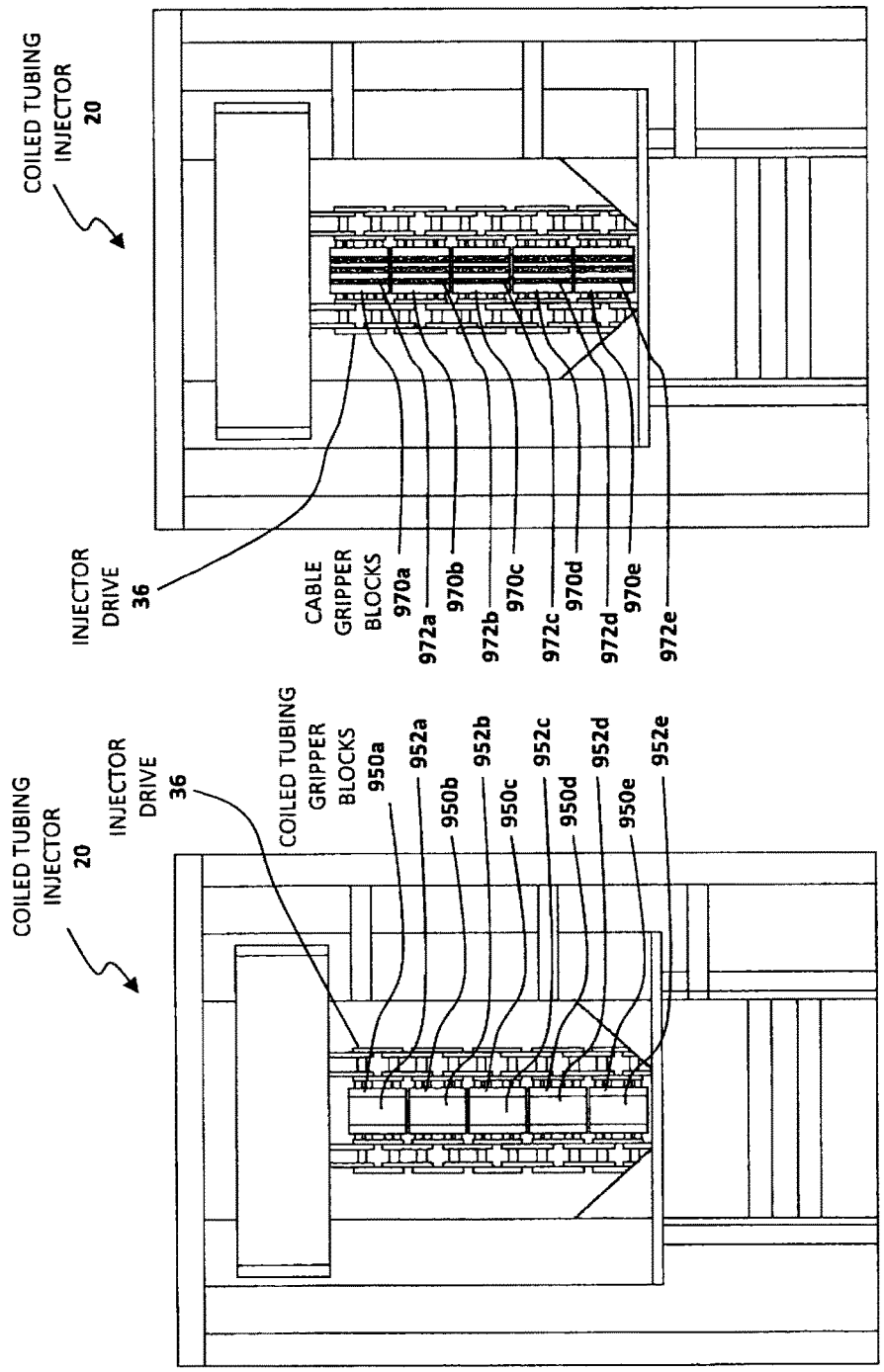

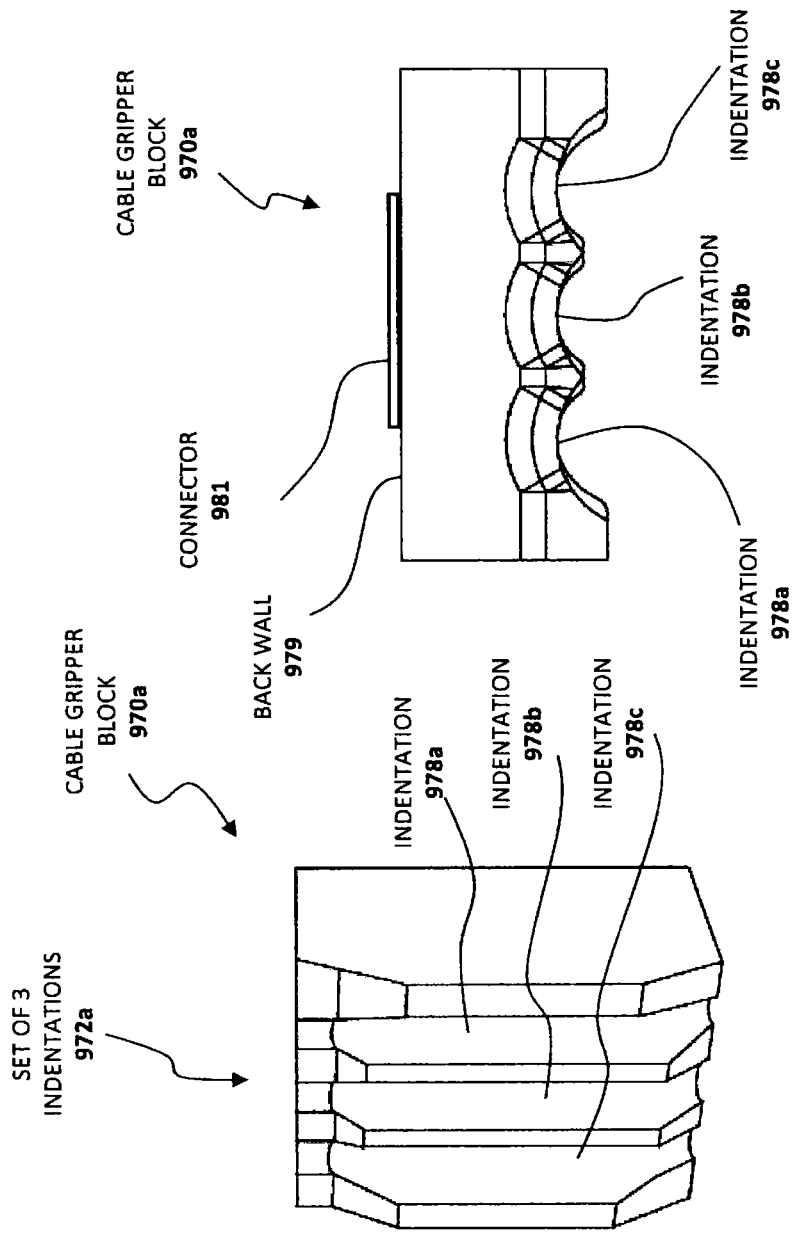

INJECTION OF HEATING CABLES WITH A COILED TUBING INJECTOR

CROSS REFERENCE TO RELATED APPLICATIONS

This application is a divisional of U.S. patent application Ser. No. 14/625,279 filed on Feb. 18, 2015, which claims priority to U.S. Provisional Patent Application Ser. No. 61/941,251 filed on Feb. 18, 2014 and U.S. Provisional Patent Application Ser. No. 62/080,569 filed on Nov. 17, 2014, the entire disclosures of which are incorporated herein by reference.

FIELD OF THE INVENTION

The invention relates to the field of extraction of heavy oil and bitumen and more particularly to assembly of equipment used in processes involving heating of geological formations for the purpose of recovery of heavy oil and bitumen.

BACKGROUND OF THE INVENTION

Heavy crude oil is closely related to natural bitumen from oil sands with respect to a number of properties. Generally, bitumen is the heaviest, most viscous form of petroleum and is often referred to as "natural bitumen." Bitumen shares the attributes of heavy oil but is more dense and viscous. Natural bitumen and heavy oil differ from light oils by having higher viscosity (resistance to flow) at reservoir temperatures. As is known, heavy oil is often found at the margins of geologic basins and is thought to be the residue of formerly light oil that has lost its light-molecular-weight components. Conventional heavy oil and bitumen differ in the degree by which they have been degraded from the original crude oil. Often, bitumen does not flow under ambient conditions within a given reservoir.

The large reserves of bitumen and heavy oil in the Alberta oil sands have been under development for many years and the pace of development is accelerating. While certain areas of the oil sands are being developed by strip-mining due to the proximity of the bitumen to the surface, many other areas where the bitumen is well below the surface are being developed using advanced processes which have a significantly lower impact on the landscape. One well known process is steam-assisted gravity drainage (SAGD) which typically utilizes two or more vertically displaced horizontal wells and high pressure steam that is continuously injected into an upper wellbore to heat the reservoir. As a result, the viscosity of the heavy oil/bitumen within the reservoir is reduced, thereby enabling it to flow downward to a production well. While effective, SAGD is energy intensive and requires significant surface infrastructure to manage the steam production and water/oil recovery and separation.

Another process for recovery of heavy oil and bitumen has been developed by the present applicant. This process, known as thermally-assisted gravity drainage (TAGD) has been described in US Patent Publication No. 20120318512 which is incorporated herein by reference. In TAGD, also using horizontal wells, the mobility of the bitumen or heavy oil is increased by conductive heating (instead of steam) to reduce its viscosity. In these processes, the bitumen or heavy oil is heated to temperatures below the thermal cracking temperature of the bitumen or heavy oil. As the bitumen or heavy oil is produced, evolved gases, evaporated connate water or both form a gas chamber which acts to replace the volume of the produced fluid required for the gravity drainage process. Some of the more common applications of this process use heaters placed in wells drilled in specific patterns surrounding the main producer well. The patterns have been developed by extensive reservoir modeling studies for optimizing placement of heaters for optimal conduction of heat within the reservoir. These heaters are hereinafter referred to as "well heaters." TAGD provides a number of advantages over SAGD processes including reduced energy and surface infrastructure costs.

A number of other processes for recovery of heavy or bitumen are under development which will also require the use of well heaters. A number of different types of heating means may be provided in well heaters used for TAGD or other similar processes. Examples of such heating means may include dielectric heating (also known as electronic heating, RF heating and high frequency heating), hot water circulating heaters, catalytic heaters, fluid exchange heating, and heating using molten salts or metals. One particularly useful class of well heating mechanism is resistance heating (also known as Joule heating and Ohmic heating). This heating mechanism is typically provided using cables with resistive portions that release heat when subjected to electric currents. The heater cables are typically run into wells using coiled tubing.

Because processes such as TAGD require heating of deep reservoirs, the lengths of the well heater cables and their protective components which make up the body of the heater (hereinafter referred to as well heaters) may be several thousand meters in length. A number of problems are associated with assembly of such well heaters.

In the past, well heaters with resistive cables were assembled in areas with very long sections of clear flat ground, such as unused aircraft runways. Typically, a long section of coiled tubing would be unwound onto the runway and secured to the ground using large heavy weights to maintain the straightness of the coiled tubing. The heater cables would then be pulled into the coiled tubing by inserting a tow cable through the coiled tubing and then pulling the heater cable through it. After the components were assembled, the assembled heater would be spooled onto a standard coiled tubing reel and then transferred to the wells for deployment. Not surprisingly, this method of assembling well heaters has significant drawbacks. For example, assembling a heater cable on a disused runway has significant risks, including the risk of contamination and/or damage to the cables as a result of dragging them over ground or pavement, safety risks associated with handling large weights to safely secure the coiled tubing in a straight line, as well as the practical limitation of identifying the required stretches of clear flat ground or pavement. This method is also labor-intensive and would typically require on the order of 25 workers about 6 days to assemble a single well heater. Furthermore, this assembly method is also affected by the prevailing weather conditions.

Accordingly, there has been a need for improved systems and methods of assembling heater cable systems and, in particular a need for systems that overcome the problems of assembling well heaters in an uncontrolled outdoor environment.

More specifically, there has been a need for systems that enable the controlled "indoor" assembly of well heaters. In addition, there has been a need for improved well heaters that can be readily assembled to a desired length with specific properties.

A review of the prior art indicates that various heater systems have been developed relating to various components of the heater systems and the equipment required for handling and deployment of heater systems and coiled tubing. For example, the construction of a "temperature limited" well heater is described in U.S. Pat. No. 8,579,031.

A gripper block for a coiled tubing injector with a variable tubing size capability is described in U.S. Pat. No. 6,892,810.

US Patent Publication No. 2010/0224368 describes a method for making a coiled insulated conductor heater to heat a subsurface formation. The method described in this reference includes the step of pushing the insulated conductor heater longitudinally inside a flexible conduit using pressure, wherein one or more cups are coupled to the outside of the insulated conductor heater. The cups are configured to maintain at least some pressure inside at least a portion of the flexible conduit as the insulated conductor heater is pushed inside the flexible conduit.

US Patent Publication No. 2010/0089584 describes a heater for treating subsurface formations which includes a conduit and three insulated electrical conductors located in the conduit.

US Patent Publication No. 2013/0086800 describes a process for forming insulated conductor heaters using a powder as the insulator. The process includes steps of feeding of sheath material such as stainless steel and conductor (core) material into a process flow line and passing these components through compression and centralizing rolls to form tubular materials, followed by addition of heated electrical insulator powder into the sheath.

U.S. Pat. No. 8,502,120 describes an insulated conductor heater with an electrical conductor that produces heat when an electrical current is provided to the electrical conductor. An electrical insulator at least partially surrounds the electrical conductor. The electrical insulator comprises a resistivity that remains substantially constant, or increases, over time when the electrical conductor produces heat.

US Patent Publication No. 2013/0118746 describes a system for use in an in situ oil production process which includes a multi-component composite cable having multiple conductors for delivering electrical power to a heater array, multiple hoses for transmitting fluid to a heater array, a strength member made of a heat resistant synthetic fiber material, and a cable jacket layer surrounding the conductors, hoses and strength member.

U.S. Pat. No. 4,570,715 describes an electrical heater containing spoolable, steel sheathed, mineral insulated cables which have high electrical conductivities. The conductors are surrounded by heat stable electrical insulations such as a mass of compacted powdered mineral particles and/or by discs of ceramic materials.

In view of the foregoing, there continues to be a need for improved well heater systems and processes for assembly of these well heaters.

SUMMARY OF THE INVENTION

One aspect of the invention is a method for assembly of a well heater, the method comprising: a) injecting a length of coiled tubing into a well, supporting the coiled tubing in the well and cutting the coiled tubing above the well head; b) injecting one or more resistive heating cables into the into the coiled tubing; c) constructing a cable support structure at the cut end of the coiled tubing for supporting the weight of the cables against the inner sidewall of the coiled tubing; d) cutting the cables and configuring the cut ends of the cables for connection to an electrical source, thereby defining the structure of the well heater; and e) withdrawing the well heater from the well.

In certain embodiments, the well is a vertical well or a deviated well.

In certain embodiments, the deviated well is deviated from vertical by between about 30 degrees to about 50 degrees.

In certain embodiments, the deviated well is deviated from vertical by between about 35 to about 45 degrees.

In certain embodiments, step b) includes injection of three resistive heating cables which are connected at the injected end by a wye splice.

In certain embodiments, the three resistive heating cables are configured for transmission of three-phase electrical power.

In certain embodiments, step a) includes attaching a cover to the injected end of the coiled tubing.

In certain embodiments, the method further comprises attaching one or more temperature measurement lines to one or more of the cables and injecting the temperature measurement lines into the coiled tubing together with the cables.

In certain embodiments, the temperature measurement lines include a thermocouple line or a fiber optic line configured for distributed temperature sensing.

In certain embodiments, the temperature measurement lines include at least one thermocouple line and at least one fiber optic line configured for distributed temperature sensing.

In certain embodiments, the method further includes as step f) a process of reeling the well heater onto a coiled tubing reel.

Another aspect of the invention is a facility for assembly of well heaters, the facility comprising: a) a well of sufficient diameter to receive coiled tubing; b) a scaffold supporting a coiled tubing injector, wherein the injector is configurable for injection of coiled tubing into the well and configurable for injection of one or more resistive heating cables into coiled tubing in the well; c) a coiled tubing guide system supported by the injector or the scaffold; and d) one or more cable guides for guiding the resistive heating cables from respective cable reels into the injector, wherein the cable guides are supported by the scaffold.

In certain embodiments, the well is a vertical well or a deviated well.

In certain embodiments, the deviated well is deviated from vertical by between about 30 degrees to about 50 degrees.

In certain embodiments, the deviated well is deviated from vertical by between about 35 to about 45 degrees.

In certain embodiments, at least part of the coiled tubing guide is a gooseneck connected to the injector.

In certain embodiments, the one or more cable guides are guide sheaves supported by a beam of the scaffold.

In certain embodiments, the scaffold includes a first platform for workers to obtain access to the injector.

In certain embodiments, the scaffold includes a second platform for workers to obtain access to the top of the injector and to the guide sheaves supported by the upper beam of the scaffold.

In certain embodiments, the facility further comprises a covered structure to provide protection of the facility from weather elements.

In certain embodiments, the injection system is configured to allow exchange of coiled tubing gripper blocks for gripper blocks configured for simultaneous injection of one or more cables.

In certain embodiments, the facility further comprises a coiled tubing straightener and a cable straightener, each supported by the scaffold.

In certain embodiments, the cable straightener is configured to straighten three cables simultaneously.

In certain embodiments, the coiled tubing straightener is supported by the scaffold below the cable straightener and the cable straightener includes swivel means to remove the cable straightener from the path of entry of the coiled tubing into the injector.

In certain embodiments, the facility further comprises a crane for transferring an assembled well heater spooled on a reel to a delivery vehicle.

In certain embodiments, the covered structure includes a bay opening to allow access of a delivery vehicle to the interior of the covered structure.

Another aspect of the invention is a method of retrofitting a coiled tubing injector for injection of resistive heating cables, the method comprising: a) providing a coiled tubing injector with a gripper block system that allows exchange of the coiled tubing gripper blocks; and b) exchanging coiled tubing gripper blocks for cable gripper blocks.

In certain embodiments, the cable gripper blocks each include three indentations for gripping three resistive heating cables.

Another aspect of the present invention is a method for injecting cables into a well or into coiled tubing deployed in a well, the method comprising: a) providing a coiled tubing injector above the well, the coiled tubing injector having coiled tubing gripper blocks replaced with cable gripper blocks; b) guiding one or more cables from respective cable reels into the top of the injector; and c) using the injector to inject the cables into the well or into the coiled tubing deployed in the well with downward vertical movement of the cables driven by gripping and downward vertical movement of the cable gripper blocks.

In certain embodiments, a cable straightener is provided above the coiled tubing injector for straightening of the cables prior to entry of the cables into the top of the injector.

In certain embodiments, the cable straightener is provided with swivel means to move it laterally from a position directly above the injector.

In certain embodiments, the cable gripper blocks are configured to simultaneously grip three cables.

In certain embodiments, the cable gripper blocks each have three indentations, wherein each indentation holds one of the three cables.

In certain embodiments, the indentations are each radiused to hold cables having an outer diameter of about 0.85 inches.

Another aspect of the present invention is a cable gripper block for use in retrofitting a coiled tubing injector for simultaneous injection of three cables into a well or into coiled tubing deployed in a well, the gripper block comprising: a) a cable gripping side with three indentations, each indentation for gripping one of the three cables; and b) an opposite side having a means for attachment of the gripper block to a drive mechanism of a coiled tubing injector.

In certain embodiments, the means for attachment of the gripper block to the drive mechanism is a groove which couples to a ridge on the drive mechanism or a ridge which couples to a groove on the drive mechanism.

In certain embodiments, the indentations are each radiused to hold cables having an outer diameter of about 0.85 inches.

Another aspect of the invention is a kit for use in retrofitting a coiled tubing injector for injection of cables into a well or into coiled tubing deployed in a well, the kit comprising: a set of cable gripper blocks wherein each cable gripper block of the set is a square or rectangular block having: i) a cable gripping side with three indentations, each indentation for gripping one of the three cables; and ii) an opposing side opposite the gripping side, the opposing side having a means for attachment of the gripper block to a drive mechanism of a coiled tubing injector.

In certain embodiments, the means for attachment of the cable gripper block to the drive mechanism is a groove which couples to a ridge on the drive mechanism or a ridge which couples to a groove on the drive mechanism.

In certain embodiments, the indentations are each radiused to hold cables having an outer diameter of about 0.85 inches.

In certain embodiments, the further comprises instructions for replacing the gripper blocks of a coiled tubing injector with the set of gripper blocks.

Another aspect of the present invention is a resistive cable-based well heater for providing heat to an oil or gas bearing formation, the well heater comprising: a) a length of coiled tubing having a sealed down-hole end and an open-ended cable support adapter attached to the up-hole end of the coiled tubing; b) a bundle of cables contained within the coiled tubing and conductively connected to each other at their down-hole ends at a location above the sealed down hole end of the coiled tubing, the cables extending from the upper opening of the cable support adapter and having free upper ends; and c) a wedging tube placed in the open end of the adapter for supporting the weight of the cables against the interior sidewall of the adapter when the well heater is deployed in a well, the wedging tube having an inner surface shaped to conform to the outer shape of the bundle of cables and an outer sidewall configured for weight bearing frictional contact with the interior sidewall of the cable support adapter.

In certain embodiments, attachment of the adapter to the coiled tubing is by welding.

In certain embodiments, the bundle of cables consists of three cables, each having a core and a sheath, with insulation therebetween.

In certain embodiments, the three cables are conductively connected by a wye-splice connector.

In certain embodiments, the wye splice connector includes an end plate connected to the sheath of each of the three cables with the core of each of the cables protruding outward therefrom, the end of the core of each of the three cables connected to respective openings in a connector disk.

In certain embodiments, the connection of the sheath of each cable to the end plate is made by welding and the connection between the end of each cable core and the connector disk is made by welding.

In certain embodiments, the wye splice is covered with a substantially cylindrical cover and the space between the wye splice and the inner sidewall of the cylindrical cover is filled with powder insulation.

In certain embodiments, the powder insulation is MgO.

In certain embodiments, the cables each have at least one portion having resistivity for providing heat when an electrical current is provided to the cables.

In certain embodiments, the cables each have a copper core with a stainless steel sheath and insulation disposed therebetween.

In certain embodiments, the insulation is MgO.

In certain embodiments, the free upper ends of the cables are insulated by a hollow plastic insulating cable insert having a first portion disposed between the inner sidewall of the sheath and the outer sidewall of the core of each cable, the insulating cable insert having a second portion extending out from the end of the sheath, wherein a length of the core of each cable extends outward from the hollow interior of the insert.

In certain embodiments, the outer sidewall of the insulating cable insert is fixed to the inner sidewall of the sheath with epoxy resin.

In certain embodiments, the plastic insert is formed of polyether ether ketone (PEEK).

In certain embodiments, the end of the first portion of the insert is tapered.

In certain embodiments, the adapter is cylindrical.

In certain embodiments, the well heater further comprises an open ended cylindrical retaining sleeve attached to the upper end of the adapter.

In certain embodiments, the retaining sleeve has inner threads which couple with outer threads on the adapter.

In certain embodiments, the well heater further comprises at least one temperature measurement line for providing temperature measurements at one or more points along the length of the well heater, wherein the temperature measurement line is attached to the bundle of cables.

In certain embodiments, the well heater further comprises one or more thermocouple lines for making one or more spot temperature measurements at one or more locations along the length of the cables and a fiber optic line for distributed temperature sensing.

In certain embodiments, the wedging tube includes one or more longitudinal slots.

In certain embodiments, the wedging tube includes four equi-spaced longitudinal slots.

In certain embodiments, the wedging tube includes three transverse slots which define an interior solid triangular portion.

In certain embodiments, the wedging tube includes six transverse slots formed from three sets of two parallel transverse slots which define an interior solid triangular portion.

In certain embodiments, the interior solid triangular portion has triangle tips which extend to the outer circumference of the wedging tube.

In certain embodiments, the interior solid triangular portion has triangle tips which are recessed inside the outer circumference of the wedging tube.

In certain embodiments, the wedging tube is formed from three separate wedging tube segments, each having an inner surface configured to conform to the shape of a portion of the bundle of cables.

In certain embodiments, at least one of the three wedging tube segments includes an opening to allow passage of a temperature line therethrough.

In certain embodiments, two of the wedging tube segments include an opening to allow passage of a temperature line therethrough.

In certain embodiments, the well heater further comprises a removable retaining sleeve attached to the adapter.

In certain embodiments, the well heater further comprises a removable protective cover attached to the retaining sleeve.

In certain embodiments, the protective cover has inner threads which couple with outer threads on the top of the retaining sleeve.

Another aspect of the invention is a well heater product in compact form for transport to a deployment site, the product comprising the well heater as described herein spooled on a coiled tubing reel.

In certain embodiments, the coiled tubing reel includes a start hole for insertion of the up-hole end of the assembled heater, and a curved ramp is connected to or integrally formed with the reel adjacent to the start hole on an emergent side of the start hole.

Another aspect of the invention is a method for constructing a resistive cable-based well heater for providing heat to an oil or gas bearing formation, the method comprising: a) injecting a length of coiled tubing with a sealed down-hole end into a vertical or deviated well; b) supporting the coiled tubing at the well head and cutting the coiled tubing above the well head; c) attaching an open ended cable support adapter having an upper platform surface to the cut end of the coiled tubing; d) injecting a cable bundle through the adapter into the coiled tubing, wherein the cables of the cable bundle are conductively connected to each other at the downhole end and wherein individual cables are deployed from individual corresponding spools; e) attaching a cable bundle clamp having a lower flat surface to the cables above the adapter; f) injecting the cable bundle further downward into the coiled tubing to place the lower flat surface of the cable bundle clamp upon the upper platform surface of the cable support adapter; g) cutting the cables of the cable bundle from their respective spools above the cable bundle clamp, thereby transferring the support of the weight of the cable bundle from the spools to the cable bundle clamp and the cable support adapter; h) attaching a wedging tube carrier carrying a reversibly connected wedging tube to the wedging tube carrier to the cable bundle above the cable bundle clamp, the wedging tube having an inner surface shaped to conform to the shape of the cable bundle and an outer curved surface configured for substantive weight bearing frictional contact with the inner sidewall of the cable support adapter; i) connecting a lifter to the wedging tube carrier and raising the cable bundle using the lifter; j) removing the cable bundle clamp from the cable bundle; k) lowering the cable bundle using the lifter to insert the wedging tube into the adapter to grip the cable bundle and bring the wedging tube into substantive weight bearing frictional contact with the inner sidewall of the adapter; and l) removing the wedging tube carrier from the cable bundle and the wedging tube.

In certain embodiments, the cable support adapter is attached to the coiled tubing by welding.

In certain embodiments, the bundle of cables consists of three cables, each having a core and a sheath, with insulation therebetween.

In certain embodiments, the three cables are conductively connected by a wye-splice connector.

In certain embodiments, the wye splice connector includes an end plate connected to the sheath of each of the three cables with the core of each of the cables protruding outward therefrom, the end of the core of each of the three cables connected to respective openings in a connector disk.

In certain embodiments, the connection of the sheath of each cable to the end plate is made by welding and the connection between the end of each cable core and the connector disk is made by welding.

In certain embodiments, the wye splice is covered with a substantially cylindrical cover and the space between the wye splice and the inner sidewall of the cylindrical cover is filled with powder insulation.

In certain embodiments, the powder insulation is MgO.

In certain embodiments, the cables each have at least one portion having resistivity for providing heat when an electrical current is provided to the cables.

In certain embodiments, the cables each have a copper core with stainless steel sheath and insulation disposed therebetween.

In certain embodiments, the insulation is MgO.

In certain embodiments, the method further comprises the step of providing protective insulation at the cut ends of the cables.

In certain embodiments, the protective insulation is provided by a hollow plastic insulating cable insert having a first portion disposed between the inner sidewall of the sheath and the outer sidewall of the core of each cable, the insulating cable insert having a second portion extending out from the end of the sheath, wherein a length of the core of each cable extends outward from the hollow interior of the insert.

In certain embodiments, the outer sidewall of the insulating cable insert is fixed to the inner sidewall of the sheath with epoxy resin.

In certain embodiments, the plastic insulating cable insert is formed of polyether ether ketone (PEEK).

In certain embodiments, the end of the first portion of the insulating cable insert is tapered.

In certain embodiments, the adapter is cylindrical.

In certain embodiments, the method further comprises attaching an open ended cylindrical retaining sleeve to the upper end of the adapter for holding the wedging tube in place against the inner sidewall of the adapter and against the cables.

In certain embodiments, the retaining sleeve has inner threads which couple with outer threads on the adapter.

In certain embodiments, the method further comprises attaching at least one temperature measurement line to the bundle of cables before injection of the cables into the coiled tubing, the temperature measurement line for providing temperature measurements at one or more points along the length of the well heater.

In certain embodiments, the method further comprises attaching one or more thermocouple lines and a fiber optic line to the bundle of cables before injection of the cables into the coiled tubing, the thermocouple lines for making one or more spot temperature measurements at one or more locations along the length of the cables and the fiber optic line for distributed temperature sensing.

In certain embodiments, the wedging tube includes one or more longitudinal slots.

In certain embodiments, the wedging tube includes four equi-spaced longitudinal slots.

In certain embodiments, the wedging tube includes three transverse slots which define an interior solid triangular portion.

In certain embodiments, the wedging tube includes six transverse slots formed from three sets of two parallel transverse slots which define an interior solid triangular portion.

In certain embodiments, the interior solid triangular portion has triangle tips which extend to the outer circumference of the wedging tube.

In certain embodiments, the interior solid triangular portion has triangle tips which are recessed inside the outer circumference of the wedging tube.

In certain embodiments, the wedging tube is formed from three separate wedging tube segments, each having an inner surfaces configured to conform to the shape of a portion of the bundle of cables.

In certain embodiments, at least one of the three wedging tube segments includes an opening to allow passage of a temperature line therethrough.

In certain embodiments, two of the wedging tube segments include an opening to allow passage of a temperature line therethrough.

In certain embodiments, the method further comprises attaching a removable retaining sleeve to the adapter.

In certain embodiments, the method further comprises attaching a removable protective cover to the retaining sleeve.

In certain embodiments, the protective cover has inner threads which couple with outer threads on the top of the retaining sleeve.

In certain embodiments, the method further comprises the step of withdrawing the assembled well heater from the well and spooling the well heater onto a coiled tubing reel for storage or transport to a deployment site.

In certain embodiments, the coiled tubing reel includes a start hole for insertion of the up-hole end of the assembled heater and a curved ramp is connected to or integrally formed with the reel adjacent to the start hole on an emergent side of the start hole.

In certain embodiments, the cable support adapter is initially constructed from a set of components comprising: i) a permanent open-ended cylinder configured to fit to the end of the coiled tubing; ii) a temporary lateral surface extension clamp configured to clamp to the outer sidewall of the open-ended cylinder; and iii) a temporary c-shaped extension platform with a lower c-shaped flat surface configured to rest upon the upper surface of the lateral extension clamp and an upper c-shaped flat surface which provides the upper platform surface.

In certain embodiments, the lateral extension clamp and the extension platform are removed together with removal of the cable bundle clamp in step j).

In certain embodiments, the open-ended cylinder has a circumferential groove and the lateral extension clamp has an inner ridge that is placed inside the groove to provide additional clamping support when the lateral extension clamp is clamped to the cylinder.

In certain embodiments, the extension platform is provided with side handles to facilitate manual transport.

In certain embodiments, the cable bundle clamp comprises: i) a pair of gripper blocks with inner surfaces configured to conform to the outer surfaces of the cable bundle; and ii) a central gripping member configured to conform to the inner surfaces of the cable bundle when the cable bundle is gripped by the cable bundle clamp.

In certain embodiments, the wedging tube carrier comprises: i) a pair of reversibly connectable cylinder halves each having a lower lip portion to which the wedging tube is reversibly attached when the wedging tube carrier is connected to the cables; and ii) an upper portion configured for attachment to a cap having a means for connecting to the lifter.

In certain embodiments, the wedging tube carrier comprises a second wedging tube placed between the inner sidewall of the connected cylinder halves and the cables, the second wedging tube having an inner surface shaped to conform to the shape of one or more of the cables and an outer surface configured for substantive weight bearing frictional contact with the inner sidewalls of the pair of cylinder halves.

In certain embodiments, the second wedging tube is identical to the wedging tube recited in step h).

Another aspect of the invention is a method for supporting a bundle of cables in a well or in a length of coiled tubing deployed in a vertical or deviated well during a process for assembly of a well heater which includes steps of injecting the cables from respective spools into the coiled tubing, the method comprising: a) attaching an open-ended cable support adapter to the up-hole end of the coiled tubing, the adapter having an upper flat surface extending laterally outward from the outer diameter of the coiled tubing; b) attaching a cable bundle clamp having a lower flat surface to the bundle of cables above the cable support adapter; c) injecting the cables further downward into the coiled tubing so that the lower flat surface of the cable bundle clamp rests upon the upper flat surface of the cable support adapter; d) cutting the cables from their respective spools above the cable bundle clamp, thereby transferring the support of the weight of the deployed cables from the spools to the cable bundle clamp and the adapter; e) clamping a wedging tube carrier to the cable bundle above the cable bundle clamp, the wedging tube carrier having a wedging tube reversibly attached to its lower end, the wedging tube having an inner surface shaped to conform to the shape of one or more of the cables and an outer surface configured for weight bearing frictional contact with the inner sidewall of the cable support adapter; f) connecting a lifter to the wedging tube carrier and raising the cable bundle using the lifter; g) removing the cable bundle clamp from the cable bundle; h) lowering the cables using the lifter to insert the wedging tube into the adapter to bring them into substantive weight bearing frictional contact with the inner sidewall of the adapter; and i) removing the wedging tube carrier from the bundle of cables.

In certain embodiments, the cable support adapter is initially constructed from a set of components comprising: i) a permanent open-ended cylinder configured to fit to the end of the coiled tubing, ii) a temporary lateral surface extension clamp configured to clamp to the outer sidewall of the open-ended cylinder; and iii) a temporary c-shaped extension platform with a lower c-shaped flat surface configured to rest upon the upper surface of the lateral extension clamp and an upper c-shaped flat surface which provides the upper platform surface.

In certain embodiments, the lateral extension clamp and the extension platform are removed with removal of the cable bundle clamp in step g).

In certain embodiments, the open-ended cylinder has a circumferential groove and the lateral extension clamp has an inner ridge that is placed inside the groove to provide additional clamping support when the lateral extension clamp is clamped to the cylinder.

In certain embodiments, the extension platform is provided with side handles to facilitate manual transport.

In certain embodiments, the bundle of cables comprises three cables and the cable bundle clamp comprises: i) a pair of gripper blocks with inner surfaces configured to conform to the outer surfaces of the bundle of cables; and ii) a central gripping member configured to conform to the inner surfaces of the cable bundle when the bundle of cables is gripped by the cable bundle clamp.

In certain embodiments, the wedging tube carrier comprises: i) a pair of reversibly connectable cylinder halves each having a lower lip portion to which the wedging tube is reversibly attached when the wedging tube carrier is connected to the cables; and ii) an upper portion configured for attachment to a cap having a means for connecting to the lifter.

In certain embodiments, the wedging tube carrier comprises a second wedging tube placed between the cables and the inner sidewall formed by connection of the cylinder halves, the second wedging tube having an inner surface shaped to conform to the shape of one or more of the cables and an outer surface configured for substantive weight bearing frictional contact with the inner sidewall formed by connection of the cylinder halves.

In certain embodiments, the second wedging tube is identical to the wedging tube recited in step e).

Another aspect of the invention is an insulating cable insert for protection of a cut end of a cable having a sheath and a conducting core, the insert comprising a cylindrical body with a hollow space extending therethrough, the body having a first end portion configured to fit in the space between the core and the sheath of the cable and a second portion wider than the first portion configured to extend outward from the end of the sheath when the insert is installed.

In certain embodiments, the insert is formed of plastic.

In certain embodiments, the plastic is polyether ether ketone (PEEK).

In certain embodiments, the end of the first portion of the insert is tapered.

In certain embodiments, the hollow space has a diameter greater than about 0.394 inches.

In certain embodiments, the second portion has an outer diameter greater than about 0.85 inches.

In certain embodiments, the insulating cable insert has a total length of about 2.2 inches.

Another aspect of the invention is a kit for providing insulating protection to a cut end of a conducting cable, the kit comprising: a) an insulating cable insert, the insert comprising a cylindrical body with a hollow space extending therethrough, the body having a first end portion configured to fit in the space between the core and the sheath of the cable and a second portion wider than the first portion configured to extend outward from the end of the sheath when the insert is installed; and b) a hollow drill bit configured to remove insulation from the space between the core and the sheath of the cable.

In certain embodiments, the kit further comprises a second hollow drill bit configured to polish the inner sidewall of the sheath of the cable.

In certain embodiments, the kit further comprises an epoxy resin for fixing the insert to the space between the cable sheath and the cable core.

In certain embodiments, the kit further comprises a clamp for providing pressure to the sheath and to the top of the insert when the insert is installed with an adhesive between the cable sheath and the cable core.

BRIEF DESCRIPTION OF THE DRAWINGS

The invention is described with reference to the accompanying figures in which:

FIG. 4A is a perspective partially exploded view of the layers of a mineral-insulated conducting cable C used in certain embodiments of the present invention.

FIG. 4B is a cross section taken across plane 4B of FIG. 2A.

FIG. 5A is a perspective view of the wye-splice 400 and detached wye splice cover 406 according to one embodiment of the present invention.

FIG. 5B is a perspective view of the same embodiment of FIG. 5A with the wye splice cover 406 (partially transparent in this view) installed against the end plate 402 of the wye splice 400.

FIG. 6A is a perspective view of a cable support adapter 501 according to one embodiment of the present invention.

FIG. 6B is a perspective view of a cable support adapter 501 installed at the up-hole end of a length of coiled tubing CT and showing cables C-1, C-2 and C-3 supported by the combination of a cable bundle clamp 511 and the cable support adapter 501.

FIG. 7A is a perspective view of a receptacle 600 which forms part of another embodiment of a cable support adapter.

FIG. 7B is an exploded view of a lateral extension clamp 620 which, together with the receptacle 600 of FIG. 7A, and the extension platform 640 of FIG. 7C forms part of an embodiment of a cable support adapter.

FIG. 7C is a perspective view of an extension platform 640 which, together with the receptacle 600 of FIG. 7A, and the lateral extension clamp 620 of FIG. 7B, forms an embodiment of a cable support adapter.

FIG. 8A is a perspective view of a cable bundle clamp 650 which together with the cable support adapter components of FIGS. 7A to 7C forms a temporary cable support assembly.

FIG. 8B is a top view of the cable bundle clamp 650 of FIG. 8A showing the central gripping member 656.

FIG. 8C is a perspective view of the central gripping member 656 of the cable bundle clamp 650.

FIG. 11A is a perspective view of one embodiment of a wedging tube 705 with longitudinal slots showing detail of its up-hole end.

FIG. 11B is a perspective view of the embodiment of the wedging tube 705 of FIG. 11A with equi-spaced longitudinal slots showing detail of its down-hole end.

FIG. 12A is a perspective view of a second embodiment of a wedging tube 725 with transverse slots showing detail of its up-hole end.

FIG. 12B is a perspective view of the wedging tube 725 of FIG. 12A with transverse slots showing detail of its down-hole end.

FIG. 13A is perspective view of a third embodiment of a wedging tube 745 with two sets of parallel transverse slots showing detail of its down-hole end.

FIG. 13B is an end view of the down-hole end of the wedging tube 745 of FIG. 13A with two sets of parallel transverse slots showing detail of its down-hole end.

FIG. 13C is a magnified view of the upper circle of FIG. 13B showing detail of the triangle tip 759*a* of wedging tube 745.

FIG. 14A is perspective view of a fourth embodiment of a wedging tube 765 with two sets of parallel transverse slots showing detail of its down-hole end.

FIG. 14B is an end view of the down-hole end of the wedging tube 765 of FIG. 14A with two sets of parallel transverse slots showing detail of its down-hole end.

FIG. 14C is a magnified view of the upper circle of FIG. 14B showing detail of the recessed triangle tip 779*a* of wedging tube 765.

FIG. 15A is a perspective view of a set of wedging tube segments 785*a*, 785*b* and 785*c* which, when assembled as shown in FIG. 15B form a fifth wedging tube embodiment.

FIG. 15B is a perspective view of the assembled fifth wedging tube embodiment.

FIG. 24A is a perspective view of an insulating cable insert 900.

FIG. 24B is a side elevation view of the insulating cable insert 900 of FIG. 24A with dotted lines showing the diameter of the hollow space 902.

FIG. 25 is a perspective view showing how the insulating cable insert 900 fits over the conducting core 302 and into the space which is formed between the core 302 and the cable sheath 306 after removal of the insulating layer of the cable. The arrow shows the direction of movement of the insulating cable insert 900 during installation with the tapered portion 904 facing downwards.

FIG. 26 is a side elevation view of a known arrangement of a coiled tubing injector 20 showing the injector drive 36 and coiled tubing gripper blocks 950*a*, 950*b*, 950*c*, 950*d* and 950*e*

FIG. 27 is a side elevation view of a coiled tubing injector 20 retrofitted for injection of cables (not shown), showing the injector drive 36 and cable gripper blocks 970*a*, 970*b*, 970*c*, 970*d* and 970*e* according to an embodiment of the present invention.

FIG. 29A is a perspective view of a cable gripper block 970*a*.

FIG. 29B is a top view of the cable gripper block of FIG. 29A showing the back wall 979 with a connector 981 attached thereto for connection to the injector drive mechanism (not shown). Also shown in this view are the three indentations 978*a*, 978*b*, and 978*c* which are used to grip the cables in combination with a second gripper block as shown in FIG. 28.

DETAILED DESCRIPTION OF THE INVENTION

Figure 1:
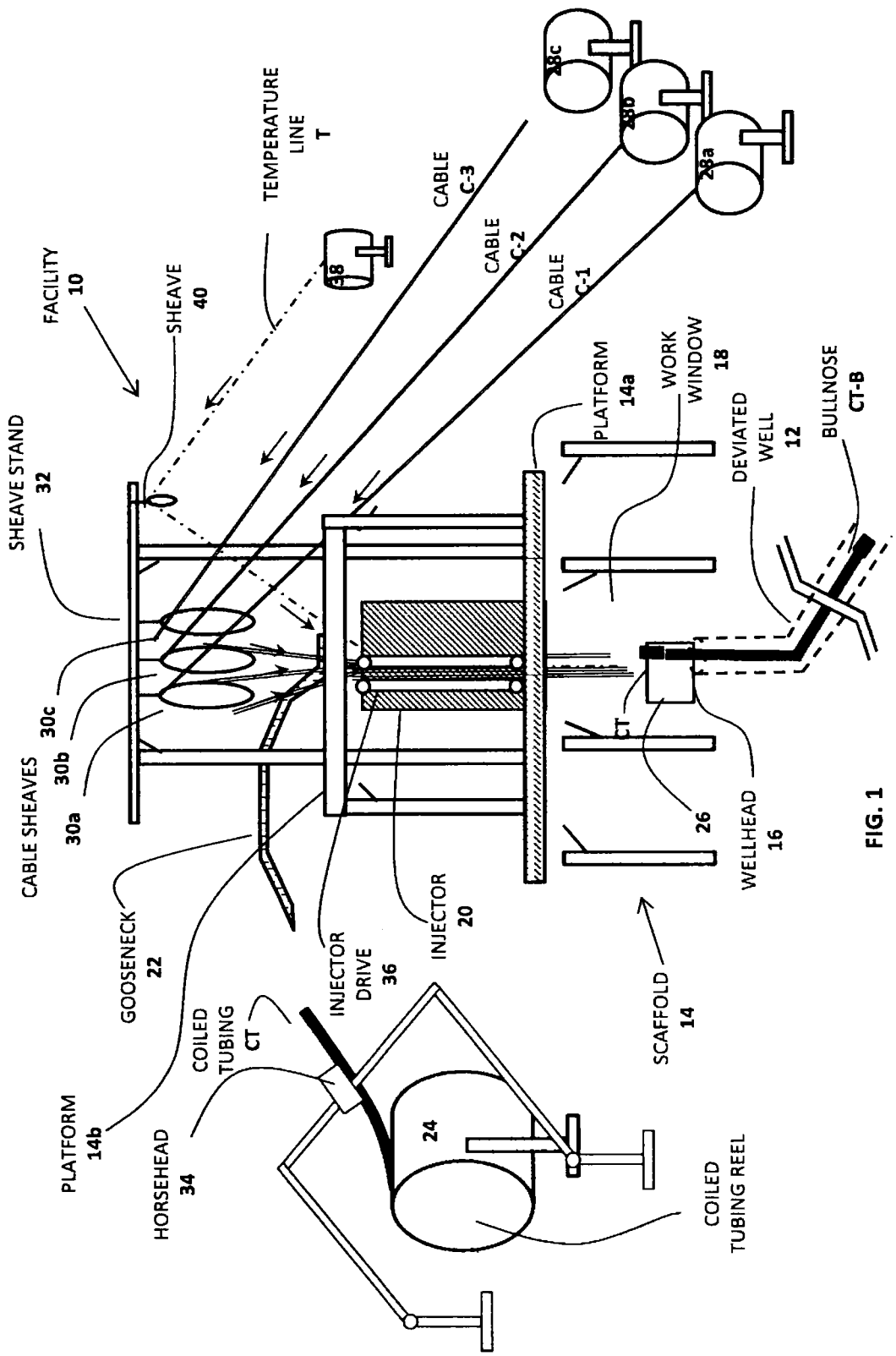
FIG. 1 is a schematic elevation view of an assembly facility 10 according to one embodiment of the present invention.

Various aspects of the invention will now be described with reference to the figures. For the purposes of illustration, components depicted in the figures are not necessarily drawn to scale. Instead, emphasis is placed on highlighting the various contributions of the components to the functionality of various aspects of the invention. A number of alternative features are introduced in context of certain aspects of the invention during the course of this description. It is to be understood that such alternative features may be substituted in various combinations to arrive at different embodiments of the present invention.

Operational and Assembly Overview

The invention generally relates to systems and methods for the assembly of down-hole electric heating systems within a previously-drilled well which is designed for the assembly of such heating systems. The electric heating systems or well heaters include specialized lengths of resistive heating cables that, after assembly and when deployed in a TAGD well (or in another well heating application), provide the means to electrically heat a reservoir to enhance the process of hydrocarbon recovery. Generally, the method of assembling the well heaters involves the sequenced insertion and assembly of well heater components within an assembly well and the subsequent removal of the assembled well heater from the assembly well for transportation to the site of deployment.

The assembly of a well heater within an assembly well includes a number of general steps. Each of these steps are conducted to ensure the safe handling of the well heater components and specifically to ensure that the weight of each of the well heater components are properly supported at surface to enable surface assembly operations to be completed.

a. a length of coiled tubing is run into the assembly well through a well head using a coiled tubing injector;
    b. the coiled tubing is supported at the well head using a conventional coiled tubing support system;
    c. the coiled tubing is cut above the coiled tubing support system and well head;
    d. a cable support adapter is attached to the upper end of the coiled tubing;
    e. the downhole ends of heater cables are electrically connected together at surface;
    f. the connected heater cables are drawn through the coiled tubing injector (which is retrofitted for injection of cables instead of coiled tubing) and run down within the coiled tubing to a desired distance (length) using the coiled tubing injector;
    g. a first temporary cable support system is engaged with the heater cables which protrude from the well head;
    h. the heater cables are cut above the temporary support system;
    i. the ends of the heater cables are protected with an insulated cable insert and configured for ultimate connection to the power supply at deployment;
    j. a second temporary support system and a permanent support system are engaged adjacent to the upper ends of the heater cables above the first temporary support system;
    k. the heater cables are lifted to enable removal of the first temporary support system;
    l. the heater cables are lowered to engage the permanent support system within the cable support adapter;
    m. the second temporary support system is removed;
    n. a protective cover is connected to the upper end of the cable support adapter to form an assembled well heater; and
    o. the assembled well heater is removed from the assembly well and spooled onto a coiled tubing reel for transportation.

Additional description relating to each of these steps is provided hereinbelow.

Overview of an Embodiment of a Well Heater Assembly Facility

In FIG. 1, there is shown a schematic view of one embodiment of a facility for assembly of well heaters. The components of the facility 10 are not drawn to scale but are instead drawn to emphasize certain features of the facility 10. Features of the finished well heater assembled using the facility 10 and process of the present invention are described in more detail hereinbelow. Advantageously in certain embodiments, the facility 10 is enclosed by a covering structure such as a shed or hangar (not shown) which provides shelter of the components of the facility from the elements. The facility therefore may be considered permanent or semi-permanent. However, it is possible to rapidly construct similar facilities with convenient access to geological formation sites which are to be heat-treated using well heaters and processes such as steam-assisted gravity drainage (SAGD) or in thermally-assisted gravity drainage (TAGD) for recovery of heavy oil or bitumen, as described, for example, in US Application No. 20120318512 (incorporated herein by reference in entirety). Such sites will typically require several well heaters to heat a geological formation and it is the purpose of the facility 10 to produce the well heaters in an efficient and reproducible manner to address this need.

The facility 10 is located at the site of a well 12 (in this particular embodiment, a deviated well) which in most cases would have been drilled prior to the construction of the facility 10 whereupon the drilling equipment is removed from the site prior to construction of the rest of the facility 10. The well 12 is hereinafter designated an "assembly well," most notably because it is for assembly of well heaters and not for recovery of hydrocarbons. In certain embodiments, when the lengths of the well heaters are relatively short (and the cumulative weight of the cables and coiled tubing is relatively light), a simple vertical assembly well may be used. In other facility embodiments, which are used to assemble longer well heaters, the cumulative weight of the cables is too great to allow them to simply hang in a vertical well and the force of gravity acting on the cumulative weight will result in excessive stress acting on the cable support system, possibly leading to deformation or breakage of components of the well heater and/or the support system. Therefore, in such embodiments, it is advantageous to use a deviated well, which reduces the force and stresses induced by gravity acting on the cumulative weight of the cables and coiled tubing. In certain embodiments, the deviation of the deviated assembly well 12 is by about 30 to about 50 degrees from vertical or by about 35 to about 45 degrees from vertical.

Advantageously, the well is lined with a casing cemented in place according to conventional methods. In certain embodiments, an additional casing liner (not shown) is provided to prevent damage to the casing which is expected to occur with the friction associated with repeated insertion and withdrawal of well heaters and components thereof. In certain embodiments, the casing liner is configured with a means for withdrawing it from the well casing so that it can be replaced. The casing liner may be formed of a material less durable than the coiled tubing material, (such as aluminum or plastic, for example) so that the coiled tubing structural integrity is maintained at the expense of the casing liner.

It is seen in FIG. 1 that a scaffold 14 is erected above the wellhead 16 of the deviated assembly well 12 to support certain components of the facility 10 as described below.

Advantageously, the scaffold 14 is assembled to provide a work window 18 to allow access of workers and equipment to the wellhead 16 for performance of various well heater assembly and maintenance tasks. In the particular embodiment shown in FIG. 1, the first platform 14a of the scaffold 14 supports a conventional coiled tubing injector 20. Shown within the body of the injector is the injector drive 36 to which gripper blocks are attached (not shown). Disposed above the injector 20 is a curved guide system known as a "gooseneck" 22. The function of the gooseneck 22 is to guide the coiled tubing CT into the injector 20 as it is being unwound from a coiled tubing reel 24. Another guide system known as the "horsehead" 34 is disposed above the coiled tubing reel 24 to guide the coiled tubing CT emerging therefrom.

In certain embodiments, the coiled tubing CT has an outer diameter (OD) of 2.875 inches and the thickness of the wall of the coiled tubing CT is 0.156 inches. These dimensions are compatible with the stresses imposed on the coiled tubing CT during the assembly process. It is advantageous to also provide a second scaffold platform 14b to facilitate access by operators to upper portions of the scaffold 14 which are described below.

In FIG. 1, the facility 10 is shown in a state after the coiled tubing CT has been injected into the deviated well 12 to its specified depth for assembly of a well heater to specified length. Furthermore, the coiled tubing CT has been cut and it is seen that one end extends upward from the wellhead 16 and the other remaining section of coiled tubing CT has been reeled back onto the coiled tubing reel 24 and now its cut end extends a short length outward from the horsehead 34. The downhole end of the coiled tubing CT is covered by a component known as a "bullnose" CT-B. The skilled person will recognize that a number of different cover designs may be used to cover the down-hole end of the coiled tubing and that such alternatives are within the scope of the invention. A conventional coiled tubing support means 26 such as a hand slip unit or a support ram (or both) is provided to hold the coiled tubing CT in place at the well head 16. This support means 26 is needed to prevent the cut end of the coiled tubing CT from falling down into the deviated assembly well 12 which may be significantly longer and deeper than the defined length of the coiled tubing CT. Even in cases where the bullnose CT-B reaches the bottom of the well, it is advantageous to employ a support means 26 to suspend the coiled tubing CT in order to reduce stresses on the coiled tubing CT and the cables C-1, C-2 and C-3 contained therewithin.

Three heater cables C-1, C-2 and C-3 are shown extending from corresponding heater cable reels 28a, 28b and 28c. In certain embodiments, these cables C-1, C-2 and C-3 are mineral insulated cables which will be described in more detail below, with reference to FIGS. 4A and 4B. In certain embodiments, the cables C-1, C-2 and C-3 each have an outer diameter of 0.85 inches. The skilled person will appreciate that while the example embodiments of the well heater described herein employ three cables, other arrangements are possible wherein one, two, or more than three cables are used. The skilled person can select appropriate coiled tubing sizes to accommodate different numbers of cables and adapt the other components of the facility to be compatible with such alternatives without undue experimentation.

Returning now to FIG. 1, as lengths of cables C-1, C-2 and C-3 are unwound from their respective cable reels, 28a, 28b and 28c they pass over respective cable sheaves 30a, 30b and 30c which hang from a sheave stand 32 connected to the scaffold 14 and forming an upper part thereof. The cables C-1, C-2 and C-3 then pass through the injector 20 and are guided by a series of cable gripper blocks (integrated with the injector) during the process of driving/injecting the cables C-1, C-2 and C-3 into the coiled tubing CT. The cable gripper blocks are different from conventional coiled tubing gripper blocks which have a single larger indentation for holding a single length of coiled tubing CT in place. These cable gripper blocks are described in more detail hereinbelow. Conventional coiled tubing gripper blocks are used when coiled tubing CT is injected into the deviated assembly well 12.

The cables C-1, C-2 and C-3 pass through the injector 20 and are routed into the coiled tubing CT. The coiled tubing CT thus acts as a protective cover for the cables C-1, C-2 and C-3 and forms an outer sidewall along the length of of the well heater.

In order to monitor the temperature of the assembled well heater, it is necessary to include at least one means of temperature measurement. In the example embodiment of FIG. 1, the facility 10 is provided with the ability to assemble a well heater having a single means of temperature measurement. However, in alternative embodiments, the facility may be modified to include one or more additional means of temperature measurement. This may be done by providing additional reels of temperature lines and clamping these additional lines to the cables. Customized clamps for this purpose may be designed and constructed by the skilled person without undue experimentation. The embodiment of the facility shown in FIG. 1 produces a well heater with a fiber optic cable acting as the single temperature line T. This fiber optic cable can be used for distributed temperature sensing. The purpose of a distributed temperature sensor is to record temperatures along the optical sensor line as a continuous profile and typically provides highly accurate temperature readings over very long distances.

In some cases, it may be appropriate to include only one means of temperature measurement, such as only a fiber optic line or only a thermocouple line. Such embodiments are within the scope of the invention.

In FIG. 1, it is seen that the temperature line T (illustrated with a dot-dashed line) is withdrawn from its reel 38 and passed through a sheave 40 prior to running it through the injector 20 alongside cable C-3. Advantageously, the temperature line T is clamped to one of the cables (not shown) at a plurality of vertical positions above the wellhead as the cables C-1, C-2 and C-3 are inserted into the coiled tubing CT. Advantageously, the length of the temperature line T is essentially the same as the length of the cables C-1, C-2 and C-3 in order to provide distributed temperature sensing measurements along the entire length of the cables C-1, C-2 and C-3.

In alternative embodiments, at least a second means of temperature measurement in the well heater is provided by a thermocouple line (not shown). In such embodiments, the facility is modified by adding an additional thermocouple line reel and sheave to produce such a well heater. The thermocouple sheave may also be supported by the sheave stand 32 in such alternative embodiments.

In alternative embodiments of the inventive facility, a conventional coiled tubing straightener of the type generally known in the art (not shown in FIG. 1) is provided above the injector 20 and connected to the injector 20, the scaffold 14 or the sheave stand 32. It is advantageous to employ a coiled tubing straightener because the coiled tubing CT retains "shape memory" curvature from its significant time spent residing on the coiled tubing reel 24. It is desirable to remove this curvature to give the coiled tubing CT a straight profile while it is being injected into the well 12.

In certain alternative embodiments of the inventive facility, in addition to a conventional coiled tubing straightener, there is also provided a cable straightener (not shown in FIG. 1) which operates according to the same functional principles as the coiled tubing straightener. The cables C-1, C-2 and C-3 also reside on their respective reels 28a, 28b and 28c for extended periods and retain shape memory curvature which should be minimized or eliminated before injection of the cables C-1, C-2 and C-3 into the well 12. The cable straightener is connected to the injector 20, the scaffold 24 or the sheave stand 32.

In embodiments of the facility that employ both a coiled tubing straightener and a cable straightener which reside above the injector, it is advantageous to provide a swivel means for one or the other. Advantageously, the coiled tubing straightener is disposed below the cable straightener and the cable straightener unit is provided with a swivel means that allows it to be moved away from the line of entry of coiled tubing CT into the injector 20 during the point in the assembly process when coiled tubing CT is being injected. When it is time in the process for the cables C-1, C-2 and C-3 to be injected, the cable straightener can then be replaced to its location above the injector 20 to straighten the cables C-1, C-2 and C-3 prior to their entry into the injector 20.

Figure 2:
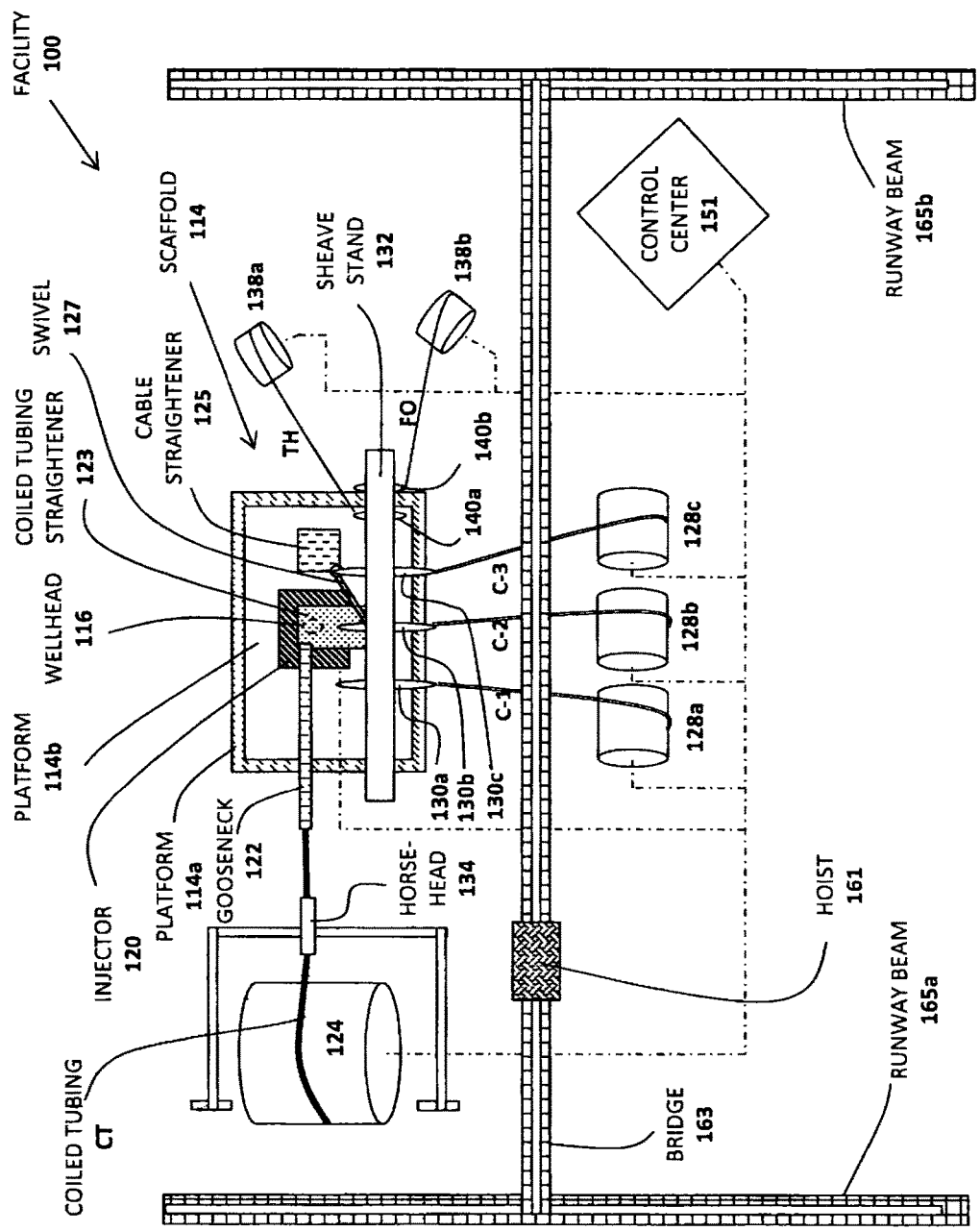
FIG. 2 is a schematic plan view of another embodiment of an assembly facility 100 in accordance with one embodiment of the present invention.

Another embodiment of the facility will now be described with reference to FIG. 2 which shows a plan view of the facility that includes some features which are not shown in FIG. 1. Likewise, certain features shown in FIG. 1 are omitted from FIG. 2 to preserve clarity. For ease of relating features of the facility embodiment of FIG. 2 to the features of the facility embodiment shown in FIG. 1, similar reference numerals in the 100 series are used. In FIG. 2, reference numerals indicating features not shown in FIG. 1 are identified by odd numbers in the 100 series.

In the plan view of FIG. 2, there is shown a facility 100 with a scaffold 114 disposed above the circumference of a wellhead 116. The scaffold 114 has a first platform 114a to allow access of operators to the injector 120 and a second platform 114b above the first platform 114a to allow access to other elevated components which will be described below.

A coiled tubing straightener 123 (one of the optional features not shown in FIG. 1) is located above the injector 120 and may be supported by the body of the injector 120, the scaffold 114 or the sheave stand 132. In this particular embodiment, a cable straightener 125 (another optional feature not shown in FIG. 1), is disposed above the coiled tubing straightener 123. The cable straightener 125 is shown to the left of the coiled tubing straightener 123 and connected by a swivel mechanism 127. The swivel mechanism 127 allows the cable straightener 125 to be moved directly over the injector 120 so that the cables C-1, C-2 and C-3 can be straightened immediately before they enter the injector 120.

The cable reels 128a, 128b and 128c are generally located centrally within the facility 100 and sufficiently close to their respective cable sheaves 130a, 130b and 130c to keep an adequate degree of tension on the cables C-1, C-2 and C-3. In some embodiments, the cable reels are disposed in a semi-circle pattern generally centered on the location of the coiled tubing injector rather than a straight row as shown in FIGS. 1 and 2.

This facility embodiment 100 includes means for installation of two temperature lines in a well heater during assembly of the well heater. The first temperature line is a thermocouple line TH which extends from thermocouple reel 138a and over sheave 140a prior to entry into the injector 120. The second temperature line is a fiber optic line FO which extends from fiber optic reel 138b and over sheave 140b alongside the injector 120 and into the coiled tubing CT.

Also shown in FIG. 2 is the coiled tubing reel 124 to the left of the scaffold and coiled tubing CT extending therefrom and passing through the horsehead 134 before extending to the gooseneck 122. The skilled person will appreciate that alternative embodiments will have the coiled tubing reel 124 to the right of the scaffold 114 and the temperature line reels 138a and 138b disposed to the left of the scaffold. However, it is advantageous to have the cable reels 128a, 128b and 128c disposed generally parallel with the coiled tubing injector 120 or in a semi-circle arrangement generally centered on the coiled tubing injector 120 although some angling of the cable reels 128a, 128b and 128c with respect to the longitudinal plane of the sheave stand 132 is permissible and may be determined without undue experimentation.

The embodiment of the facility 100 shown in FIG. 2 includes a control center 151 for computerized control and monitoring the rate of deployment of coiled tubing CT, cables C-1, C-2 and C-3 and temperature lines TH and FO from their respective reels 138a and 138b and for monitoring the rate of injection of the same components into the well (as indicated generally by the dot-dashed lines extending from the control center to the coiled tubing reel 124, injector 120, cable reels 128a, 128b and 128c and temperature line reels 138a and 138b. In certain embodiments, the control center is elevated with a scaffold (not shown) to allow the operator to visualize most or all of the equipment of the facility 100 while monitoring various parameters relating to assembly of the well heater on a computer monitor. In certain embodiments, the communication between the control center 151 and the various components described above is conducted wirelessly.

The embodiment of the facility 100 shown in FIG. 2 includes a gantry-type crane to move assembled and spooled well heaters from the spooling location to a delivery vehicle or to essentially any other location within the facility. The crane is also generally useful for moving any other heavy components within the facility 100. The components of the crane include the hoist 161 which moves across substantially the entire width of the facility along a bridge 163. The bridge extends between a pair of runway beams 165a and 165b and can move across substantially the entire length of the facility along the runway beams 165a and 165b. In this manner, heavy components may be hoisted from essentially any location and transported to essentially any location within the area of the facility 100.

In facility embodiments which include a covering structure such as a shed or hangar, it is advantageous to provide an access opening in the structure to allow access of large vehicles such as trucks or train cars into the facility for convenient transfer of reels containing assembled well heaters to the vehicles, as well as movement of heavy items to different locations within the facility.

Overview of Main Structural Features of the Cable Heater

Figure 3:
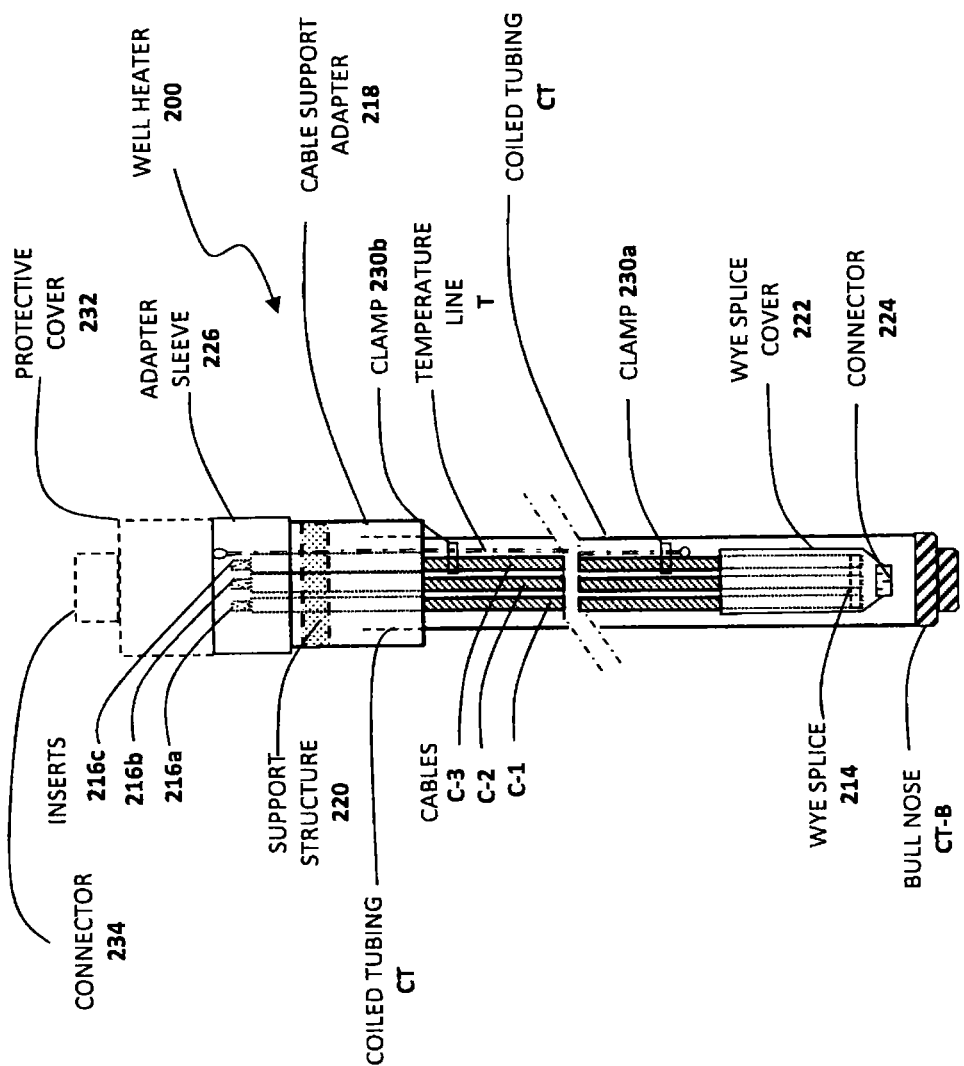
FIG. 3 is a schematic cross sectional view of a well heater 200 according to one embodiment of the invention.

In FIG. 3, there is shown a general schematic representation of an assembled well heater 200 according to one embodiment of the invention. For greater clarity, the components of well heater 200 are labelled using reference numerals in the 200 series, except for the cables which retain their designations C-1 C-2 and C-3, the temperature line, which retains its designation T and the coiled tubing and bullnose which retain their designations CT and CT-B, respectively (as introduced in FIG. 1). The well heater 200 includes an outer protective wall which is formed of coiled tubing CT. The "bullnose" CT-B is attached to the downhole end of the coiled tubing. Three mineral insulated cables C-1, C-2 and C-3 are contained within the coiled tubing CT. The cables C-1, C-2 and C-3 are of identical construction in this particular embodiment and will be described in more detail below.

The cables C-1, C-2 and C-3 are connected at the downhole end by a connection type known in the art as a "wye splice" 214. This wye splice arrangement 214 allows three-phase electrical power to be run through the cables C-1 C-2 and C-3, thereby generating heat through the electrical resistance at the resistive section of each cable (as described in detail below). Three-phase electrical power is a common method of alternating-current electric power generation, transmission, and distribution. It is a type of polyphase system and is the most common method used by electrical grids worldwide to transfer power. It is also used to power large motors and other heavy loads. A three-phase system is usually more economical than an equivalent single-phase or two-phase system at the same voltage because it uses less conductor material to transmit electrical power. The following description assumes the use of three-phase power, however, it is understood that other power profiles may be utilized. Other means for connecting the resistive heating cables at the downhole end may be employed in alternative embodiments.

In FIG. 3, it is seen that the wye splice 214 is protected by an insulated wye splice cover 222. The wye splice cover 222 is provided with a connector 224 which is used to connect the wye splice cover 222 to a threading assembly (not shown) used during assembly of the heater. During assembly, at surface, the threading assembly allows the down-hole end of the wye-splice 214 to be threaded through the top of the coiled tubing injector. The injector provides the driving force for inserting the cables C-1, C-2 and C-3 of the well heater into the well during the assembly process (described in detail below).

A generalized cable support assembly used for supporting the cables during assembly of the well heater 200 within the assembly well will now be briefly described. More specific embodiments of a cable support assembly will be described hereinbelow. The main foundational component of both the temporary and permanent cable support systems is a cable support adapter 218 which is permanently connected to the top of the coiled tubing CT by welding or other connection means. In certain embodiments the cable support adapter provides two main functions; (i) it provides an extension of the coiled tubing with an inner sidewall surface with sufficient tensile strength to support the weight of the cables by weight bearing frictional contact in a permanent cable support system; and (ii) it provides a surface appropriate for temporary vertical support of the weight of the cables by a cable bundle clamp. These two functions will be described in more detail hereinbelow.

Returning now to FIG. 3, it is seen that the cable support adapter 218 fits over the coiled tubing CT and is attached thereto by welding or other equivalent permanent attachment means. The cable support adapter 218 provides a customized termination of the upper end of the coiled tubing of the well heater 200 and has surfaces adapted for supporting a cable support structure 220 which holds the cables C-1, C-2 and C-3 in place against the inner sidewall of the cable support adapter 218 such that their combined weight is fully supported against the inner sidewall of the cable support adapter 218.

The top ends of the cables C-1, C-2 and C-3 are covered by insulated cable inserts 216a, 216b and 216c to prevent voltage leaks and degradation of the insulating layer of the cables C-1 C-2 and C-3. Free conducting cores of the cables extend from the tops of the inserts (not shown). With the installation of these insulated cable inserts 216a, 216b and 216c the cables are configured for connection to an electrical source (not shown). An example embodiment of the insulated cable inserts will be described in more detail hereinbelow in context of FIGS. 24 and 25.

In FIG. 3, it is further seen that the well heater 200 is provided with a temperature measurement line T. The temperature measurement line T can be a thermocouple line for making point temperature measurements or a fiber optic line configured for distributed temperature sensing. Advantageously, the temperature measurement line T is clamped to the bundle of cables C-1, C-2 and C-3 at intervals sufficient to prevent looping or tangling of the temperature measurement line T. In certain embodiments, several thermocouple lines of varying lengths are used to provide spot temperature measurements at several discrete locations along the length of the well heater 200. In certain embodiments, the well heater 200 includes a fiber optic line and several thermocouple lines so that both distributed temperature measurements and several spot measurements can be made by the fiber optic line and the thermocouple lines, respectively. In the embodiment shown in FIG. 3, for the purpose of clarity, only one temperature measurement line T is shown and is clamped to cable C-3 by clamps 230a and 230b. A distance of about 10-25 m typically provides appropriate spacing between clamps.

In FIG. 3, it is seen that the upper part of the assembled well heater 200 is covered by a sleeve 226 which fits over the cable support adapter 218. The top surface of the sleeve 226 is provided with a connector 234 for connecting to a retrieval system (not shown) as well as for connecting to a protective cover 232. The retrieval system allows the top portion of the well heater 200 to be threaded upwards and through the injector which, when run in reversal mode with coiled tubing gripper blocks, provides the force required to withdraw the well heater from the well for spooling onto a coiled tubing reel. The spooled well heater 200 is then ready for transport to its location of deployment.

Advantageously in certain embodiments, the assembled well heater 200 is spooled on a coiled tubing reel which has a start hole (not shown) for insertion of the up-hole end of the assembled heater, and a curved ramp (not shown) is connected to or integrally formed with the reel adjacent to the start hole on the emergent side of the start hole. The up-hole end of the assembled heater is pulled through the start hole and rides up on the curved ramp. This action gradually curves and prevents deformation of the portion of the assembled heater that is pulled through the start hole during the process of immobilizing the up-hole end of the well heater on the reel.

Resistive Heater Cables

In FIG. 4A there is shown a partially exploded perspective view of a single resistive heater cable C. A cross section of a portion of the cable C taken in plane 4B is shown in FIG. 4B. In FIGS. 4A and 4B, it can be seen that the cable C has a conducting core 302 formed of a conductor such as copper, for example. Other conductors may be used in alternative embodiments. The conducting core is surrounded by an insulator layer 304 comprised of a mineral insulator (such as magnesium oxide, for example). A sheath 306 formed of a relatively inert protective material such as stainless steel is provided over the insulator layer 304. The copper conducting core 304 is further defined by having at least one resistive core section 308 for generating heat at one portion of the cable C. If, for example, the conducting core 302 is formed of copper, a suitable material for the resistive core section 308 is a copper-nickel alloy, such as copper-nickel alloy 180 which functions as a resistive section. The skilled person will recognize that if the conducting core 302 is formed of another conducting material in alternative embodiments, a different compatible alloy should be selected to form the corresponding resistive section 308. The skilled person is to also understand that the length of the resistive section 308 is designed for placement at positions in the reservoir where heat is required.

The skilled person will recognize that the position of the resistive section 308 along the length of an individual well heater will depend upon various parameters such as the depth and horizontal extension of the drilled heater well, for example. Modeling of reservoirs and heaters may be performed to determine the optimal length of the resistive section 308 as well as its location along the length of an individual cable C (however, the location of the resistive section should be substantially identical for the three cables, for example, in the embodiment of the well heater shown in FIG. 3). In some embodiments, the resistive section 308 can be as long as about 2000 m. It is advantageous if the resistive section 308 does not extend into the wye splice because electrical current should run efficiently through this component. In some embodiments, a non-resistive section of about 5 to about 15 m in length is provided adjacent to the wye splice. Similarly, at the uphole end of a TAGD well where heating is not required, a non-resistive section corresponding to the vertical depth of the TAGD well (i.e. prior to the beginning of the deviated or horizontal portion of the well) may be provided.

Wye Splice

Figure 5C:
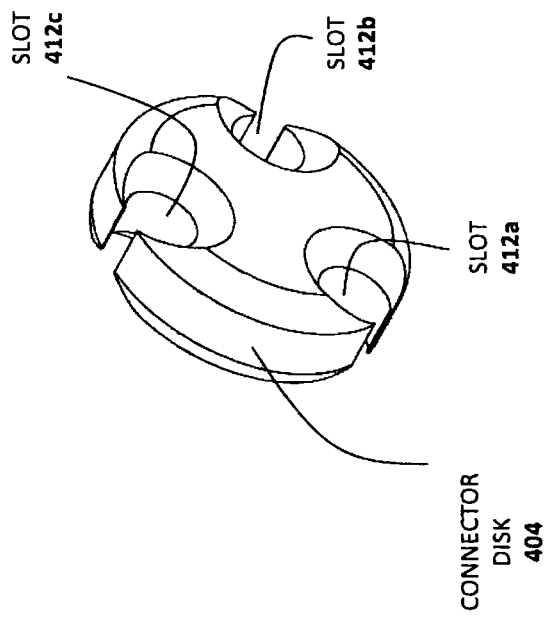
FIG. 5C is a perspective view of the connector disk 404 component of the wye splice 400 shown prior to installation.
Figure 5D:
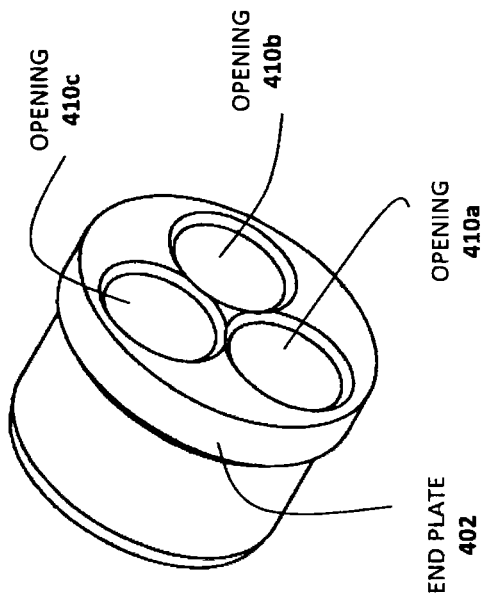
FIG. 5D is a perspective view of the end plate 402 component of the wye splice 400 shown prior to installation.

The structure of one particular embodiment of the wye splice (indicated in FIG. 3 by reference numeral 214) is shown in more detail in FIGS. 5A to 5D. This particular embodiment of the wye splice uses reference numerals in the 400 series along with the specific reference numerals referring to the specific cable components in FIGS. 4A and 4B in the 300 series. In the detail views shown in FIGS. 5A and 5B, of it is seen that the wye splice 400 serves to conductively connect each of the three cables C-1, C-2 and C-3. It is also seen that the ends of the cables are stripped down to their respective conducting cores 302a, 302b and 302c and connected to an end plate 402 (which is shown by itself in perspective view in FIG. 5D). The conducting cores 302a, 302b and 302c extend through respective openings 410a, 410b and 410c in the end plate 402 such that the sheath layers of the cables C-1, C-2 and C-3 make contact with the cable entry side of the end plate 402 (FIG. 5A). Advantageously, the end plate 402 is also formed or at least covered with an inert protective material which is the same as, or compatible with, the material used to cover or form the cable sheath (such as stainless steel), thereby allowing each of the cable sheaths to be welded to the contact surface of the end plate 402.

Another component herein designated the wye splice connector 404 (shown alone in perspective view in FIG. 5C) is then attached to the ends of the conducting cores 302a, 302b and 302c. In this particular embodiment, the wye splice connector 404 is in the shape of a disk with circular slots 412a, 412b and 412c to hold the conducting cores 302a, 302b and 302c in place during the process of attachment. Advantageously, the wye splice connector 404 is formed of the same conducting material as the conducting cores 302a, 302b and 302c, to facilitate attachment by welding for example. The wye splice connector disk 404 allows the three phase electrical current to be conducted through each of the three cables C-1, C-2 and C-3.

At this stage of the assembly process, the conducting cores 302a, 302b and 302c and wye splice connector disk 404 are exposed and in need of insulation to prevent electrical discharge. Advantageously, all surfaces of the exposed conducting cores 302a, 302b and 302c and the wye splice connector 404 are rounded and smooth to prevent such electrical discharges, which may be caused by surface irregularities. A wye splice cover 406 (shown in FIGS. 5A and 5B) in the form of a tubular sleeve closed at one end is fitted over the wye splice 400. The wye splice cover 406 makes contact at its open end with the surface of the end plate 404 from which the conducting cores 302a, 302b and 302c extend. Advantageously in this particular embodiment, the wye splice cover 406 also is formed of, or at least plated with, stainless steel so that it can be effectively welded to the stainless steel contact surface of the end place 402. The wye splice cover 406 has an opening 408 which is provided as a means for adding an insulating powder such as magnesium oxide to the space inside the wye splice cover. Thus, after attachment of the wye splice cover 406, insulating powder such as magnesium oxide is introduced through opening 408 to fully fill the cavity therein and provide insulation around each of the exposed conducting cores. Opening 408 is then sealed.

Overview of an Embodiment of a General Process for Assembly of Well Heaters

In furtherance of the general assembly description provided above, this section provides a brief overview of one example of assembly of a well heater which includes the components described hereinabove. Variations in the order of assembly are possible in alternative embodiments and these variations will be discussed in context of this example embodiment. The description of the components of the well heater refers to the components and reference numerals of FIG. 3.

In certain embodiments, the process of assembly may take place at a well heater facility such as, for example the facility described in FIG. 1 or FIG. 2. The equipment and features of the facility will be discussed in detail below.

In certain embodiments, the well heater 200 is assembled at a site that includes a pre-drilled assembly well which may be either a vertical well or a deviated well which deviates from vertical by about 30 degrees to about 50 degrees from the vertical. In other embodiments, the deviated well deviates from vertical by about 35 to about 45 degrees from the vertical. Various embodiments of the assembly well will include a combination of both vertical and deviated sections. The respective lengths of each section and the degree of deviation are generally designed such that the weights of the well heater components are at least partially supported by the sloping sides of the deviated section while enabling all components to be easily run into the well.

In the first step of this example process, which refers to component parts of the embodiment of the well heater illustrated in FIG. 3, a reel of conventional coiled tubing CT is provided and unspooled from the reel as needed. The coiled tubing CT is metal piping, which may range in diameter from 1 inch to 3.5 inches. In general, coiled tubing is typically used for interventions in oil and gas wells and sometimes as production tubing in depleted gas wells. In certain embodiments of the present process for assembling well heaters, the outer diameter (OD) of the coiled tubing is 2.875 inches.

The bullnose cover CT-B is connected to the free end of the coiled tubing CT. Welding is a convenient means of making such a connection.

After installation of the bullnose CT-B, the coiled tubing CT is injected into the well using a conventional coiled tubing injector. The injector is configured with gripper blocks that fit the size of coiled tubing being used. The length of coiled tubing CT injected will depend upon the total length of well heater 200 being constructed.

When the coiled tubing CT has been injected to its specified depth in the well, it is supported above the wellhead according to known methods using conventional coiled tubing slips and/or conventional support rams or both, and then cut from the coiled tubing reel, thereby forming a free open end. The cable support adapter 218 is then connected to the open top of the coiled tubing CT. The purpose of the cable support adapter 218 is to provide the foundation for the cable support structure 220 which holds the weight of the three resistive cables C-1, C-2 and C-3.

The coiled tubing CT and cable support adapter 218 are now ready for insertion of the cables C-1, C-2 and C-3. The cables C-1, C-2 and C-3 are provided on individual cable reels (See FIGS. 1 and 2). After unspooling of the cables C-1, C-2 and C-3 through the coiled tubing injector to a length sufficient to allow manual manipulation at an appropriate location in the facility, the wye splice 214 is constructed by welding the connector parts to ensure electrical conduction among the three cables C-1, C-2 and C-3. When the welding is complete, the wye splice 214 is provided with a cover 222 which may also be welded in place. As described above, in certain embodiments, the cover includes an opening (opening 408 shown in FIG. 5A), into which a powder-based insulator such as magnesium oxide can be added to prevent voltage leaks from the wye splice 214. The opening may be then sealed and welded in place. The wye splice cover contains a connector 224 for connecting a knuckle joint (not shown) which facilitates the threading of the wye splice cover 222 and the connected cables C-1, C-2 and C-3 through the injector for injection into the coiled tubing CT in the assembly well. In certain embodiments of this general process, the interior of the wye splice cover 222 is vacuum dried prior to sealing the opening 408.

Within the injector, the three cables C-1, C-2 and C-3 are placed within a set of cable gripper blocks for holding the three cables C-1, C-2 and C-3 in place for simultaneous injection into the coiled tubing. The custom-designed gripper blocks each have three indentations for holding three cables C-1, C-2 and C-3. Otherwise, the gripper block connector members are essentially identical to the analogous connector members used in the conventional coiled tubing gripper blocks and are conveniently interchangeable with the coiled tubing gripper blocks. An embodiment of cable gripper blocks will be described in more detail hereinbelow in context of FIGS. 27-29.

Returning now to FIG. 3, traveling along with the three cables C-1, C-2 and C-3 into the coiled tubing 210 is at least one temperature measurement line T which may be a thermocouple line or a fiber optic line. A thermocouple line is used for point temperature measurements and a fiber optic line is used for distributed temperature measurements. In certain embodiments, the well heater 200 includes both a thermocouple line and a fiber optic line in order to provide redundancy in the event of failure of one of the temperature measurement lines. In certain embodiments, the temperature measurement line T is clamped to one of the cables. Individual clamps such as clamps 230*a* and 230*b* may be provided at intervals ranging from about 10 m to about 25 m in order to prevent looping and tangling of the line as it travels along with the cables C-1, C-2 and C-3 into the coiled tubing CT.

After the three cables C-1, C-2 and C-3 have been injected to the specified depth within the coiled tubing CT, they are initially supported above the well head by the combination of the injector and the heater cable reels. In order to effectively transfer the weight of the cables to the coiled tubing to enable the heater cables to be cut, a first temporary support clamping assembly is connected to the cables C-1, C-2 and C-3, followed by connection of a second support clamping assembly which is movable and carries the permanent support components which are installed to form the permanent cable support structure 220. Embodiments of the temporary cable support systems and permanent cable support structure 220 will be described in detail hereinbelow in context of FIGS. 6-20.

Returning now to FIG. 3, after the permanent support structure 220 is in place, the exposed up-hole ends of the cables C-1, C-2 and C-3 are protected by a cover 232. Optionally in certain embodiments, a sleeve 226 may be connected to the adapter 218 prior to connection of the cover 232. The cover may be provided with a connector 234 for connection of tools used to withdraw the assembled well heater 200 from the well.

Overview of Cable Support Systems

All embodiments of the well heater assembly process include the step of injecting resistive heater cable(s) into coiled tubing in a vertical or deviated well. This process step provides various advantages relating to space requirements, efficiency and quality control as previously described, but also introduces new problems, such as a requirement for support of the cables as they hang within the coiled tubing in the well at the point in the assembly process before they are cut from their respective source cable reels. There is also a need to provide moveable support to the cables to enable an operator to lift, lower and fix the tops of the cables into place at the top of the coiled tubing. The cable support systems described hereinbelow have been developed to address these needs.

As noted above, the cable support system includes a "cable support adapter" which is exemplified by component 218 in FIG. 3. The purpose of the cable support adapter 218 is to modify the end of the coiled tubing so that it is capable of supporting the weight of the cables C-1, C-2 and C-3 before they are cut from their respective cable reels. The support provided by the cable support adapter 218 allows the cut ends of the cables C-1, C-2 and C-3 to be held in place and processed. After such processing, the cables C-1, C-2 and C-3 are then supported permanently by a support structure 220 which provides engagement to an inner portion of the cable support adapter. In fulfilling this function, certain embodiments of the cable support adapter 218 and support structure 220 provide an inner surface with sufficient tensile strength to allow the cables C-1, C-2 and C-3 to be wedged in a manner which provides support of the entire cumulative weight of the cables within the coiled tubing CT. Another function provided by the cable support adapter 218 is to provide a foundation for assembly of a laterally extended platform surface for supporting a cable bundle clamp. The skilled person will appreciate that a number of structural variations of cable support adapters 218 are possible which would fulfill the abovementioned functions. Example embodiments will be described hereinbelow.

In general terms, the second cable support system (not shown in FIG. 3) provides moveable support to the cables. It is is used to carry and lodge the permanent support structure 220 within the interior of the cable support adapter 218. Embodiments of the second cable support system and the permanent support structure are described in more detail hereinbelow with reference to FIGS. 11-20. Features provided by this secondary support structure include the provision of a foundation against the upper portion of the cables which allows for connection of a lifting means and also the provision of a foundation for connection of the permanent support structure.

Cable Support Adapter

As noted in general terms hereinabove, the cable support adapter provides the primary function of adapting the coiled tubing for supporting the cables in a temporary aspect and as a permanent feature. An important function of the cable support adapter is to provide an inner surface with sufficient tensile strength to support the weight of the cables by weight bearing frictional contact in a permanent cable support system. This is necessary because the inner surface of coiled tubing may not meet this requirement. Another feature of certain embodiments of the cable support adapter is to provide a temporary substantially flat and laterally extended platform surface to support a temporary cable bundle clamp which supports the cables temporarily while the cables are cut and processed prior to construction of the permanent support structure. This is needed because the upper rim of the coiled tubing is not expected to be strong enough to support the lower surface of a cable bundle clamp. When the cable bundle clamp is engaged to the bundle of cables, it is lowered along with the cables until its bottom surface rests upon the flat platform surface of the cable support adapter. This arrangement provides temporary cable support which enables the weight of the cables to be slacked off from the cable reels, allowing the cables to be cut therefrom.

A number of possible structural arrangements may be developed to fulfill these two main functions of providing an appropriate inner surface and a flat laterally extended platform surface for supporting a cable bundle clamp. In one embodiment shown in FIGS. 6A and 6B, there is provided a one-piece cable support adapter in the form of an open ended block which is connectable to the coiled tubing by welding or other means and has an inner surface with sufficient tensile strength to support the weight of the cables by weight-bearing frictional contact. This embodiment of the cable support adapter has an upper flat platform surface which is wider than the outer diameter of the coiled tubing. An example of such an embodiment of the cable support adapter is shown in FIG. 6. FIG. 6A shows a perspective view of the block-shaped cable support adapter 501 by itself and FIG. 6B shows a perspective view of the cable support adapter 501 attached to coiled tubing CT and with a cable bundle clamp 511 attached to the cables C-1, C-2 and C-3. It is seen in FIGS. 6A and 6B that the cable support adapter is a simple block with a cylindrical opening. It is possible to substitute a cylindrical shaped cable support adapter (not shown) for the block shaped cable support adapter, as long as the platform surface area is sufficient to support the cable bundle clamp. The inner sidewall 503 of the opening has sufficient tensile strength to support the weight of the cables by weight bearing frictional contact. The cable support adapter has an upper platform surface 505 which is wider than the outer diameter of the coiled tubing CT. This platform surface 505 provides support for the cable bundle clamp 511.

Another cable support adapter embodiment which is shown in FIGS. 7A to 7C with reference numbers in the 600 series. This cable support adapter system is constructed of a permanent component and two temporary components. Collectively, in this example, the three components, when assembled, are referred to as a cable support adapter. After the temporary components are removed, the remaining permanent component (receptacle 600) is also referred to as the cable support adapter. The main features of the cable support adapter 218 of FIG. 3 are generally similar to the main features of the receptacle 600 of FIG. 7A although additional features of the receptacle 600 are described in context of FIG. 7A. In this particular embodiment, the receptacle 600 provides an inner sidewall 602 with sufficient tensile strength to support the weight of the cables by weight-bearing frictional contact. The two temporary components are associated with the permanent component for the purpose of providing an upper laterally extended platform surface to support a cable bundle clamp (to be described with reference to FIG. 8). At the point in the well heater construction process when the upper platform surface and cable bundle clamp are no longer needed, the two temporary components are removed and the permanent component (in the present case the receptacle 600) remains in place. This is in contrast to the embodiment of FIG. 6 where the platform surface 505 provided by the block-shaped cable support adapter 501 remains permanently engaged to the coiled tubing CT.

Returning now to FIG. 7A, the permanent component is a cylindrical receptacle 600 which is configured for permanent attachment to the cut end of the coiled tubing by welding or other means. The receptacle 600 has an inner sidewall 602 with sufficient tensile strength to support the weight of the cables by weight bearing frictional contact when combined with additional permanent support components (which are provided by various embodiments of "wedging tube" embodiments which will be described in detail hereinbelow with reference to FIGS. 11-15). In this particular embodiment of the cable support adapter component shown in FIG. 7A, the receptacle 600 is provided with two sets of threads 604 and 606 on the upper portion of the outer sidewall of the receptacle 600. These threads 604 and 606 are used for connection of other cylindrical components which will be described in detail hereinbelow. The receptacle 600 is also provided with a circumferential groove 608 which in this particular embodiment, is approximately centered with respect to the length of the receptacle 600. The purpose of the circumferential groove 608 is to provide an engagement surface for one of the two temporary components of the cable support adapter which will be described in detail hereinbelow. The lower portion of the receptacle 600 terminates in a reduced diameter portion 610 which is inserted into the cut end of the coiled tubing, thereby providing a means of engagement of the receptacle to the coiled tubing. This means of engagement facilitates the process of permanently attaching the receptacle 600 to the coiled tubing, for example by welding.

Turning now to FIG. 7B, there is shown an exploded view of a first temporary component of the cable support adapter which is referred to herein as the lateral extension clamp 620. The purpose of this component is to provide a foundational flat surface which is laterally extended from the outer diameter of the receptacle 600. The lateral extension clamp 620 is formed of two C-shaped halves 622a and 622b of a main body which are connected together by a pin and washer set arrangement on the left side of the main body halves 622a and 622b and a bolt and washer arrangement on the right side of the main body halves 622a and 622b. The halves 622a and 622b of the lateral extension clamp 620 have inner surfaces radiused to match the outer diameter of the receptacle 600. These inner surfaces are each provided with ridges 624a and 624b which are matched to the circumferential groove 608 of the receptacle 600. When the lateral extension clamp 620 is clamped to the outer sidewall of the receptacle 600 (as shown in the exploded view of FIG. 9), the ridges 624a and 624b reside within the groove 608 and thus the lateral extension clamp 620 is provided with additional clamping support. As noted above, the lateral extension clamp 620 provides a foundational flat surface laterally extended from the outer diameter of the receptacle 600. This flat surface is constructed from the combination of surfaces 626a and 626b of the halves 622a and 622b of the lateral extension clamp 620 when it is clamped on the receptacle 600. Surfaces 626a and 626b combine to form a single flat surface to support the extension platform 640 (the second temporary component of the cable support adapter) whose features are highlighted in FIG. 7C. The arrangement of assembled components of the cable support adapter will be shown in more detail in FIGS. 8 and 9 which are described in detail hereinbelow.

Referring now to FIG. 7C, there is shown a second temporary component of the cable support adapter. This component is a C-shaped extension platform 640 whose purpose is to provide a platform surface 646 raised above the upper end of the receptacle 600 when the extension platform is in place resting upon the surfaces 626a and 626b of the lateral extension clamp 620. The extension platform 640 has a C-shaped base 642, a C-shaped support wall 644 and an upper C-shaped platform surface 646 which together define a slot 643. When the extension platform 640 is used as a temporary component of the cable support adapter, the cables reside within and extend upward from the slot 643 and the cable bundle clamp (described below) is placed on the platform surface 646. For convenience in transport of the extension platform, carrying handles 648a and 648b are attached to the cylindrical portion 644 of the extension platform 640. These handles 648a and 648b facilitate manual manipulation of the positioning of the extension platform 644, particularly at the point in the assembly process when the extension platform 644 is placed to position the exposed upper portions of the cables within the slot 643.

An embodiment of a cable bundle clamp appropriate for use with the cable support adapter embodiment of FIGS. 7A to 7C is shown in FIGS. 8A to 8C. FIG. 8A is a perspective view of the cable bundle clamp 650 in the assembled arrangement for storage (in the absence of the cable bundle itself) which includes a carrying bolt 651 to facilitate transport of the cable bundle clamp 650. It is to be understood that carrying bolt 651 is removed from the cable bundle clamp 650 when it is clamped to a bundle of cables (as will be seen in FIGS. 10 and 19, discussed hereinbelow). FIG. 8B is a top view of the cable bundle clamp in the assembled arrangement 650 after removal of the carrying bolt 651. FIG. 8C is a perspective view of a central gripping member 656 of the cable bundle clamp 650. It is seen in FIGS. 8A and 8B that this embodiment of the cable bundle clamp 650 is formed from two clamp blocks 652a and 652b with side plates 654a and 654b attached thereto by a set of bolts which extend completely through the clamp blocks 652a and 652b and the side plates 654a and 654b. The clamp blocks 652a and 652b are provided with inner surfaces which are shaped to conform to the outer walls of the cable bundle which is, for the purposes of the present embodiment, provided generally in a triangular shape. This embodiment of the cable bundle clamp also includes a central gripping member 656 (FIG. 8C) which is placed in the center of the cable bundle and cooperates with the clamp blocks 652a and 652b to grip the cable bundle in a consistent configuration along the entire length of the cable bundle clamp 650, thereby preventing deformation and/or damage to the cables. The central gripping member 656 is provided with three radiused outer surfaces which are shaped to conform to the outer walls of the cables. Similar gripping threads may also be provided on the cable-contacting surfaces of the clamp blocks 652a and 652b (not shown).

It is seen in the top view of the cable bundle clamp 650 of FIG. 8B that the clamp blocks 652a and 652b have interior surfaces shaped to conform to the outer walls of the cable bundle, which in this particular embodiment, is arranged in a triangular pattern. Other geometric arrangements are possible in alternative embodiments which may employ more or fewer cables. Clamp block 652a has a single large radiused surface portion 653a configured to accommodate a single cable (in cooperation with the central gripping member 656) and clamp block 252b has two large radiused surface portions 653b and 653c, each configured to accommodate an additional cable (in cooperation with the central gripping member 656). In addition, the inner surface of clamp block 652a has two additional smaller radiused portions, 655a and 655b each provided to allow passage of a temperature line (not shown) through the cable bundle clamp 650. As the temperature lines are supported by clamping to the cables, it is not necessary for the cable bundle to grip them and the smaller radiused portions 655a and 655b therefore provide passageways for the temperature lines without gripping.

Figure 9:
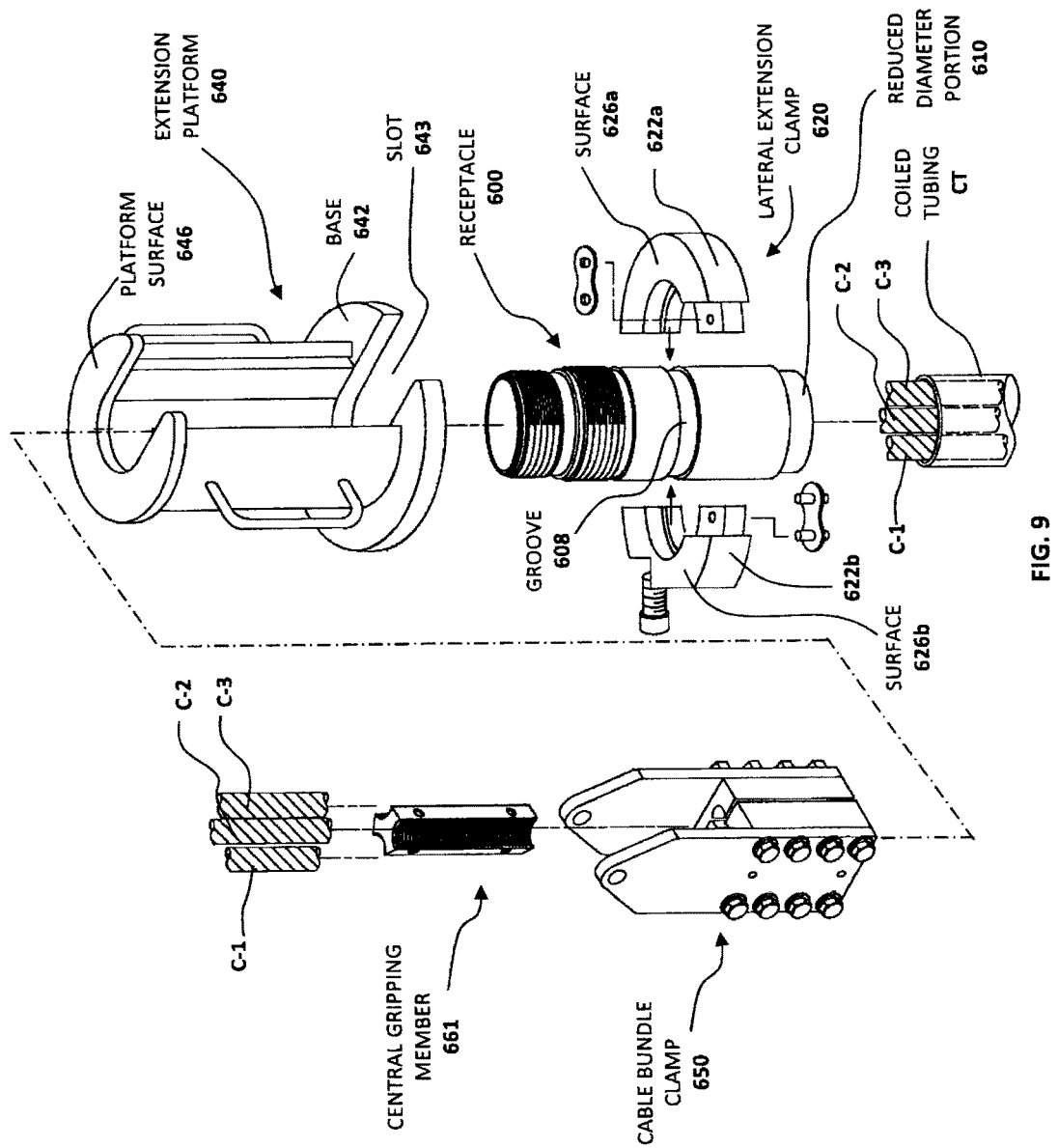
FIG. 9 is an exploded view of the temporary cable support assembly formed of the components of FIGS. 7 and 8.
Figure 10:
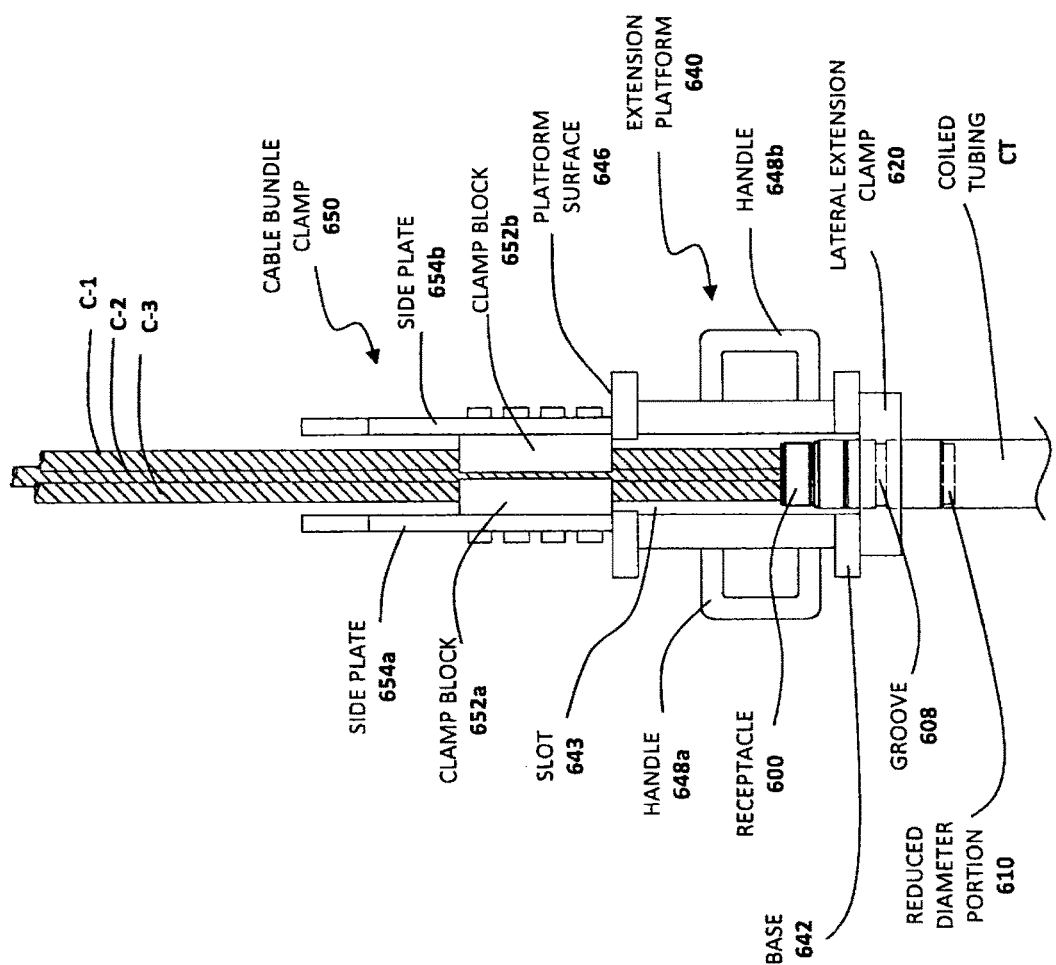
FIG. 10 is a side elevation view of the temporary cable support assembly formed of the components of FIGS. 7 and 8.

For greater clarity, the assembly of the cable support adapter and the cable bundle clamp is now described with reference to the exploded perspective view of FIG. 9 and the side elevation view of FIG. 10. The reduced diameter portion 610 of the receptacle 600 is placed inside the upper end of the coiled tubing and then the receptacle 600 is welded to the coiled tubing CT. The cables C-1, C-2 and C-3 are injected into the coiled tubing CT. The lateral extension clamp 620 is assembled with the ridges 624a and 624b of the halves 622a and 622b of the lateral extension clamp placed in the groove 608 of the receptacle 600. When the lateral extension clamp 620 is assembled and bolted onto the receptacle 600, surfaces 626a and 626b form a single upper surface. The extension platform 640 is then added to the assembly by placing its base 642 on the upper surface of the lateral extension clamp 620 with the receptacle 600 and cables C-1, C-2 and C-3 residing in the slot 643 of the extension platform 640. At this stage, the construction of the cable support adapter is complete. The cable support adapter includes the receptacle 600 as a permanent component and the lateral extension clamp 620 and extension platform 640 as temporary components. The completion of the cable support adapter with the temporary components installed allows the cable bundle clamp 650 to be installed and supported. This is done by placing the central gripping member 656 in the middle of the cable bundle which is comprised of cables C-1, C-2 and C-3 and then the clamp blocks 652a and 652b and respective side plates 654a and 654b are bolted together with the series of bolts. When the cable bundle clamp 650 is securely fastened to the cables C-1, C-2 and C-3, they are then lowered further into the coiled tubing until the bottom surfaces of the clamp blocks 652a and 652b rest upon the platform surface 646 of the extension platform 640. The lowering action may be provided by the action of the coiled tubing injector (such as injector 20 of facility 10 (FIG. 1) or such as injector 120 of facility 100 (FIG. 2), for example. Importantly, at this stage, there is enough room between the down-hole ends of the cables (wye splice) and the sealed bottom of the coiled tubing CT to accommodate this downward movement of the cables. Once the cable bundle clamp 650 rests upon the platform surface 646, the weight of the cables C-1, C-2 and C-3 can be transferred from the cable reels to the cable bundle clamp 650 and cable support adapter. Providing slack to the cables above the cable bundle clamp 650 transfers the weight of the cables C-1, C-2 and C-3 to the cable bundle clamp 650 and the cable support adapter, thereby allowing the cables C-1, C-2 and C-3 to be cut and processed.

The embodiment of the cable support adapter described with reference to FIGS. 7-10 (which includes a single permanent component and two temporary components) has certain advantages over the single piece cable support adapter embodiment of FIG. 6. Most notably, the cable support adapter embodiment of FIGS. 7-10 retains a narrow cylindrical profile which allows the assembled cable heater to be withdrawn from the well using the coiled tubing injector after the temporary lateral extension clamp and extension platform are removed. The embodiment of FIG. 6 would likely encounter problems in such a process its upper block profile, would likely not likely fit through the injection mechanism of most conventional coiled tubing injectors. However, the embodiment of FIG. 6 would otherwise be useful if some alternative means was employed to withdraw the assembled cable heater from the well.

Materials from which any or all of the embodiments of the components of the cable support adapter may be formed include steel and other similar alloys with and without coatings, which may be selected by the skilled person without undue experimentation.

Permanent Cable Support System

With the provision of the cable support adapter and cable bundle clamp described above, the cables can be cut from their respective reels. The resulting structure can be seen in the side elevation view of FIG. 10, wherein the coiled tubing containing the cables is now modified in order to construct a permanent cable support system. The permanent cable support system is based upon the principle of adding a wedging member in the shape of a tube (each embodiment of the wedging member described below is hereinafter referred to as a "wedging tube") to the space between the inner side wall of the cable support adapter and the outer sidewalls of the cables such that the inner shaped surfaces of the wedging tube grip the cables and the outer curved sidewall of the wedging tube frictionally engages the inner side wall of the receptacle/cable support adapter. Such a process would be relatively simple to perform manually if the cables were relatively short and light. In such a simple case, the wedging tube could be inserted over cables, thereby allowing the cables to be gripped and lowered until the wedging tube becomes engaged against the cables and the inner side wall of the cable support adapter. However, certain embodiments of the well heater described herein have cables which are thousands of meters long. In such cases, the collective weight of the cables is too heavy to permit manual manipulation and a mechanical power lifter is needed to raise and lower the cable bundle during the process of engaging the wedging tube with the inner side wall of the cable support adapter.

To address this problem, an assembly referred to herein as the "wedging tube carrier" has been designed. The wedging tube carrier is attached to the cable bundle and provides two main functions; (i) it serves to hold the wedging tube during the process of inserting it into the cable support adapter and (ii) it provides a foundation for a lifting attachment to allow connection to a mechanical power lifter for raising and lowering the wedging tube carrier and the cables so that the wedging tube can be placed into the cable support adapter for permanent support of the cables by the combination of the cable support adapter and the wedging tube.

The features of a number of example embodiments of wedging tubes will now be described with reference to FIGS. 11-15 wherein the components associated therewith are assigned reference numerals in the 700 series.

In FIGS. 11A and 11B, there are shown opposing perspective views of a first embodiment of a wedging tube 705 which is of generally tubular construction with an end plate 707 (shown in detail on the right end of the perspective view of FIG. 11A which indicates the "up-hole" end of the wedging tube 705) defined by three large openings 709a, 709b and 709c, each provided to allow passage of a single cable of a bundle of three cables (not shown in FIGS. 11A and 11B). The outer diameter of the end plate 707 is greater than the diameter of the outer sidewall 713 of the wedging tube 705 and as a result, the end plate 707 is defined by an outer lip 708 whose function will be discussed in detail hereinbelow, with respect to the operation of the wedging tube carrier (shown in FIGS. 17 and 18). The openings 709a 709b and 709c have identical diameters which are slightly greater than the outer diameter of each of the identical cables. The end plate 707 also has two additional openings 711a, 711b for passage of temperature lines such as the previously discussed thermocouple and/or fiber optic lines. The diameter of each of the openings 709a 709b and 709c and the diameters of the smaller openings 711a and 711b are maintained in the interior of the wedging tube 705 as shown more clearly at the right end of the view shown in FIG. 11B which indicates the "down-hole" end of the wedging tube 705. As a result, the wedging tube 705 has an interior structure defined by three large circular sidewalls and two smaller circular sidewalls which allow passage of cables and temperature lines, respectively. For the sake of clarity and although the interior structure of the wedging tube 705 is interrupted by the presence of longitudinal slot openings as described hereinbelow, the entire interior surface of the wedging tube 705 is referred to as interior sidewall 718.

Wedging tube 705 has an outer sidewall 713 defined by four equi-spaced longitudinal slots 715a, 715b, 715c and 715d which are open at the down-hole end and which terminate in semi-circular ends near the end plate 707. These slots extend through the tube body to the inner circular sidewall 718. The purpose of the longitudinal slots 715a, 715b, 715c and 715d is to confer compressibility to the main body of the wedging tube 705. This compressibility allows the wedging tube 705 to be placed inside the cable support adapter (e.g. receptacle 600 of FIG. 7A) such that its outer sidewall 713 compresses against the inner sidewall 602 of the receptacle 600 and its discontinuous curved inner sidewall 718 compresses against the bundle of cables, thereby providing gripping action to the outer sidewalls of each of the cables. This action wedges and supports the entire weight of the cables inside the receptacle 600 as they hang within the coiled tubing in the assembly well. The skilled person will recognize that any significant variation in the lengths and widths of the slots 715a, 715b, 715c and 715d will have an effect on the compressibility of the sidewall of the wedging tube 705. For example, wider and/or longer slots will generally increase the compressibility of the wedging tube 705 and narrower and/or shorter slots will generally decrease the compressibility of the wedging tube 705. In addition, variations of the features of the shaped inner sidewall 718 which will be described with respect to alternative embodiments, also will vary the compressibility. These parameters may be varied in various embodiments of the invention to provide a more rigid or more compressible wedging tube as needed in various embodiments of well heaters constructed using the methods described herein.

Shown in FIGS. 12A and 12B is another embodiment of the wedging tube 725 in opposing perspective views similar to the views shown in FIGS. 11A and 11B. This embodiment has a number of features similar to those of the wedging tube embodiment 705 of FIGS. 11A and 11B, including a similar end plate 727, end plate lip 728, openings for cables 729a, 729b and 729c, openings for temperature lines 731a and 731b and outer sidewall 733. One difference however is that three transverse slots 735a, 735b and 735c are provided in the body of this wedging tube 725 in contrast to the four longitudinal slots 715a, 715b, 715c and 715d of the wedging tube embodiment 705 of FIGS. 11A and 11B. The equi-spaced transverse slots 735a, 735b and 735c slice across the cylindrical solid tube body and define a triangular inner solid body portion 739 which occupies the majority of the inner volume of the wedging tube 725. The inner sidewall 738 of wedging tube 725 is therefore different from the inner sidewall 718 of wedging tube 705 of FIG. 11B. The skilled person will recognize that a comparison of FIG. 11B with FIG. 12B indicates that the solid wedging tube body of wedging tube 725 occupies more volume than that of wedging tube 705 and thus is less compressible than the tube body of wedging tube 705.

A variation of the wedging tube embodiment of FIGS. 12A and 12B is shown in FIGS. 13A, 13B and 13C. FIG. 13A is a perspective view of a wedging tube 745 with detail of its down-hole end shown. FIG. 13B is a direct view of the down-hole end of the same wedging tube 745. FIG. 13C is an expanded view of the upper circle shown in FIG. 13B. This wedging tube 745 has a number of features similar to those of the previous embodiments including an end plate 747 with an extending lip 748, an outer sidewall 753, openings 749a, 749b and 749c for cables, and openings 751a and 751b for temperature lines. A major difference however, is the presence of two parallel sets of three transverse slots 755a, 755b, 755c, 755d, 755e, and 755f. The effect of these extra slots is to reduce the solid volume of the interior of the tube (relative to that of wedging tube 725). The inner triangle of this solid volume which is formed by slots 755b, 755c and 755e (see FIG. 13B) is less than that of wedging tube 725. Thus, the wedging tube 745 of the present embodiment is more compressible than that of wedging tube 725. The triangle tips 759a, 759b and 759c of the solid interior volume reach the circumference of the outer sidewall 753 in contrast to the next embodiment described hereinbelow.

A variation of the wedging tube embodiment of FIGS. 13A-13C is shown in FIGS. 14A-14C. FIG. 14A is a perspective view of a wedging tube 765 with detail of its down-hole end shown in a manner similar to FIG. 13A. FIG. 14B is a direct view of the down-hole end of the same wedging tube 765. FIG. 14C is an expanded view of the upper circle shown in FIG. 14B. Most of the features of wedging tube 765 are similar to those of the previously described wedging tube embodiment 745. Wedging tube 765 has an end plate 767 with an extending lip 768, an outer sidewall 773, openings 769a, 769b and 769c for cables, and openings 771a and 771b for temperature lines. Wedging tube 765 also has two parallel sets of three transverse slots 775a, 775b, 775c, 775d, 775e, and 775f to reduce the solid volume of the interior of the tube. The inner triangle of this solid volume which is formed by slots 775b, 775c and 775e (see FIG. 14B) is similar to that of wedging tube 745 with the exception that the triangle tips 779a, 779b and 779c are recessed and do not extend to the circumference of the outer sidewall 773. This has the effect of making wedging tube 765 of the present embodiment more compressible than wedging tube 745.

Another wedging tube embodiment is shown in FIGS. 15A and 15B. It is seen that this particular wedging tube embodiment is formed from three separate wedging tube segments 785a, 785b and 785c. It is illustrated in FIG. 15A that each of the segments 785a, 785b and 785c includes a corresponding end plate portion 787a, 787b and 787c, end plate lip portion 788a, 788b and 788c, outer sidewall 793a, 793b and 793c and scalloped inner sidewall 798a, 798b and 798c. When the three wedging tube segments 785a, 785b and 785c are assembled as shown in FIG. 15B, the scalloped inner sidewalls 798a, 798b and 798c cooperate to form the cable openings 789a, 789b and 798c. The openings for the temperature lines 791a and 791b are located in segments 785a and 785b, respectively. The skilled person will recognize that this wedging tube embodiment, being formed of three separate parts which may move with respect to each other while the wedging tube is being manipulated, has the effect of reducing the overall rigidity of the tube.

The skilled person will appreciate that while each of the wedging tube embodiments described hereinabove includes a provision for two temperature lines, alternative wedging tube embodiments may include only one temperature line opening or more than two temperature line openings. Such alternatives are within the scope of the invention. In addition, the various features of the five wedging tube embodiments described hereinabove may be provided in various combinations to produce additional wedging tube embodiments. Appropriate alternative embodiments may be selected by the skilled person and are also within the scope of the invention.

Figure 16:
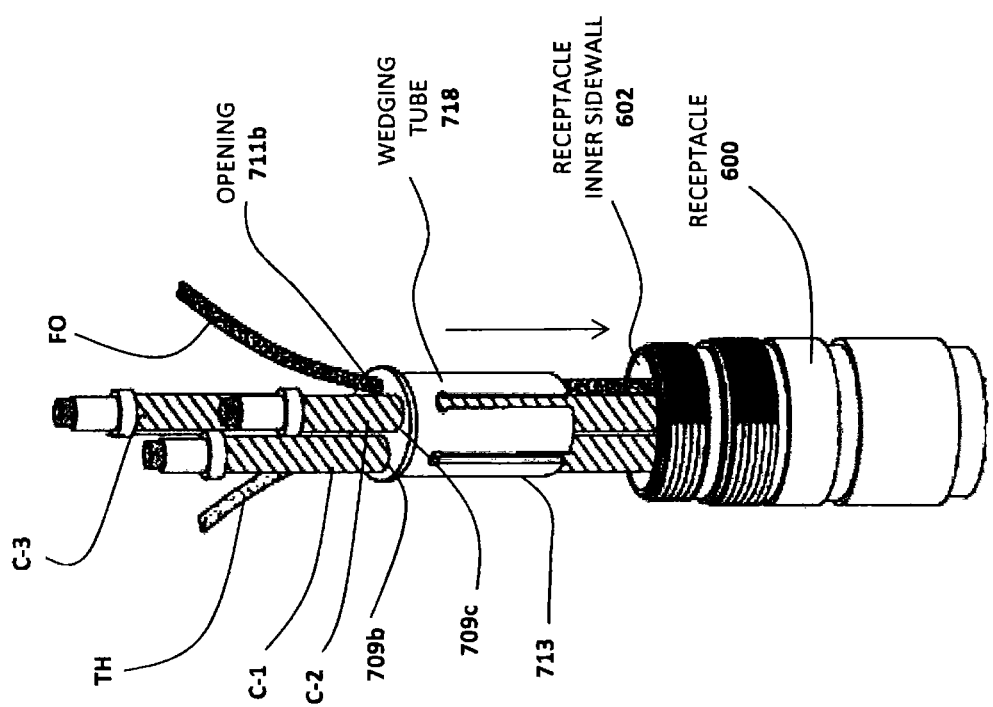
FIG. 16 is a partially exploded view showing the arrangement of the wedging tube 705, cables C-1, C-2 and C-3, thermocouple line TH and fiber optic line FO prior to insertion into the receptacle 600. The arrow shows the direction of insertion.
Figure 17:
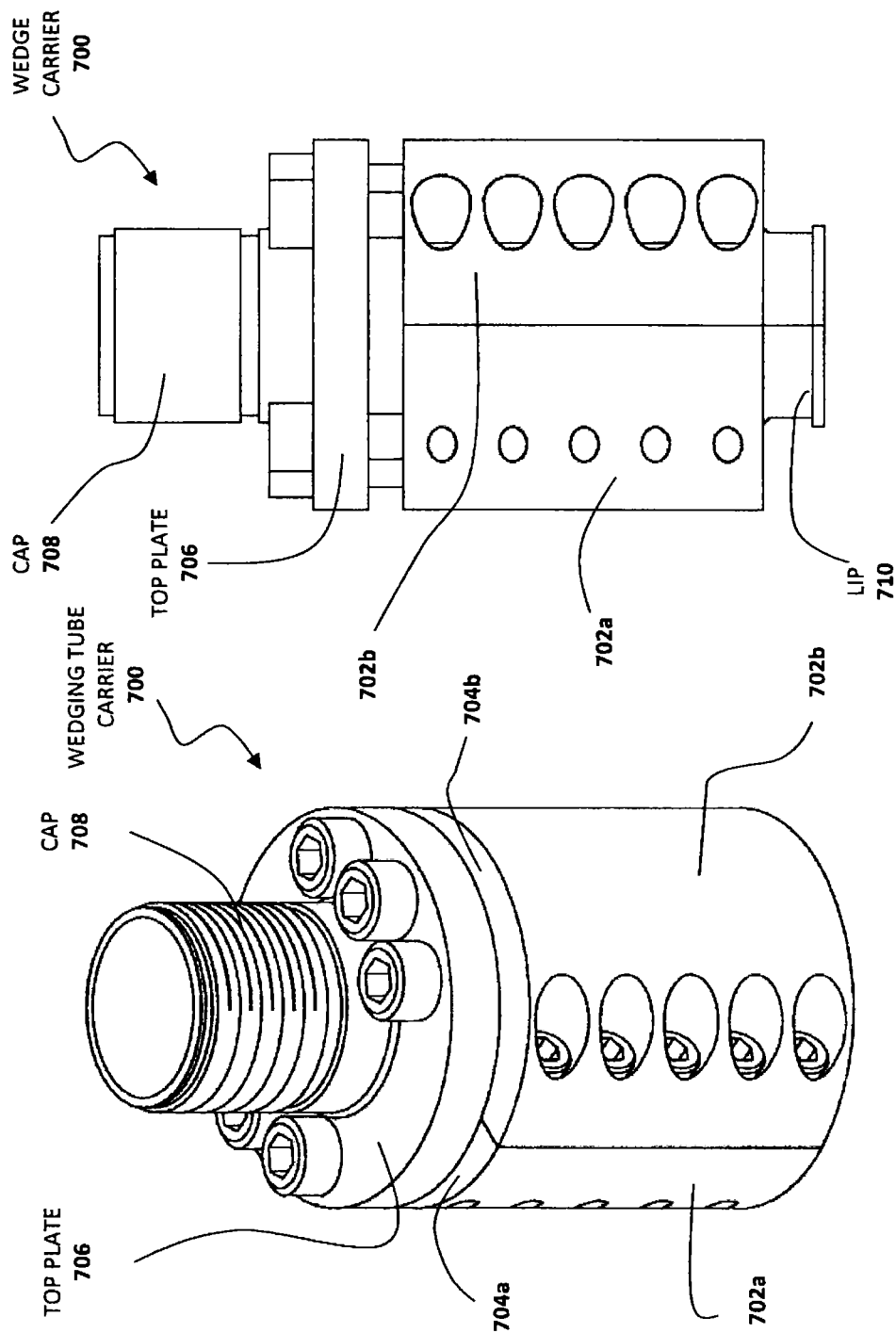
FIG. 17A is a perspective view of the assembled wedging tube carrier 700.
FIG. 17B is a side elevation view of the wedging tube carrier 700 showing the lower lip 710 which is used as a point of connection to a wedging tube (not shown).

FIG. 16 illustrates a partially exploded perspective view of some of the important features of the permanent components of one embodiment of the cable support adapter, including the receptacle 600, wedging tube 705, cables C-1, C-2 and C-3 and temperature lines TH and FO. The skilled person will recognize that the alternative wedging tube embodiments described hereinabove will operate in a similar manner in fulfilling the function of supporting the cables C-1, C-2 and C-3. The cables fit into respective openings in the wedging tube 705 (with only openings 709b and 709c visible from the perspective shown) and with the fiber optic line FO extending out of opening 711b and the thermocouple line TH extending out of opening 711a (although the latter is hidden from view in this perspective view). During the process of constructing the permanent cable support assembly, the wedging tube 705 is pushed down into the receptacle 600 and the outer curved sidewall 713 engages with the inner sidewall 602 of the receptacle 600 to provide substantial weight-bearing frictional support for the cables C-1, C-2 and C-3.

In certain embodiments, either the receptacle inner sidewall 602 or the outer curved sidewall 713 of the wedging tube 705, or both are tapered inward to enhance the wedging action which holds the wedging tube 705 tightly against the inner sidewall 602 of the receptacle 600, thereby supporting the cables C-1, C-2 and C-3 in place within the coiled tubing (not shown). The degree of tapering appropriate for various embodiments of the well heater may be determined by the skilled person without undue experimentation.

A perspective view of one embodiment of a wedging tube carrier 700 is shown in FIG. 17A and a side elevation view of the same embodiment is shown in FIG. 17B. This embodiment of the wedging tube carrier 700 has a main hollow body constructed of two cylinder halves 702a and 702b which are held together by a series of five bolts as shown (see also the exploded view of the main hollow body in FIG. 18). Alternative embodiments may have a main body with a shape other than a cylinder and may use a different number of bolts or different type of attachment mechanism. Also shown in FIGS. 17A and 17B is a top plate 706 with a threaded cap 701 which is bolted to the top of the assembled main body by pairs of opposite bolts as shown. The purpose of the threaded cap 701 is to provide a means for attachment of a lifting head which will be described in more detail hereinbelow with reference to FIG. 18. An important function of the wedging tube carrier is provided by its lower lip 710 which is seen in the side elevation view of FIG. 17B. The lip 708 of the wedging tube 705 (for example) is coupled to the lower lip 710 of the wedging tube carrier 700 by a wedging tube clamp as described in more detail hereinbelow with reference to FIG. 18.

Figure 18:
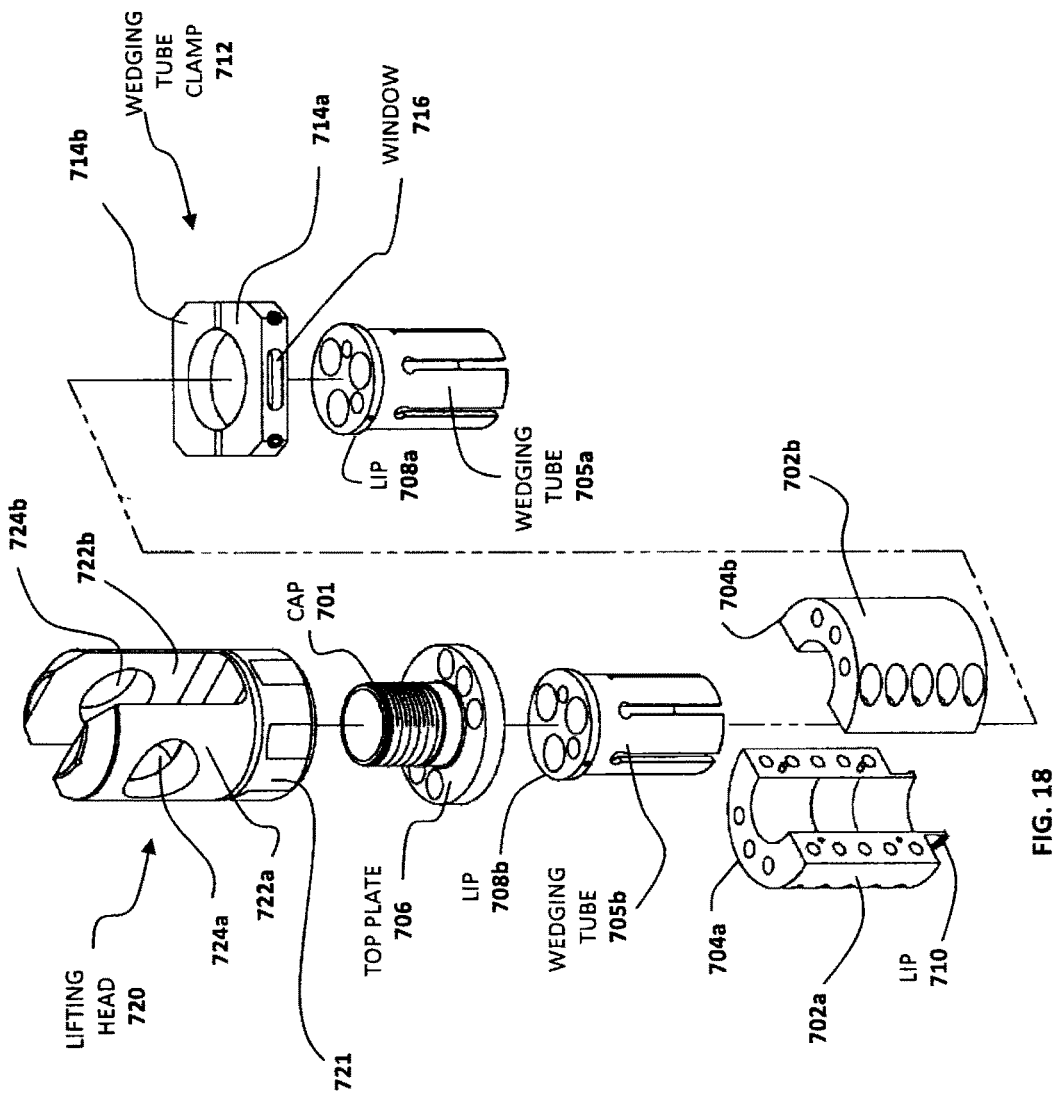
FIG. 18 is an exploded view of the components of the wedging tube carrier 700 and other components associated therewith, as used during the process of inserting the wedging tube 705 and cable bundle (not shown) into the receptacle (not shown). Two wedging tubes 705*a* and 705*b* are used with wedging tube 705*b* being connected to the lip 710 for insertion into the receptacle.
Figure 19:
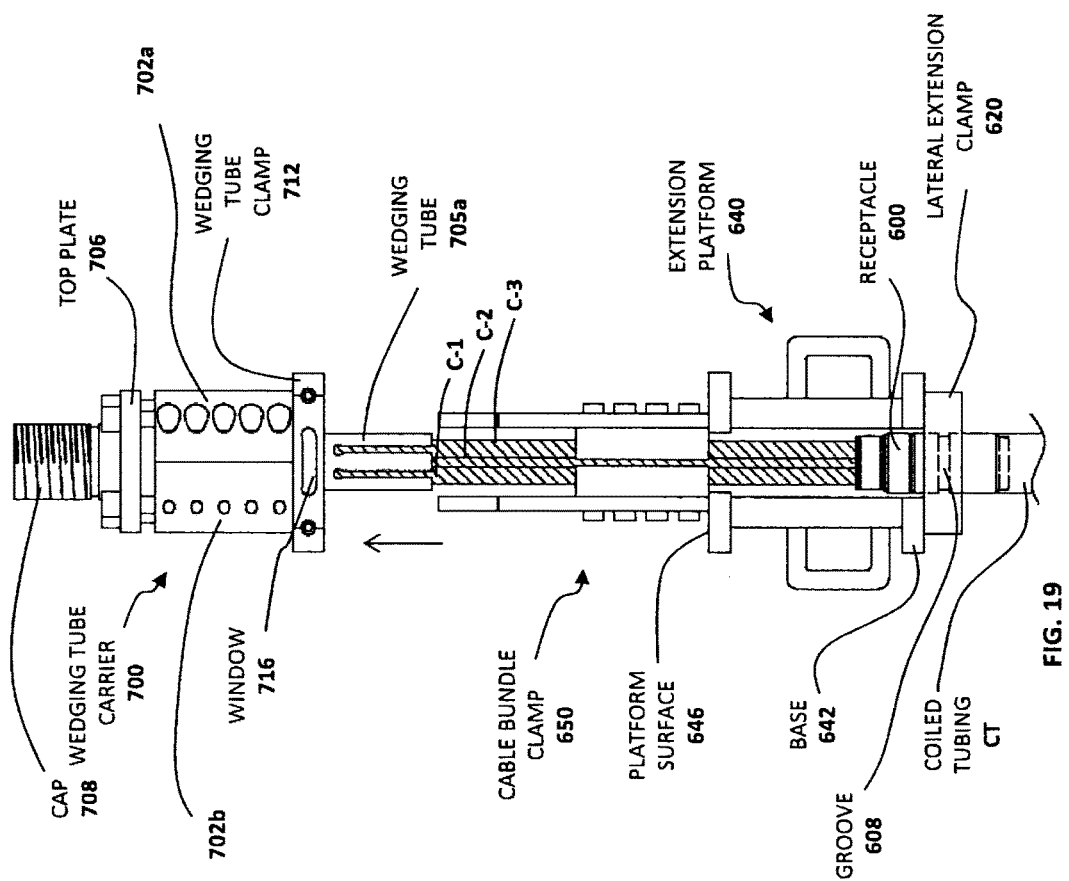
FIG. 19 is a side elevation view of the assembled components associated with the wedging tube carrier 700 and the temporary cable support system comprised of the cable bundle clamp 650 and the components of the cable support adapter including the receptacle 600, the lateral extension clamp 620 and the extension platform 640.

FIG. 18 is an exploded perspective view of the wedging tube carrier 700 and its associated components including, in this particular example, a pair of wedging tubes 705a and 705b, as well as a wedging tube clamp 712 which is formed of two halves 714a and 714b. The cables are omitted from this exploded view in the interest of preserving clarity.

This embodiment is assembled by first placing the wedging tube 705a with its down-hole end over the tops of the cut ends of the cables, inserting the cables and temperature lines into their corresponding openings and sliding wedging tube 705a downward over the cables and temperature lines. This process is then repeated with wedging tube 705b resulting in wedging tube 705b being located on the cables above wedging tube 705a. Next, the wedging tube carrier 700 is assembled over wedging tube 705b by bolting together the two halves 702a and 702b of the wedging tube carrier 700 at a point along the length of the cables where the lip 710 of the wedging tube carrier 700 is above and adjacent to the lip 708a of wedging tube 705a. Wedging tube 705b is contained within the hollow interior of the main body of the wedging tube carrier 700 with the exception that the lip 708b of the wedging tube 705b rests on the upper surfaces 704a and 704b of the halves 702a and 702b of the wedging tube carrier 700.

The action of tightening the bolts to connect the two halves 702a and 702b of the wedging tube carrier 700 compresses the body of the wedging tube 705b and causes the inner sidewall of the wedging tube 705b to securely grip the cables (not shown) as it is held within the hollow body of the wedging tube carrier 700. The remaining components of the wedging tube carrier 700 are then assembled. The top plate 706 is bolted to the upper surfaces 704a and 704b and the cap 701 is bolted to the top plate 706.

Although the main body of the wedging tube carrier 700 of the example embodiment is formed of two generally symmetrical cylindrical halves, a wedging tube carrier with a main body having a block shape or other shape may also be employed. The shape of the main body of the wedging tube carrier does not confer any significant advantage because it is a temporary assembly component and is removed after the wedging tube segments are in place within the cable support adapter.

Figure 23:
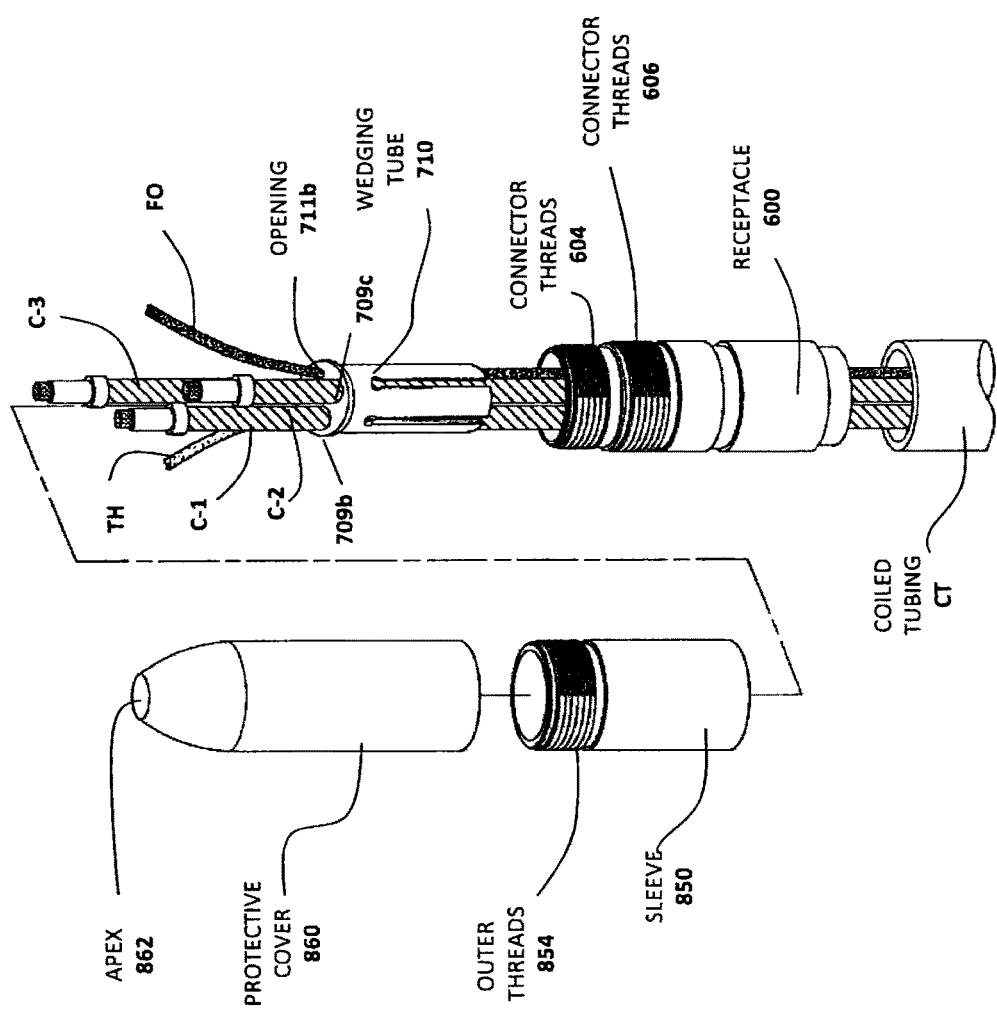
FIG. 23 is an exploded view of the permanent cable support system which is constructed of the receptacle 600 and wedging tube 705 in combination with the protective sleeve 850 of FIGS. 22A and 22B and protective cover 860.

The cut ends of the cables (not shown in FIG. 18) are located within the hollow interior of the cap 701 (an illustration of cut and processed ends of cables can be seen in in FIGS. 16 and 23).

A lifting head 720 is then connected to the cap 701. The lifting head 720 has a threading portion 721 for connection to the inner threads of the cap 701 and upper portions 722a and 722b with corresponding openings 724a and 724b which provide for connection to a lifting means, for example, by insertion of a supporting bar through the two openings 724a and 724b. This arrangement is indicated by lifting means L in FIG. 20.

The wedging tube clamp 712 is then assembled over the lips 708 and 710 of the wedging tube carrier 700 and wedging tube 705a by connecting the two halves 714a and 714b of the wedging tube clamp 712.

The lip 708a of the wedging tube 705a is coupled to the lip 710 of the wedging tube carrier 700 using the wedging tube clamp 712. The wedging tube clamp 712 has a side window 716 which allows for probing contact with the lip 710 of the wedging tube 705, to enable an operator to make adjustments of the coupling if necessary.

At this stage, the construction of both the first and second temporary cable support assemblies have been completed. This arrangement is shown in the side elevation view of FIG. 19 which shows the arrangement of components prior to removal of the first temporary cable support assembly. It can be seen that the lateral extension clamp 620 is connected to the receptacle 600 at the peripheral groove 608 and the base 642 of the extension platform 640 rests upon the upper surface of the lateral extension clamp 620. The receptacle 600, lateral extension clamp 620 and extension platform 640 collectively provide the cable support adapter functions described above. The cables C-1, C-2 and C-3 are gripped by the cable bundle clamp 650 and the entire combined weight of the cables C-1, C-2 and C-3 is supported by the cable bundle clamp 650. The lower wedging tube 705a extends down along the cables C-1, C-2 and C-3 and is attached to the wedging tube carrier 700 by the wedging tube clamp 721. The lifting head 720 would be attached at this stage but it is not shown in this view.

Figure 20:
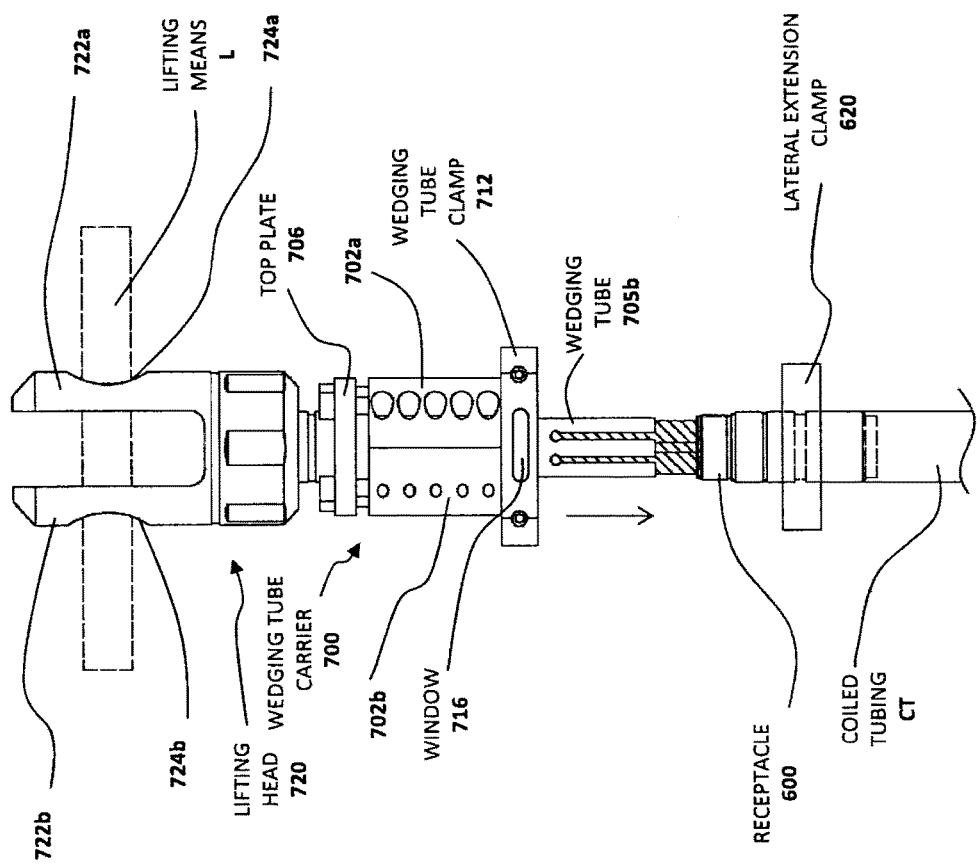
FIG. 20 is a side elevation view of the assembled components associated with the wedging tube carrier 700 (including the lifting means L) after removal of the cable bundle clamp 650 and the extension platform 640. Although the lateral extension clamp 620 is shown, its presence at this stage is optional.

Turning now to FIG. 20, the arrangement illustrated in the side elevation view shows the components remaining after the lifting head 720 has been coupled to a lifting means L (such as a crane or a mechanical power lifter, for example) and the first temporary cable support system (including the extension platform 640 and the cable bundle clamp 650) has been removed. In certain embodiments of methods for assembling a well heater using the present cable support embodiments, the crane may be the gantry-type crane described with reference to the facility of FIG. 2. In other embodiments, a smaller portable mechanical power lifter may be used. Connection of lifting means L to the lifting head 720 at the openings 724a and 724b in the extended portions 722a and 722b of the lifting head 720 allows the weight of the cables to be transferred to the lifting head 720 and lifting means L and this allows the cable bundle clamp 650 and the extension platform 640 to be removed.

The process of arriving at this illustrated arrangement is enabled when the lifting head L is lifted and the upward movement of cables C-1, C-2 and C-3 causes the cable bundle clamp 650 to move upward from the platform surface 646 of the extension platform 640 (because it securely grips the cables) so that the entire combined weight of the cables C-1, C-2 and C-3 is supported by the wedging tube carrier 700 supported by the lifting means L via the lifting head 720. The cable bundle clamp 650 is then removed along with the extension platform 640. Accordingly, these components are not seen in FIG. 20. It can be seen in FIG. 20 that there is now a clear vertical path between the wedging tube 705a and the receptacle 600. The lifting means L is then used to control the lowering of the cables C-1, C-2 and C-3 back down into the receptacle 600 and coiled tubing CT until the wedging tube 705a enters the receptacle 600. This action compresses the outer sidewall of the wedging tube 705a and causes the cables C-1, C-2 and C-3 to be gripped tightly by the wedging tube 705a. The outer sidewall of the wedging tube 705a wedges against the inner sidewall of the receptacle 600. With the insertion of the wedging tube 705a into the receptacle 600, permanent support of the cables C-1, C-2 and C-3 is attained and the second temporary support system provided in this example embodiment by the wedging tube carrier 700 may be safely removed. This arrangement is the basis of the permanent cable support system. Certain features of one embodiment of the permanent cable support system is shown in partially exploded view in FIGS. 16 and 23 and will be described in more detail hereinbelow.

The skilled person will appreciate that while the process of constructing the permanent cable support system was illustrated using the first-described embodiment of the wedging tube 705 (FIGS. 11A and 11B), other wedging tube embodiments, including wedging tubes 725, 745, 765 (FIGS. 12 to 14) and the wedging tube formed by the combination of wedging tube segments 785a, 785b and 785c (FIGS. 15A and 15B) may be substituted for wedging tube 705 in construction of a permanent cable support system.

Additional wedging tube embodiments are possible which incorporate various combinations of features disclosed herein and these alternative embodiments are also within the scope of the invention.

Figure 21:
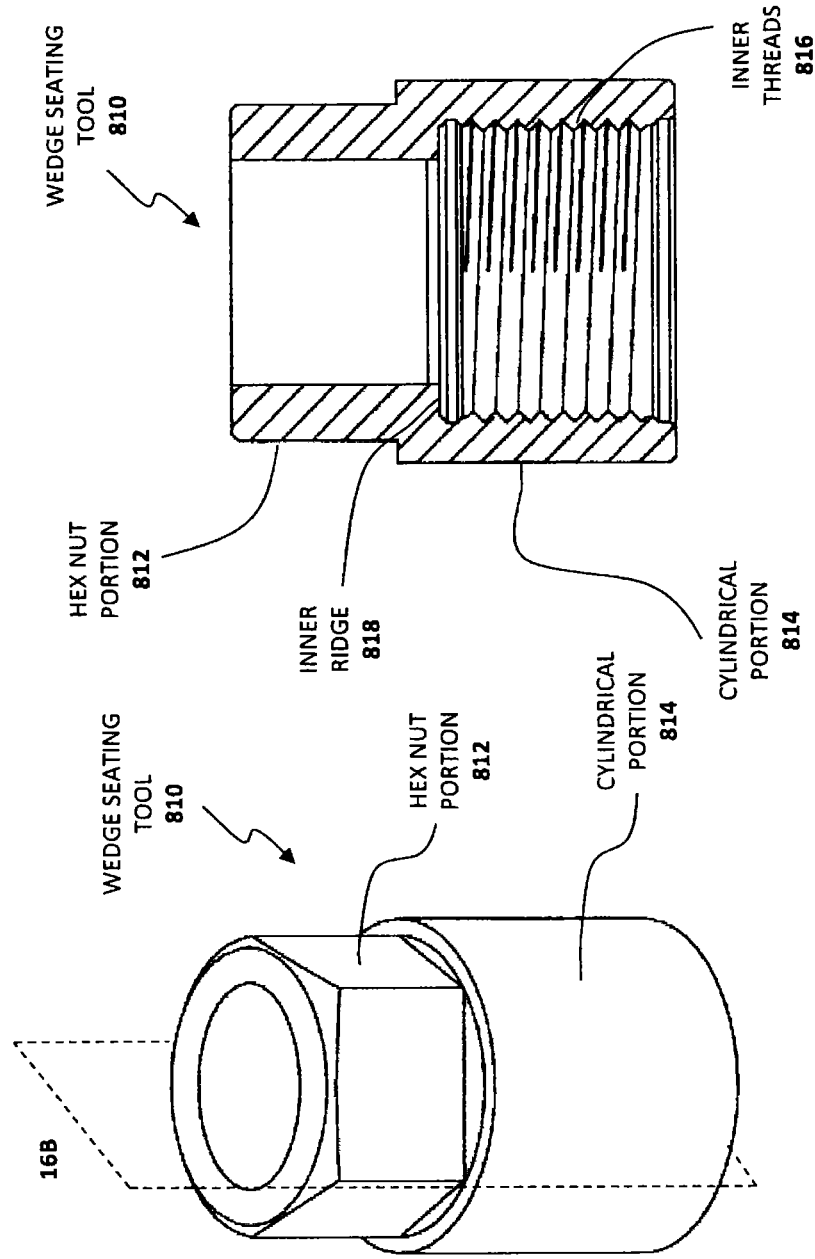
FIG. 21A is a perspective view of a wedging tube seating tool 810 which fits over the cut ends of the cables (not shown) and threads onto the upper outer threads of the receptacle (not shown).
FIG. 21B is a cross sectional view of the wedging tube seating tool 810 of FIG. 21A taken along plane 16B showing inner threads 816 and an inner ridge 818.

Advantageously, a wedging tube seating tool is used to ensure that the wedging tube is completely seated with its upper lip of its end plate located against the circumferential edge of the top of the receptacle 600. One embodiment of such a wedging tube seating tool is shown in FIGS. 21A and 21B. FIG. 21A is a perspective view of wedging tube seating tool 810 in the form of an open-ended hollow cylinder with an upper hex nut portion 812. The cross-sectional view of the wedging tube seating tool 810 reveals that the lower cylindrical portion 814 is provided with inner threads 816 that are configured for threading onto one of the two sets of outer threads of the receptacle 600. The inner threads terminate at an inner ridge 818. In operation, the wedging tube seating tool 810 is installed on the receptacle 600 by inserting it over the cut ends of the cables and sliding it down until it encounters the upper set of outer connector threads 604 of the receptacle 600, whereupon it is threaded onto the receptacle 600. Tightening of the wedging tube seating tool 810 onto the receptacle 600 to drive the end plate of the wedging tube downward is performed by applying a wrench to the hex nut portion 812 until the inner ridge 818 of the wedging tube seating tool 810 encounters and pushes down upon the end plate of the wedging tube to ensure complete seating of the wedging tube in the receptacle 600. When this is completed, the wedging tube seating tool 810 is removed (unthreaded) from the receptacle 600.

Figure 22:
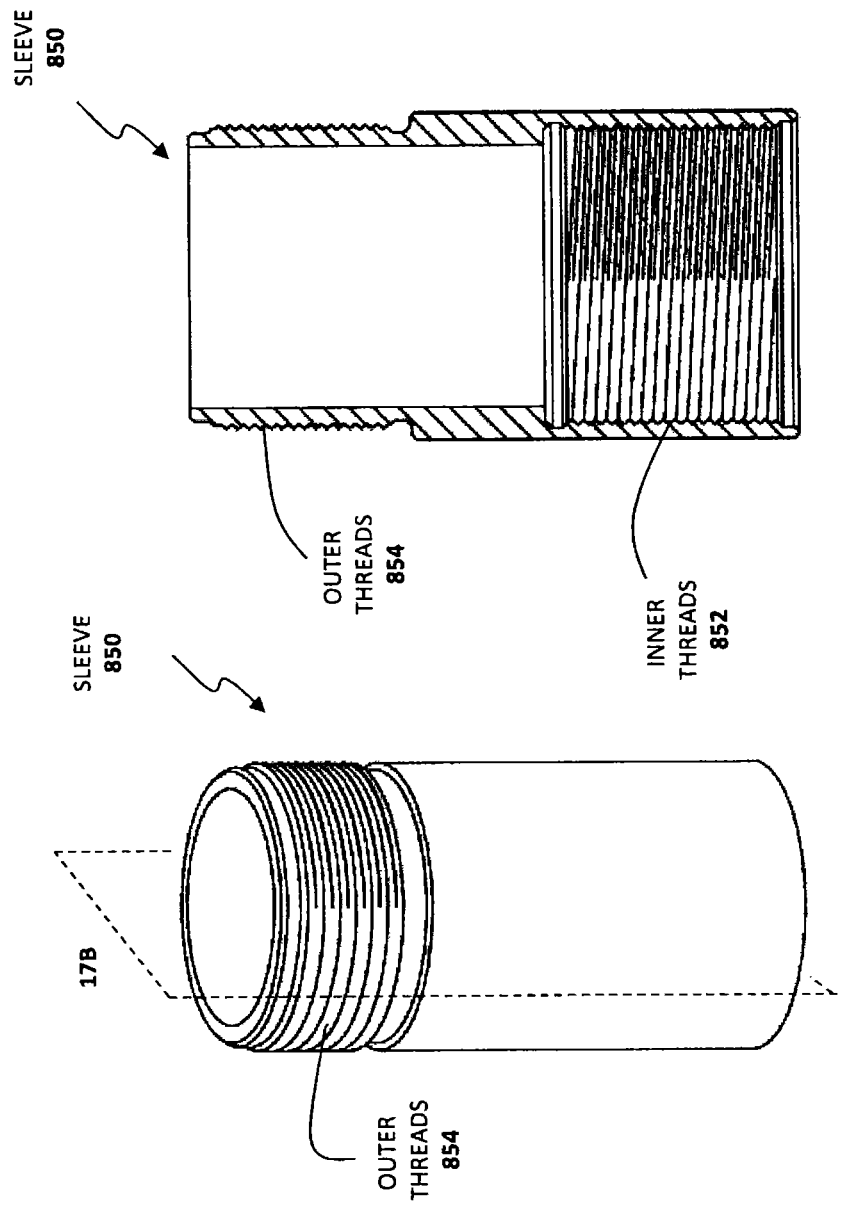
FIG. 22A is a perspective view of a cylindrical sleeve 850 configured to thread onto the outer lower threads of the receptacle (not shown).
FIG. 22B is a cross sectional view of the cylindrical sleeve 850 of FIG. 22A taken along plane 22B.

At this stage, the top of the permanent cable support system, which consists of the receptacle 600 and the end plate of the wedging tube with cables extending therefrom, is exposed. It is beneficial to provide protection to this section of the well heater and therefore, in certain embodiments, a protective sleeve is provided. A perspective view of an embodiment of a protective sleeve 850 is shown in FIG. 22A and a cross sectional view of the sleeve 850 is shown in FIG. 22B. This embodiment of the protective sleeve 850 is an open ended sleeve with upper threads for connection of a cover (see FIG. 23) or for connection of other adapters for connection of tools which may be used in processes for withdrawing the well heater from the well. The protective sleeve 850 is provided with inner threads 852 which allow the sleeve 850 to be connected to the lower set of outer threads 606 of the receptacle 600 (see FIG. 7A for the detail of the outer receptacle threads). The protective sleeve 850 is also provided with a set of outer threads 854 on its upper end for the purpose of connecting to a closed cover or to various other adapters which may be required for performing tasks relating to withdrawal of the well heater from the well.

For greater clarity, FIG. 23 provides an exploded view of the components of the permanent cable support system and also shows how the sleeve 850 is connected to the outer threads 606 of the receptacle and how an embodiment of the protective cover 860 is connected to the outer threads 854 of the sleeve 850. This is a useful arrangement for protecting the tops of the cables C-1, C-2 and C-3 when the assembled well heater is withdrawn from the well. In certain embodiments, the protective cover 860 has a flat apex 862 which is provided with a means for connection to adapters for various tools as noted hereinabove (not shown). Such a means for connecting adapters (not shown) may be provided by a threaded opening at the apex 862, for example.

Insulating Cable Inserts

As noted above in context of the description of the general features of the well heater, it is advantageous to provide the cut ends of the cables with insulating cable inserts which prevent voltage leaks. Such voltage leaks could result in electrical hazards and compromise the proper functioning of the well heater. Accordingly, certain embodiments of the well heater provided according to certain aspects of the present invention are provided with insulating cable inserts. Such inserts are constructed of non-conducting materials which provide insulation against voltage leaks. Advantageously, the inserts are formed of non-conducting lightweight injection moldable plastics which may be conveniently molded to specifications to match certain dimensions of the cables. In certain embodiments, the plastic used to form the insulating inserts is polyether ether ketone (PEEK), a colorless organic thermoplastic of the polyaryletherketone family which is used in engineering applications. PEEK has excellent mechanical and chemical resistance properties that are retained to high temperatures. The processing conditions used to mold PEEK can influence the crystallinity, and hence the mechanical properties. The Young's modulus is 3.6 GPa and its tensile strength 90 to 100 MPa. PEEK has a glass transition temperature of around 143° C. (289° F.) and melts around 343° C. (662° F.). Some grades have a useful operating temperature of up to 250° C. (482° F.). The thermal conductivity increases nearly linearly versus temperature between room temperature and solidus temperature. It is highly resistant to thermal degradation as well as attack by both organic and aqueous environments. The skilled person will recognize that other plastics with properties similar to those of PEEK may also be used to form the insulating cable inserts. These alternatives are within the scope of the invention.

One embodiment of the insulating cable insert is designed to be partially inserted into the space between the cable core and the cable sheath. This space is generated by removal of the mineral insulation layer. Removal of a portion of this layer can be done by scraping it out using a scraping tool or, more conveniently and reproducibly, by using a hollow drill bit designed for this purpose. Such a hollow drill bit may be designed and constructed by the skilled person without undue experimentation. The hollow portion of the drill bit is inserted over the core of the cable and the boring members of the drill bit are configured to ream out the mineral insulation and convey it out of the space between the cable core and the cable sheath. Advantageously in certain embodiments, the inner sidewall of the cable sheath is polished to remove burrs and other deformities which may have been generated by the drill bit used to remove the insulation. Such surface irregularities may cause voltage arcs and it is therefore beneficial to remove them. The process of removing these irregularities may entail the use of another hollow drill bit which fits over the cable core and which has boring members configured to scrape and polish the surface of the inner sidewall of the cable sheath. Such specialized drill bits may be designed, constructed and tested by the skilled machinist without undue experimentation.

One embodiment of the insulating cable insert 900 is shown in FIGS. 24A and 24B and a perspective view showing the installation of the insulating cable insert 900 at the cut end of a cable is shown in FIG. 25. The insulating cable insert 900 is a cylindrical structure of unitary construction with a hollow space extending therethrough. The hollow space 902 is dimensioned to provide a close fit to the outer sidewall of the cable core when the insulating cable insert 900 is installed as shown in FIG. 25. The cylindrical member has three distinct portions including a lower tapered portion 904, a wide portion 906 and an upper portion 908.

It can be seen in FIG. 25 that in the process of installation of the insulating cable insert, the tapered portion 904 is placed over the cable core 302 and pushed downwards (as indicated by the arrow) until the wide portion 906 reaches the cut end of the cable sheath 306. The end of the wide portion 906 acts as a wall to halt further downward movement of the insulating cable insert 900. Advantageously, the insulating cable insert 900 is permanently fixed in place using an adhesive such as an epoxy resin, which may be placed in the space between the cable core 302 and the cable sheath 306 prior to insertion of the insulating cable insert 900. Advantageously, the end of the tapered portion 904 reaches the boundary of the space created by removal of the insulating layer of the cable in order to maximize the insulation effect. In certain embodiments of methods for installation of insulating cable inserts, the insulating cable inserts are subjected to downward and circumferential pressure by one or more pressure clamps to ensure that a proper seal is formed between the insulating cable insert and the inner sidewall of the cable sheath as well as between the insulating cable insert and the outer sidewall of the conducting cable core, in order to minimize the occurrence of voltage leaks when the well heater is in use. A portion of the conducting cable core 302 extends from the upper opening of the insulating cable insert 900 and may be provided with further temporary insulating protection during transportation of the well heater. When ready for deployment, the temporary insulating protection is removed to expose the cable core for connection to an electrical source which activates the well heater for its intended purpose.

In certain embodiments, the insulating cable insert is configured for insulation of the end of a cable with a copper core and a stainless steel sheath. The cable has a sheath with an outer diameter of 0.85 inches and a core with an outer diameter which is less than about 0.394 inches. The insulating cable insert in this case has a total length of about 2.2 inches and a hollow space with a diameter of 0.394 inches. The wide portion has an outer diameter of about 0.85 inches and is thus about the same diameter as the cable sheath.

Retrofitting of a Coiled Tubing Injector for Injection of Cables

As indicated hereinabove, in context of the description of the well heater assembly facility embodiments of FIGS. 1 and 2, a conventional coiled tubing injector is used to inject cables into the coiled tubing. In order to adapt a conventional coiled tubing injector for this purpose, it is retrofitted to provide it with the capability to simultaneously grip a plurality of cables. Thus certain aspects of the present invention provide a method for retrofitting a conventional coiled tubing injector for injection of cables. The method includes the step of removing the complete set of conventional coiled tubing gripper blocks from the coiled tubing injector and replacing them with a set of cable gripper blocks wherein each gripper block is designed to hold a plurality of cables. FIG. 26 shows a side elevation view of a known arrangement of a coiled tubing injector 20 with a chain-driven injector drive 36 (with reference to FIG. 1) and a series of five coiled tubing gripper blocks 950a, 950b, 950c, 950d and 950e which cooperate with opposed coiled tubing gripper blocks (not seen in this view) to grip the coiled tubing (not shown) and drive it vertically downward into a well. This view shows that each one of the five gripper blocks shown 950a, 950b, 950c, 950d and 950e has a single relatively large radius indentation 952a, 952b, 952c, 952d, and 952e for holding the coiled tubing in a gripping arrangement with a set of five opposed gripper blocks of identical construction (not shown).

In the example embodiments of the well heater described hereinabove, the plurality of cables is provided by a set of three cables and therefore, in the set of cable gripper blocks designed for retrofitting a conventional coiled tubing injector for simultaneous injection of three cables, each gripper block is constructed with a set of three indentations with each of the three indentations cooperating with an opposed indentation of an opposed gripper block. An example of such a set of gripper blocks is shown in FIG. 27 in an arrangement similar to that of FIG. 26. In FIG. 27, the side elevation view shows five cable gripper blocks 970a, 970b, 970c, 970d and 970e, each of which has a set of three indentations 972a, 972b, 972c, 972d, and 972e which cooperate with an opposed set of three indentations on opposing gripper blocks to grip the three cables and drive them vertically downward into a well or into coiled tubing placed in a well.

Figure 28:
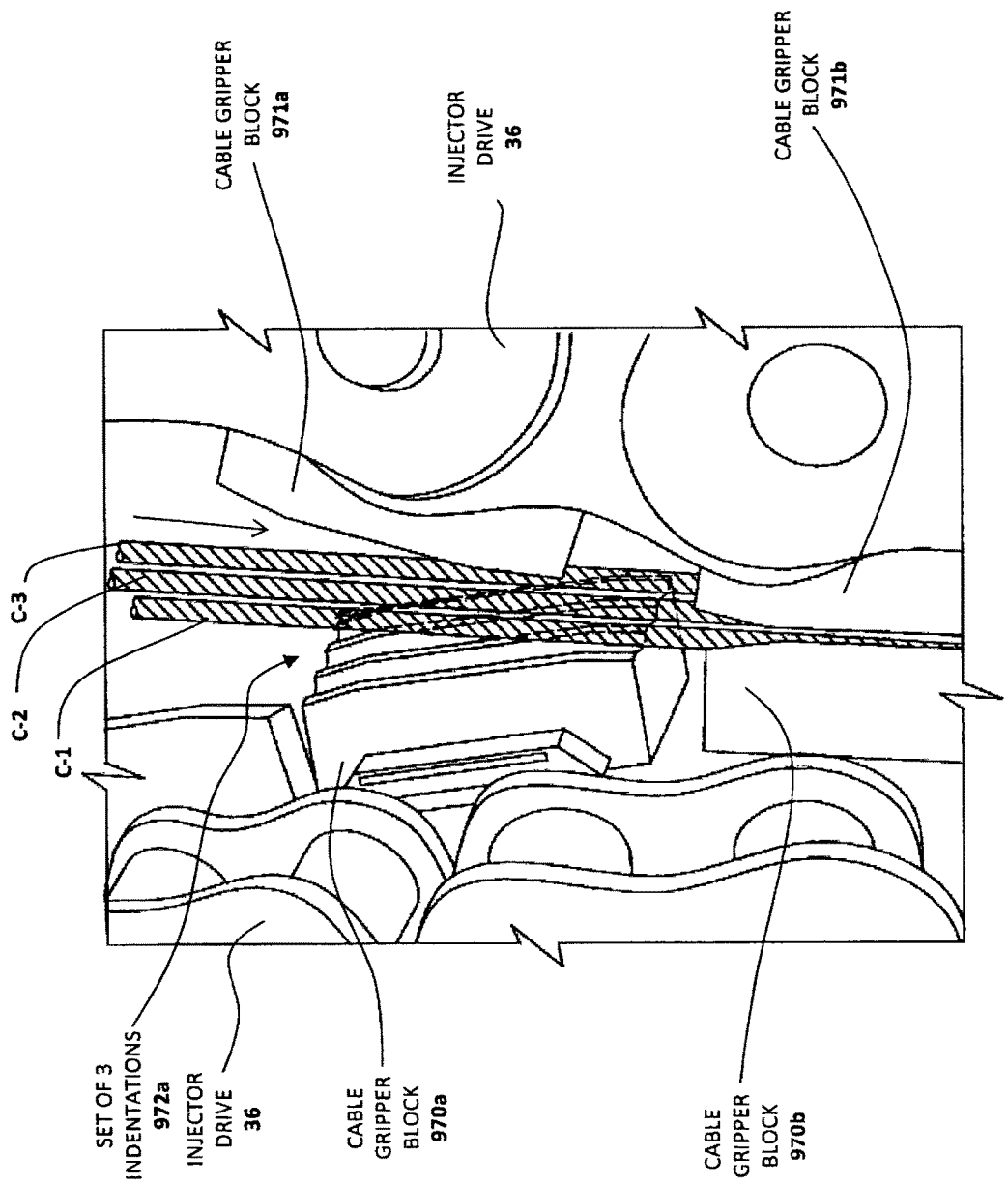
FIG. 28 is a partial perspective view of the two sides of an injector drive 36 of a coiled tubing injector and pairs of cable gripper blocks (970*a*/971*a* and 970*b*/971*b*) connected thereto. This view shows how the cables C-1, C-2 and C-3 are gripped by the two pairs of cable gripper blocks 970*a*/971*a* and 970*b*/971*b*.

The manner of simultaneous gripping of three cables by opposed cable gripping blocks is shown in the partial perspective view of a portion of the coiled tubing injector drive mechanism 36 and gripper blocks in FIG. 28. It is to be understood that when a complete set of cable gripper blocks is connected to the injector drive mechanism of a conventional coiled tubing injector and the injector is run in the downward injection mode, the gripper block pairs 970a/971a and 970b/971b as shown in FIG. 28 engage the cables C-1, C-2 and C-3 and drive them downward in the direction of the arrow. Likewise, the remaining pairs of cable gripper blocks of the complete set will engage the cables in a similar manner when the drive mechanism 36 brings them into contact with the cables during the drive cycle.

For greater clarity, the structure of an individual cable gripper block 970a is shown in perspective view in FIG. 29A and in a top view in FIG. 29B. These views of FIGS. 29A and 29B show the set 972a of three radiused indentations 978a, 978b and 978c. It is seen that in this particular embodiment of the cable gripper block, the side walls of the indentations 978a and 978c are extended on the outer sides with respect to the inner sides. In addition, the back wall 979 of the cable gripper block 970a is provided with a connector 981 which provides a means for attachment of the cable gripper block to the injector drive mechanism of the coiled tubing injector. The connector 981 is advantageously the same as the connecting means used to connect a conventional coiled tubing gripper block to a conventional coiled tubing injector. Such a connection arrangement may consist of a ridge and groove arrangement, for example. The skilled person has the ability to construct a cable gripper block with a similar or identical connecting means without undue experimentation.

EQUIVALENTS AND SCOPE

Although the present invention has been described and illustrated with respect to certain embodiments, it is not to be so limited since modifications and changes can be made therein which are within the full, intended scope of the invention as understood by those skilled in the art. Each of the references cited herein is incorporated by reference in entirety.

The invention claimed is:

1. A method of retrofitting a coiled tubing injector for injection of resistive heating cables into coiled tubing deployed in a well in assembly of a well heater, the method comprising:
   a) providing a coiled tubing injector with a gripper block system that allows exchange of the coiled tubing gripper blocks; and
   b) exchanging coiled tubing gripper blocks for gripper blocks configured to grip one or more resistive heating cables.

2. The method of claim 1 wherein the cable gripper blocks each include three indentations for gripping three resistive heating cables.

3. The method of claim 2 wherein the indentations are each radiused to hold cables having an outer diameter of about 0.85 inches.

4. A method for injecting resistive heating cables into coiled tubing deployed in a well in assembly of a well heater, the method comprising:
   a) providing a coiled tubing injector above the well, the coiled tubing injector having coiled tubing gripper blocks replaced with cable gripper blocks;
   b) guiding one or more resistive heating cables from respective cable reels into the top of the injector; and
   c) using the injector to inject the cables into the coiled tubing deployed in the well with downward vertical movement of the cables driven by gripping and downward vertical movement of the cable gripper blocks.

5. The method of claim 4, further comprising straightening the cables prior to entry of the cables into the top of the injector.

6. The method of claim 5, wherein the straightening of the cables is performed using a cable straightener provided with swivel means to move the cable straightener laterally to and from a position directly above the injector.

7. The method of claim 4 wherein the cable gripper blocks are configured to simultaneously grip three cables.

8. The method of claim 7 wherein the cable gripper blocks each have three indentations, wherein each indentation holds one of the three cables.

9. The method of claim 8 wherein the indentations are each radiused to hold cables having an outer diameter of about 0.85 inches.

10. A kit for use in retrofitting a coiled tubing injector for injection of resistive heating cables into coiled tubing deployed in a well in assembly of a well heater, the kit comprising:
    a set of cable gripper blocks wherein each cable gripper block of the set is a square or rectangular block having:
        a cable gripping side with three indentations, each indentation for gripping one of the three resistive heating cables; and
        an opposing side opposite the gripping side, the opposing side having a means for attachment of the gripper block to a drive mechanism of a coiled tubing injector;
    a cable straightener; and
    hardware for construction of a swivel mechanism for the cable straightener.

11. The kit of claim 10 wherein the means for attachment of the cable gripper block to the drive mechanism is a groove which couples to a ridge on the drive mechanism or a ridge which couples to a groove on the drive mechanism.

12. The kit of claim 10 wherein the indentations are each radiused to hold cables having an outer diameter of about 0.85 inches.

13. The kit of claim 10 further comprising instructions for replacing the gripper blocks of a coiled tubing injector with the set of cable gripper blocks.

14. The kit of claim 10, wherein the swivel mechanism configured for attachment to scaffolding associated with the coiled tubing injector.

15. The kit of claim 10, wherein the cable straightener is configured to straighten three cables simultaneously.

* * * * *